July 26, 1960 H. A. SKOG ET AL 2,946,361
FRUIT ORIENTING, TRANSFERRING, SPLITTING, AND PITTING MACHINE
Filed Feb. 10, 1949 26 Sheets-Sheet 1

INVENTORS.
Henry A. Skog,
Richard D. Fox
By: Moore, Olson & Trexler
Attys

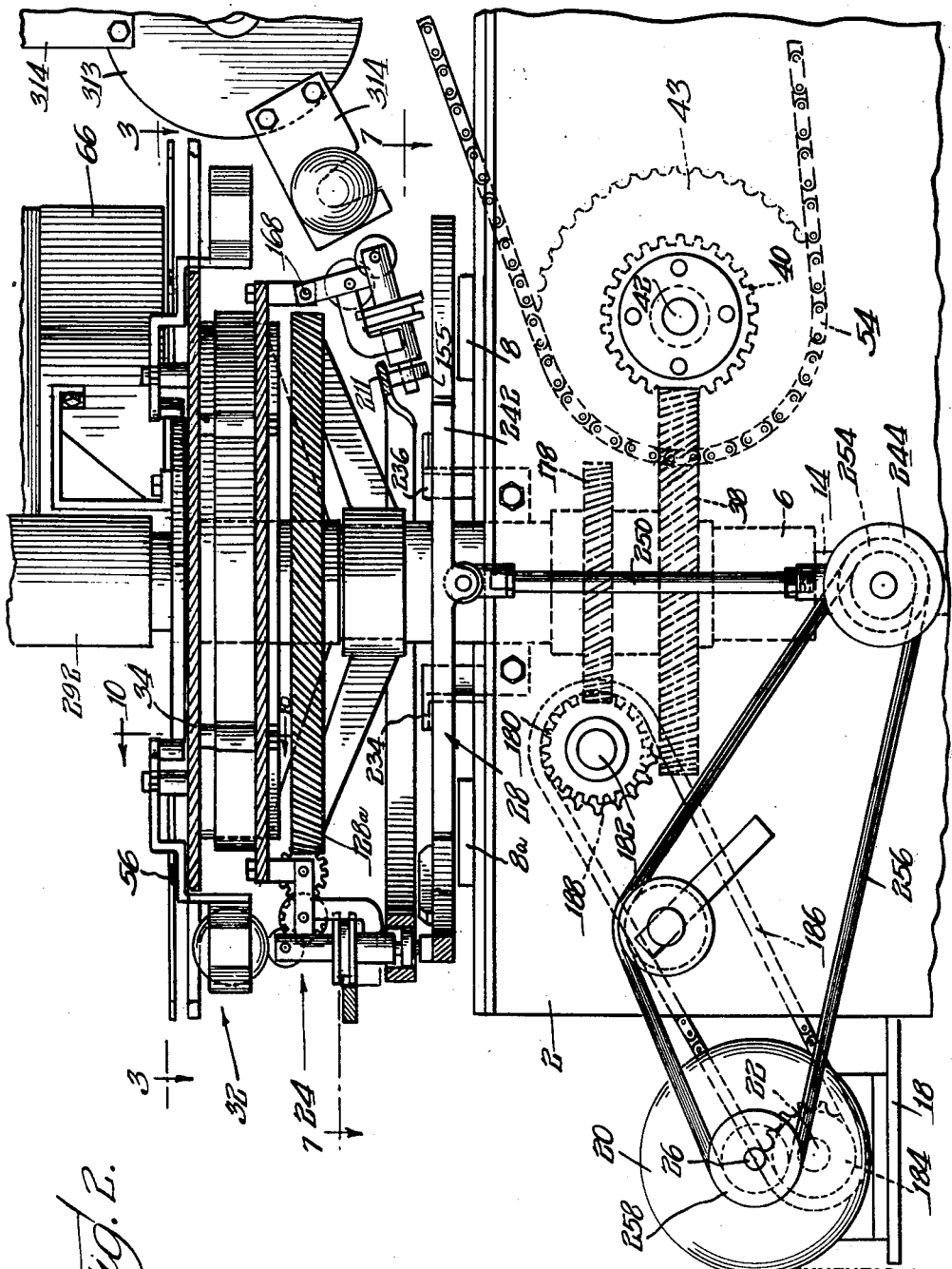

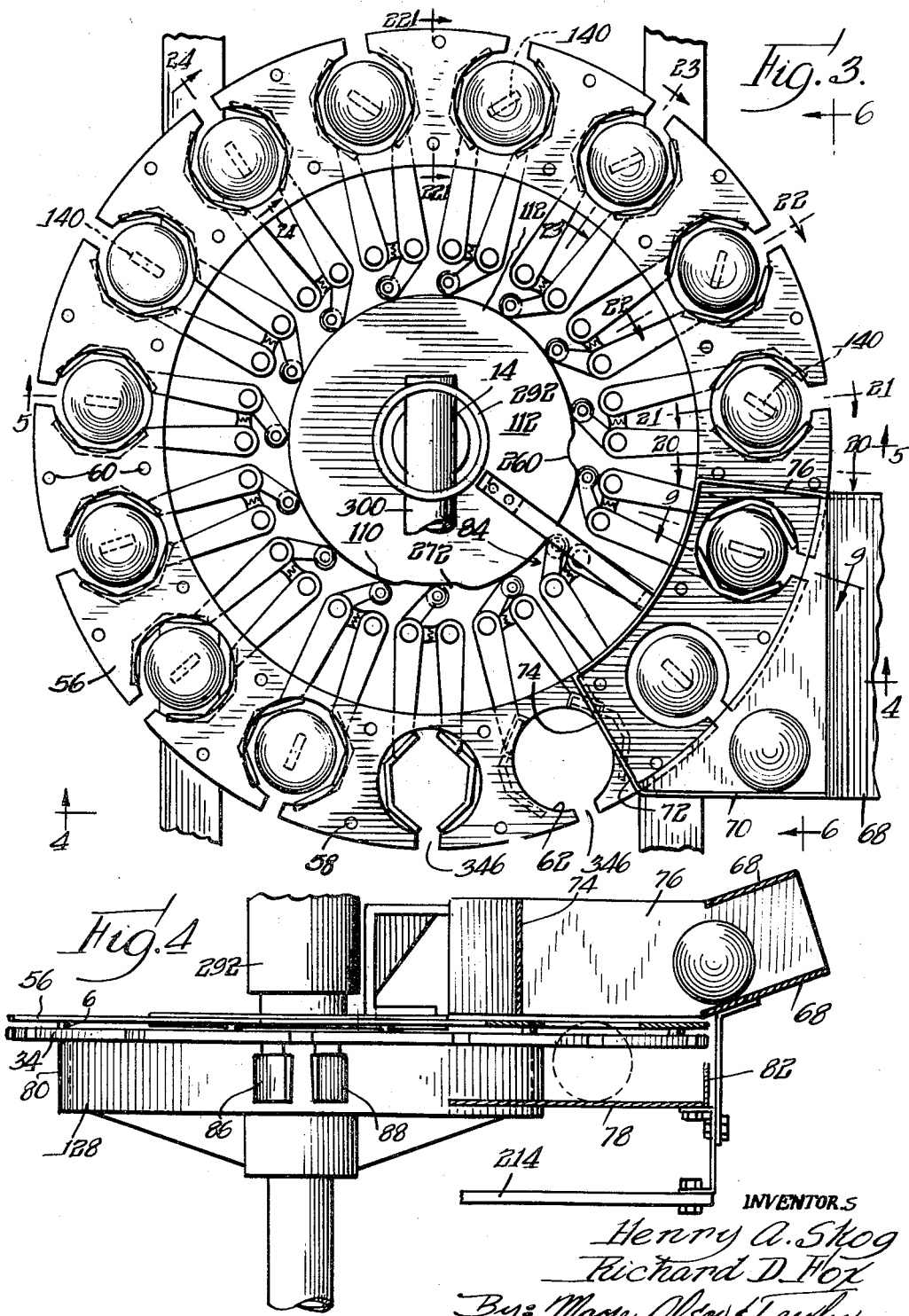

July 26, 1960 H. A. SKOG ET AL 2,946,361
FRUIT ORIENTING, TRANSFERRING, SPLITTING, AND PITTING MACHINE
Filed Feb. 10, 1949 26 Sheets-Sheet 4

INVENTORS
Henry A. Skog
Richard D. Hoy
By: Moore, Olson & Trueder attys

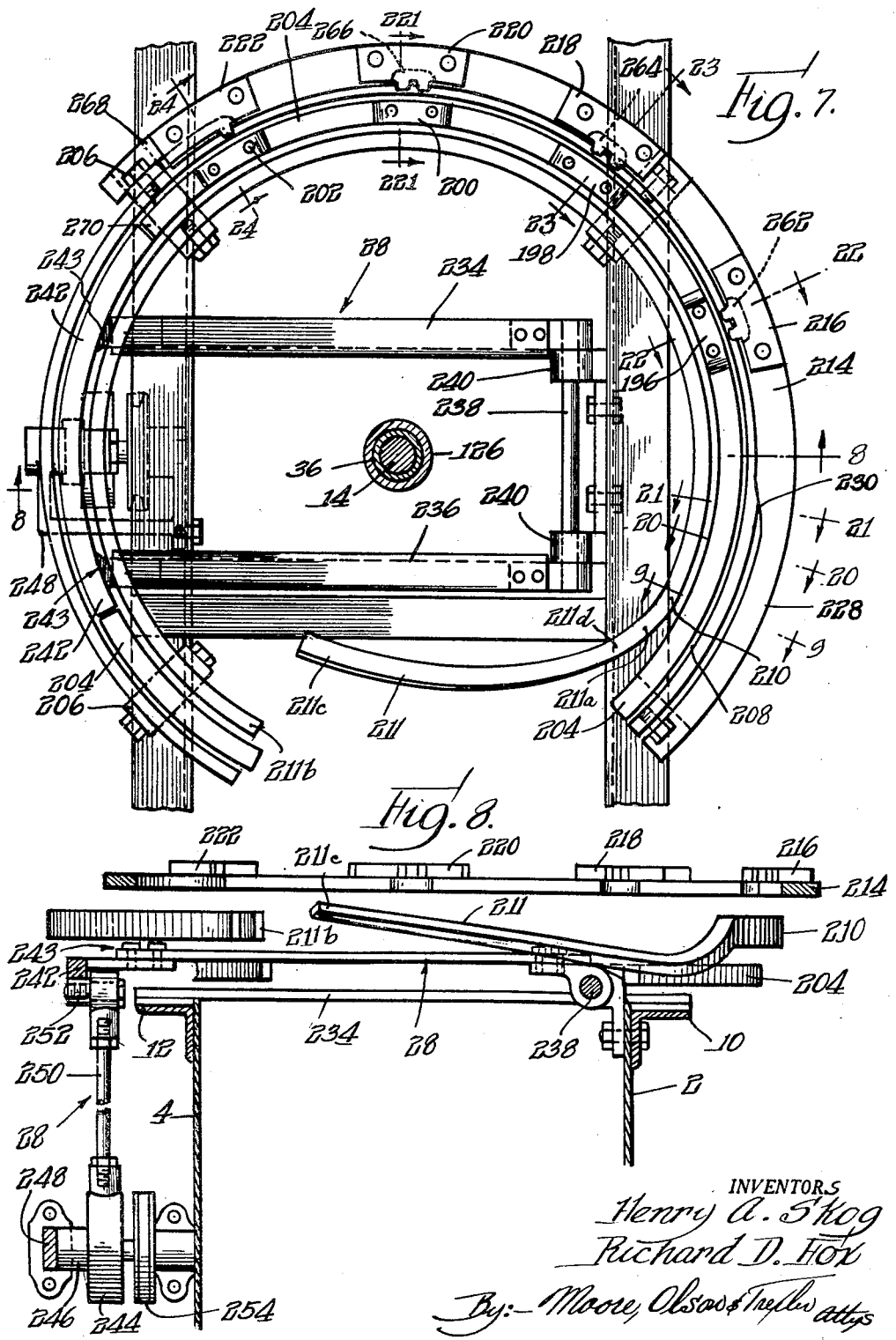

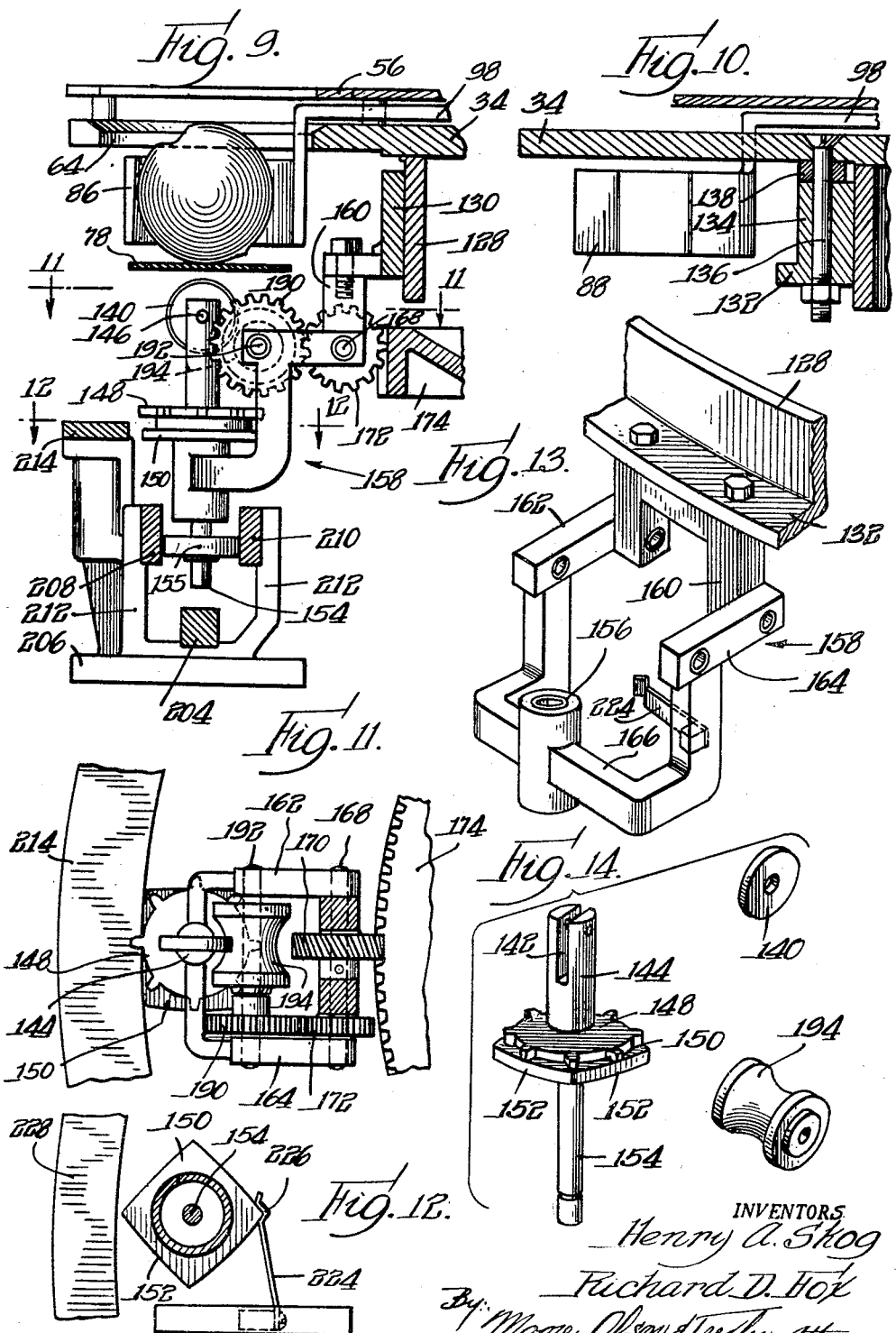

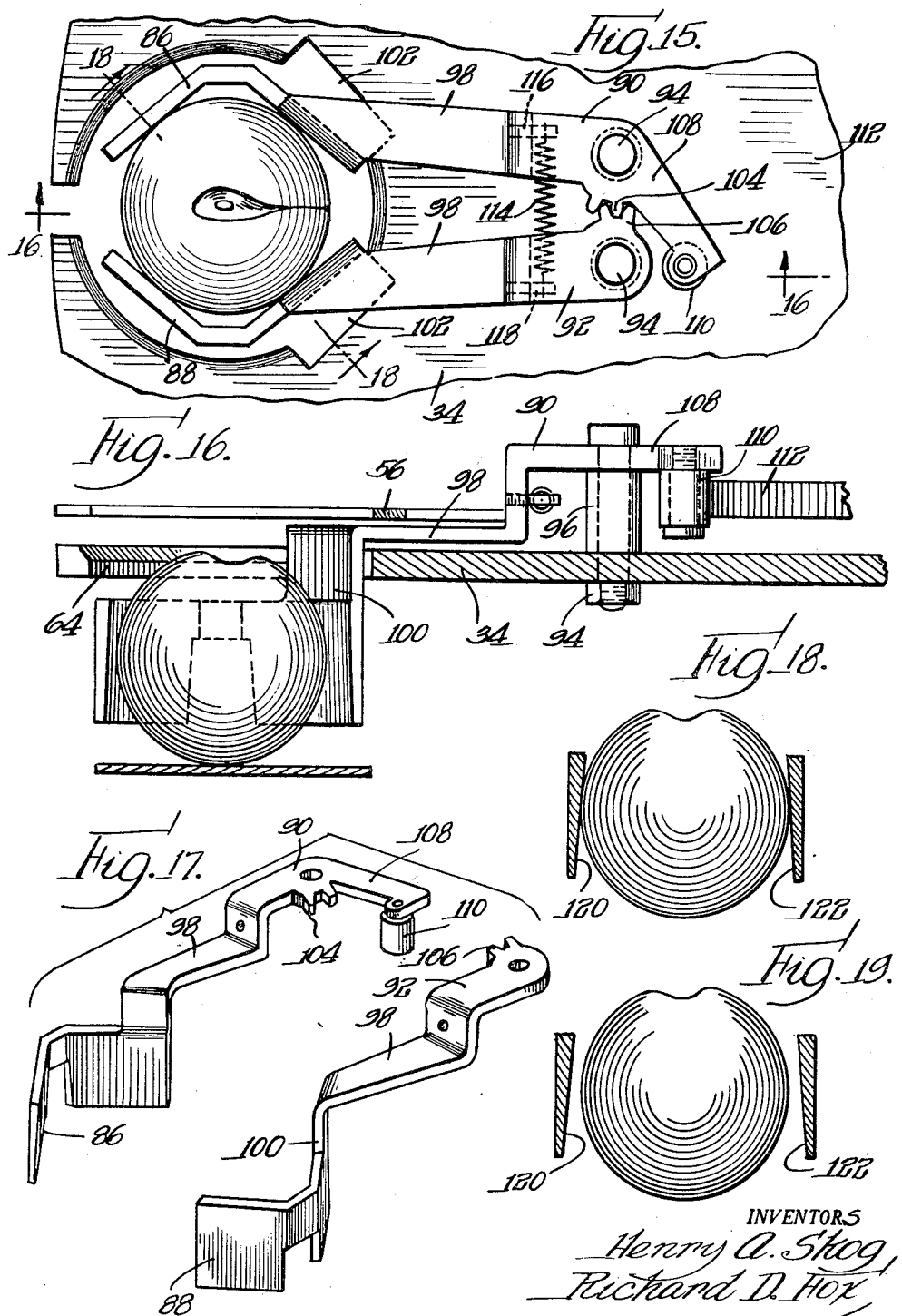

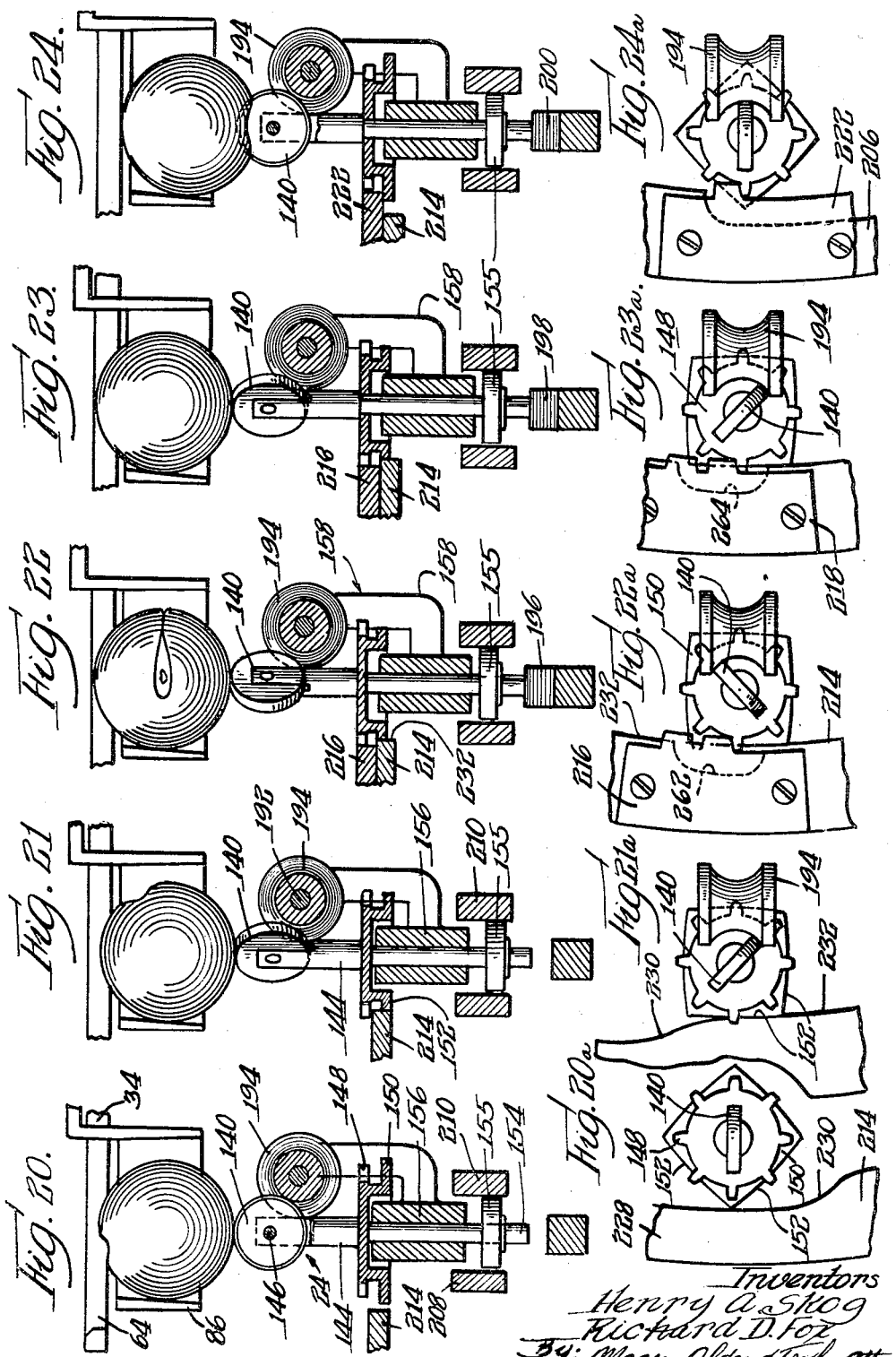

July 26, 1960 H. A. SKOG ET AL 2,946,361
FRUIT ORIENTING, TRANSFERRING, SPLITTING, AND PITTING MACHINE
Filed Feb. 10, 1949 26 Sheets-Sheet 9

INVENTORS.
Henry A. Skog
Richard D. Hoy
By: Moore, Olson & Trexler
Attys

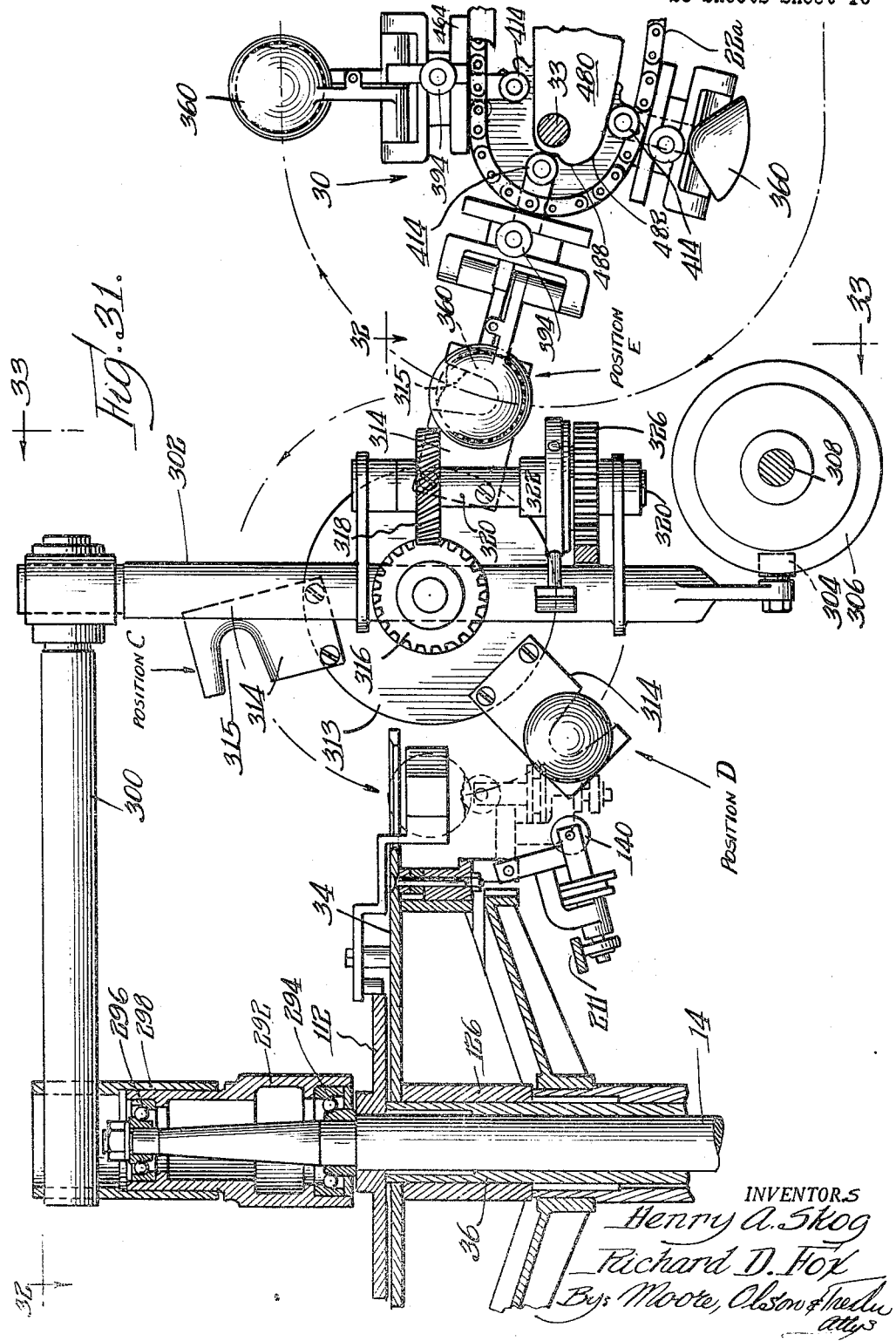

July 26, 1960  H. A. SKOG ET AL  2,946,361
FRUIT ORIENTING, TRANSFERRING, SPLITTING, AND PITTING MACHINE
Filed Feb. 10, 1949  26 Sheets-Sheet 11
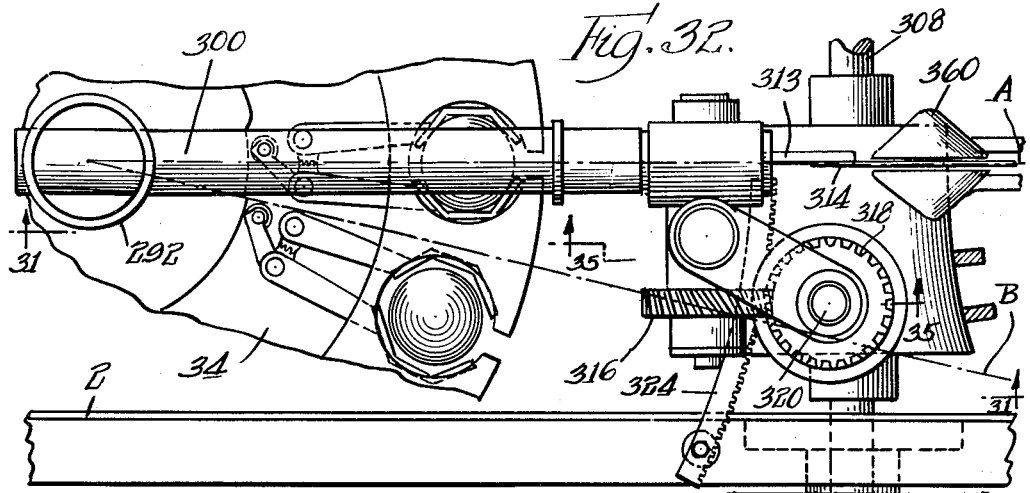
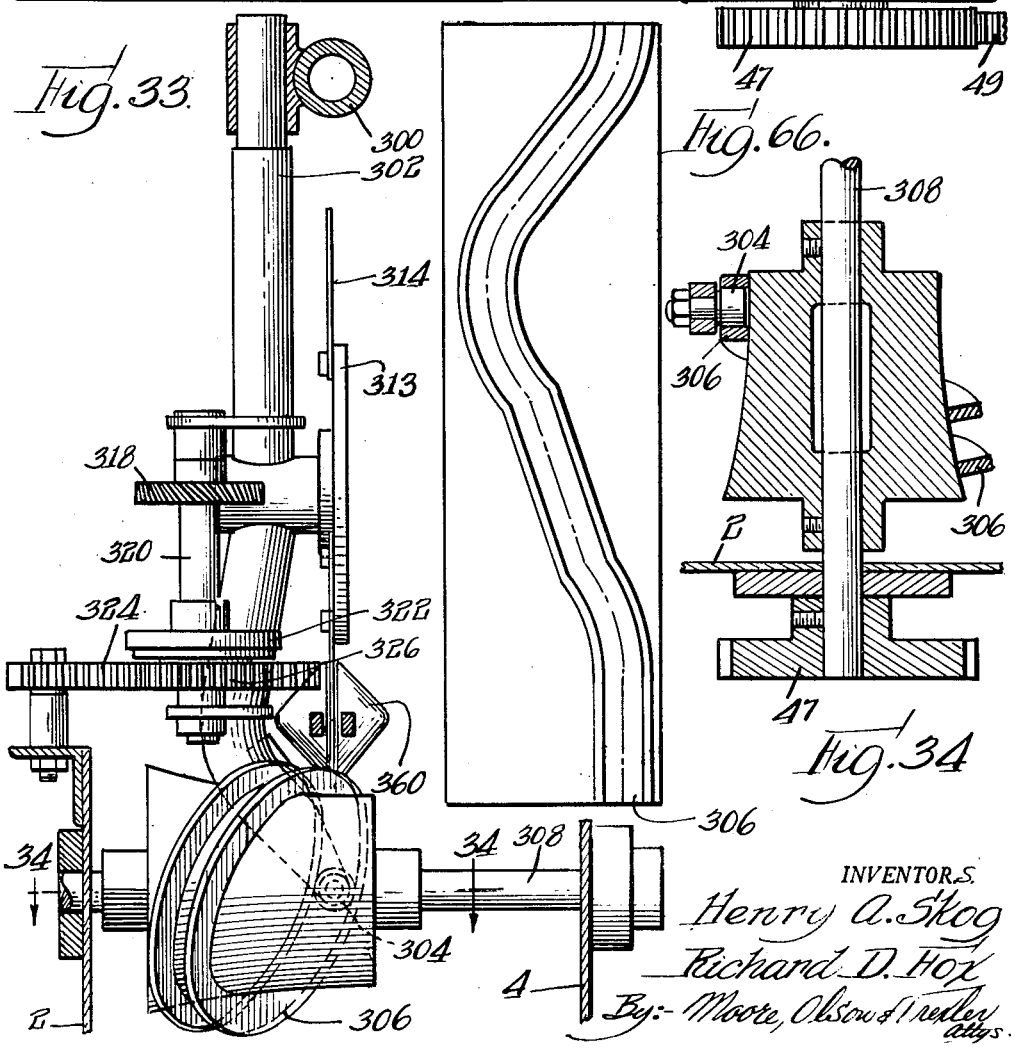
INVENTORS.
Henry A. Skog
Richard D. Hox
By: Moore, Olson & Trexler
attys.

July 26, 1960

H. A. SKOG ET AL 2,946,361

FRUIT ORIENTING, TRANSFERRING, SPLITTING, AND PITTING MACHINE

Filed Feb. 10, 1949

INVENTORS
Henry A. Skog,
Richard D. Hoy
By: Moore, Olson & Trexler
attys

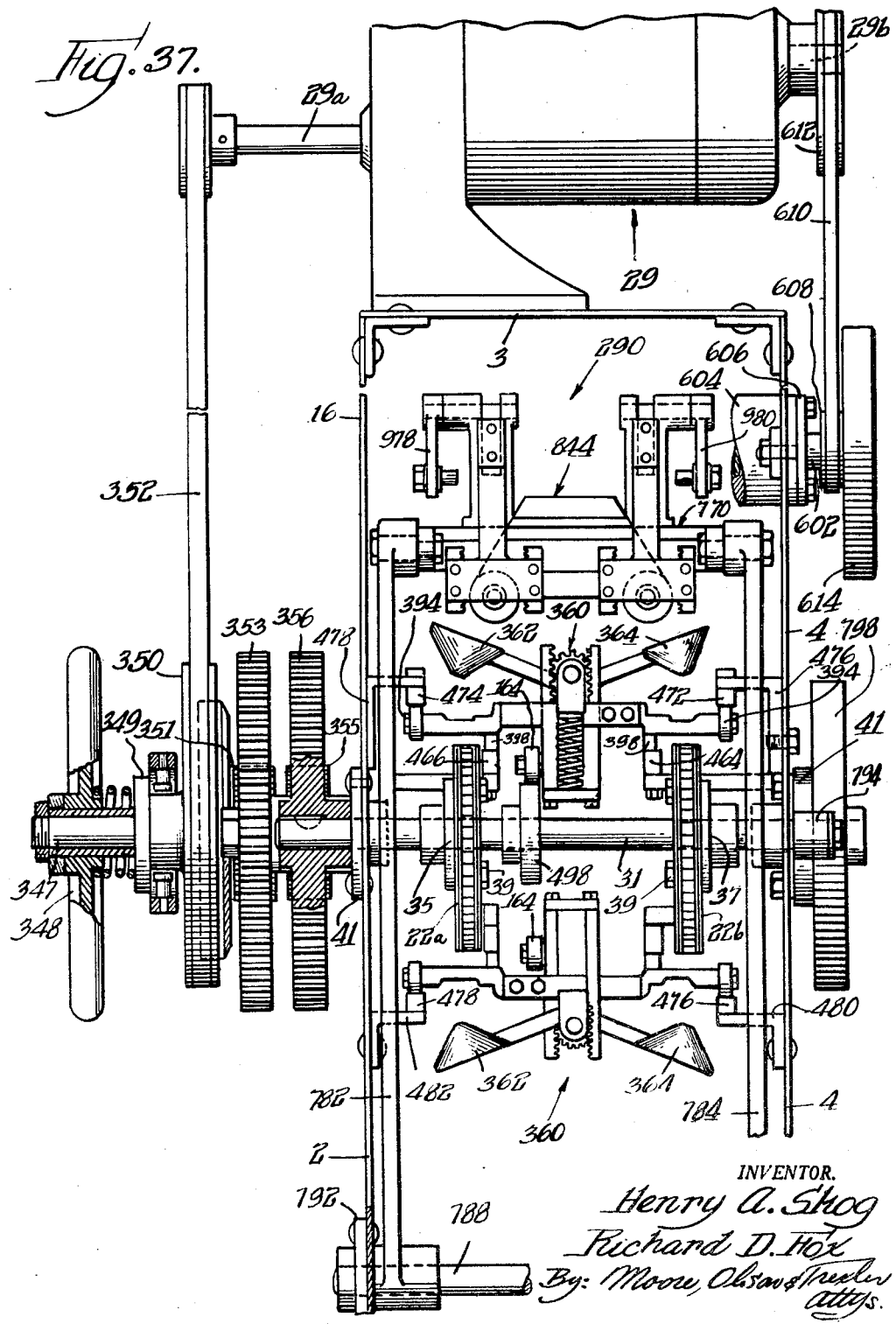

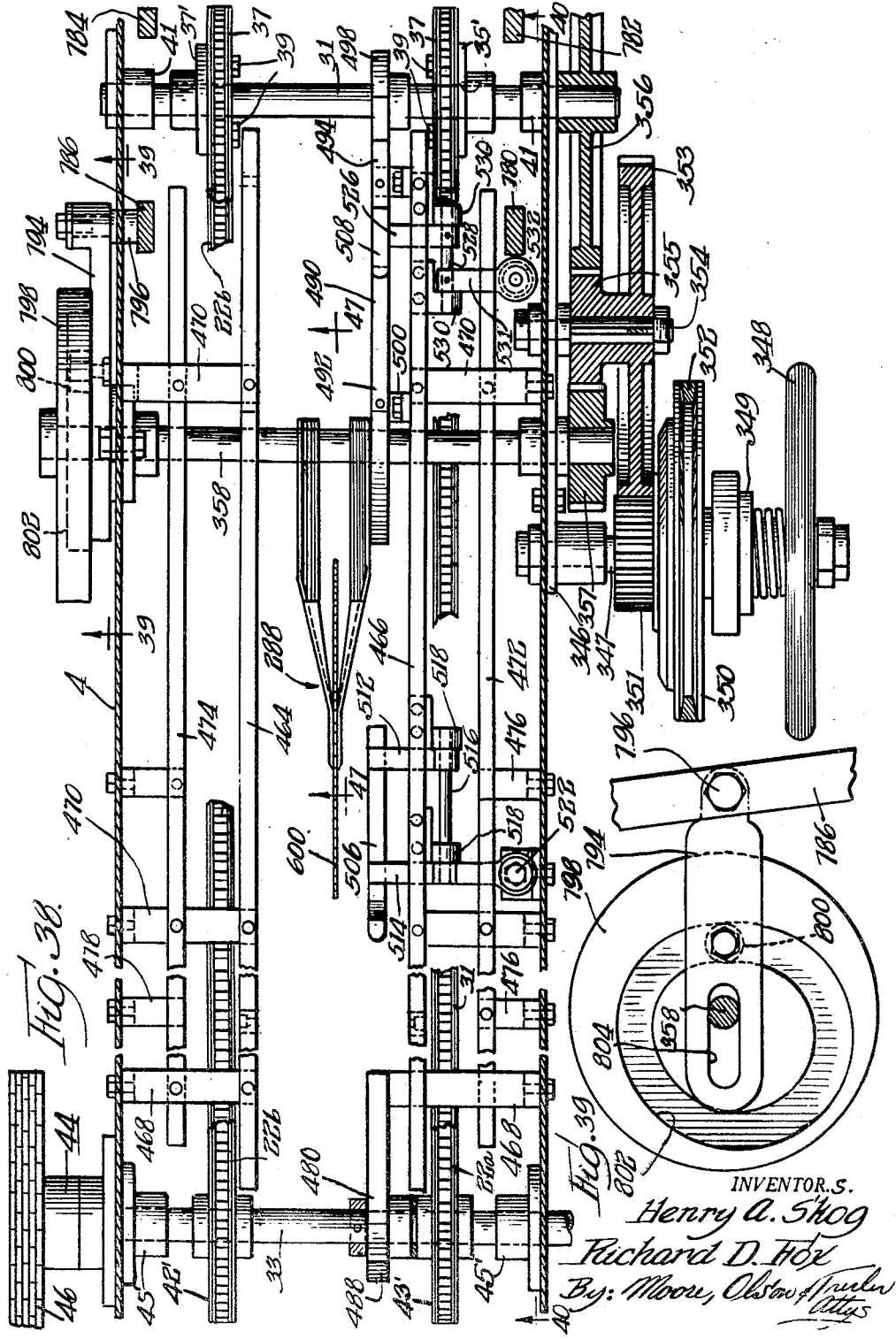

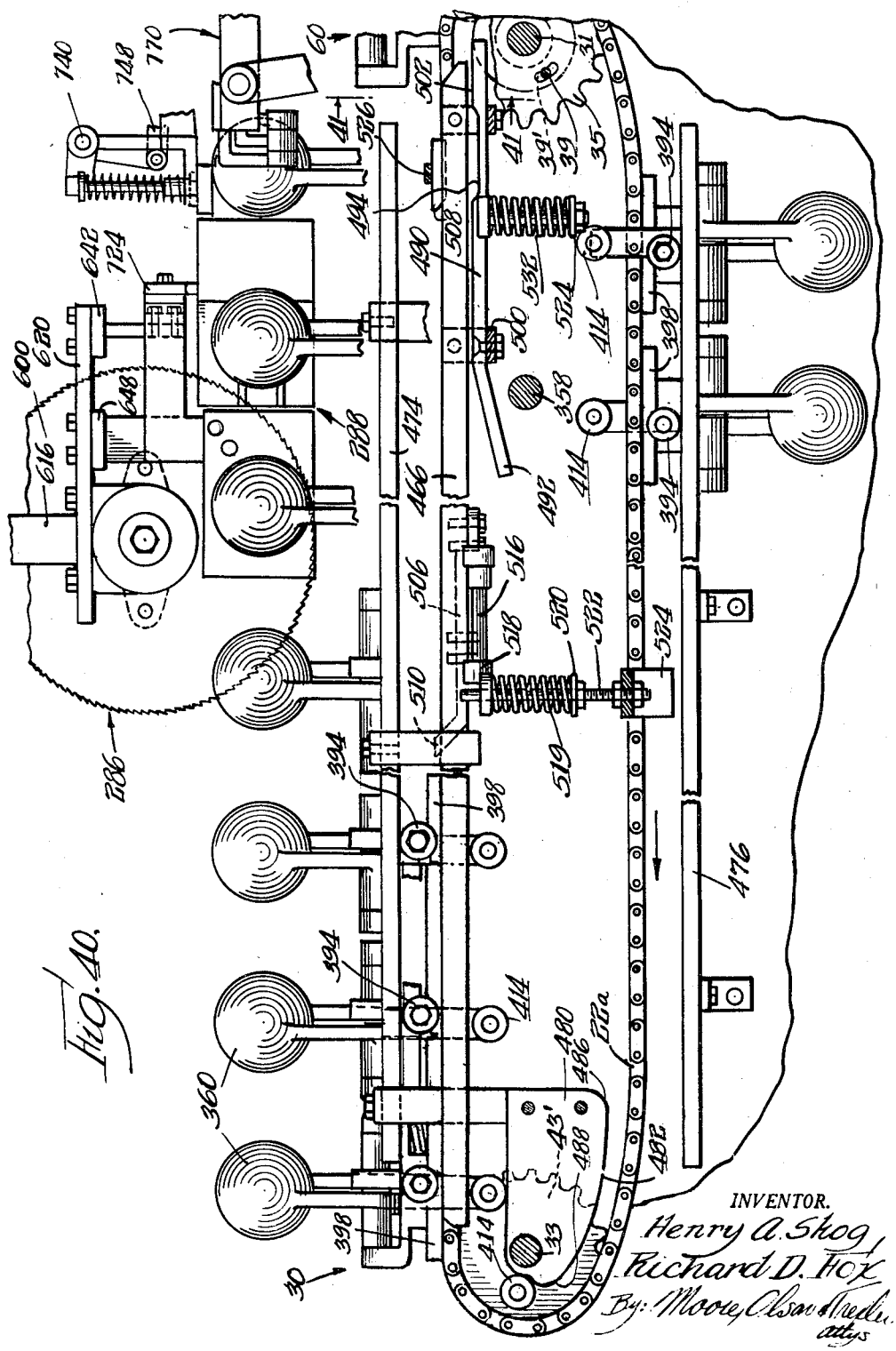

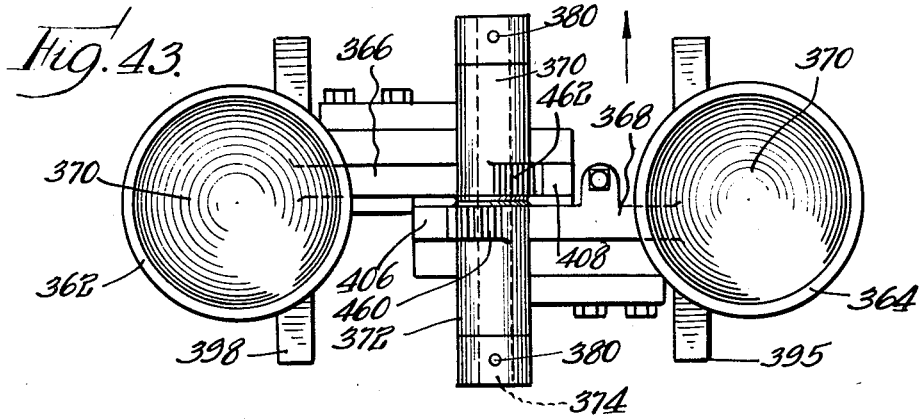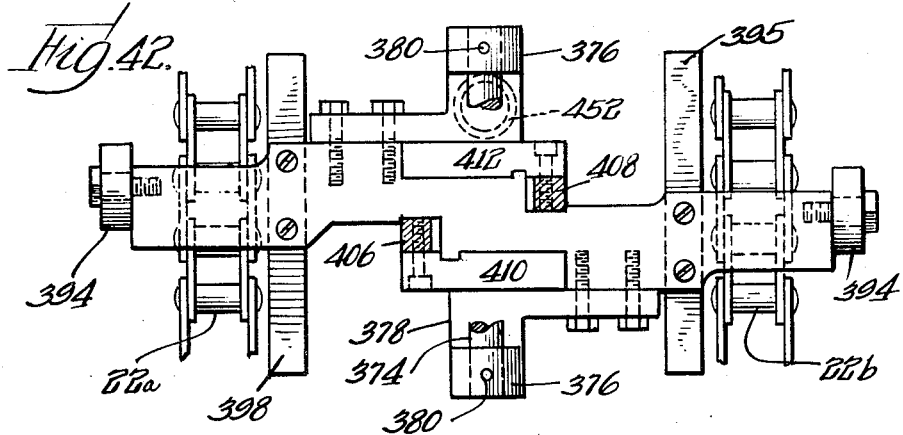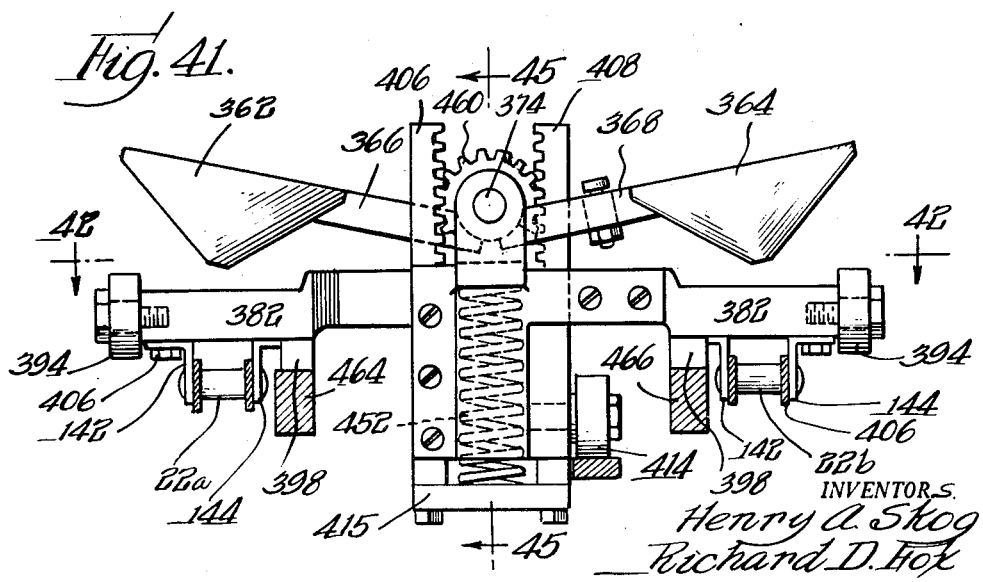

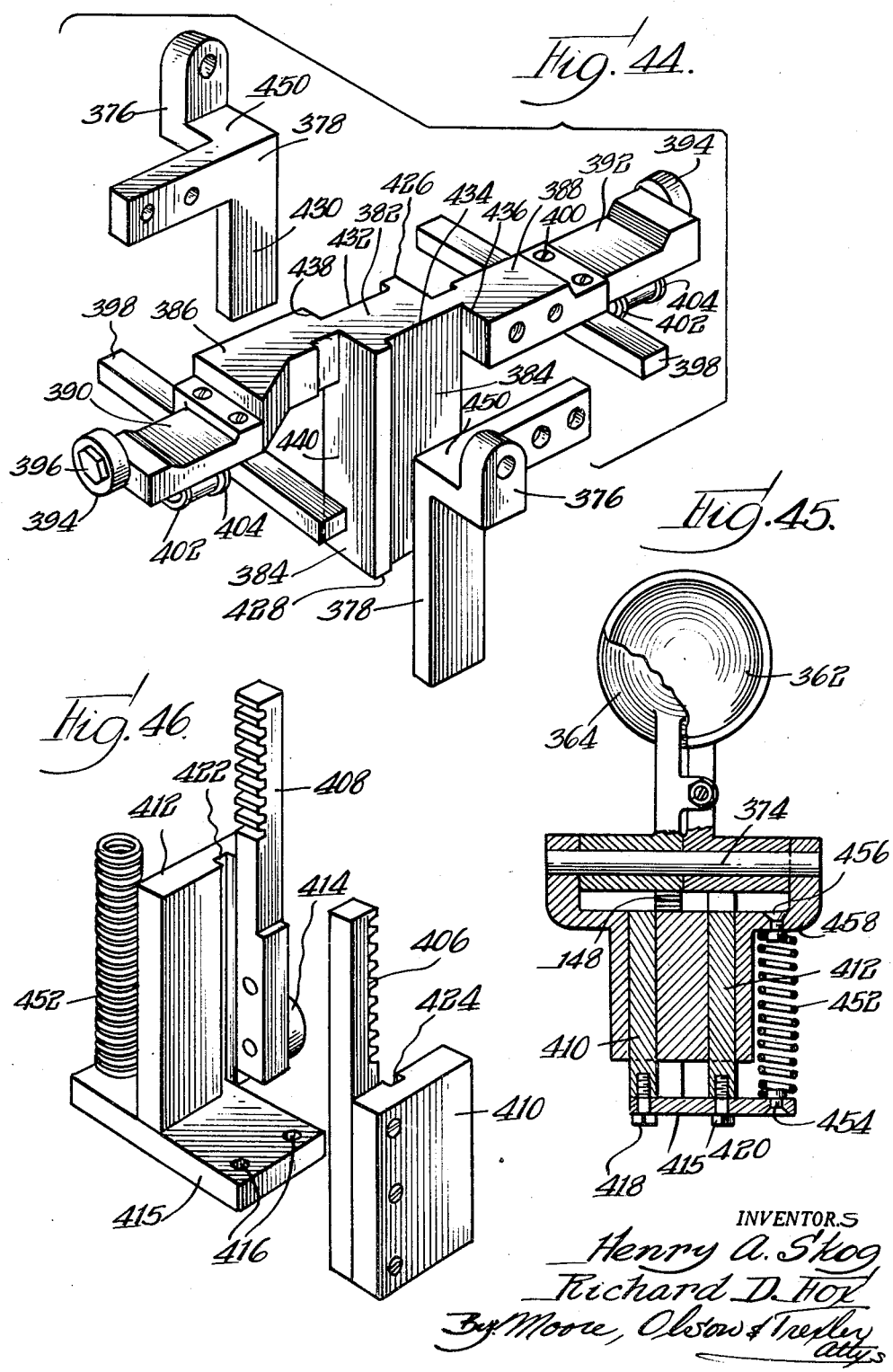

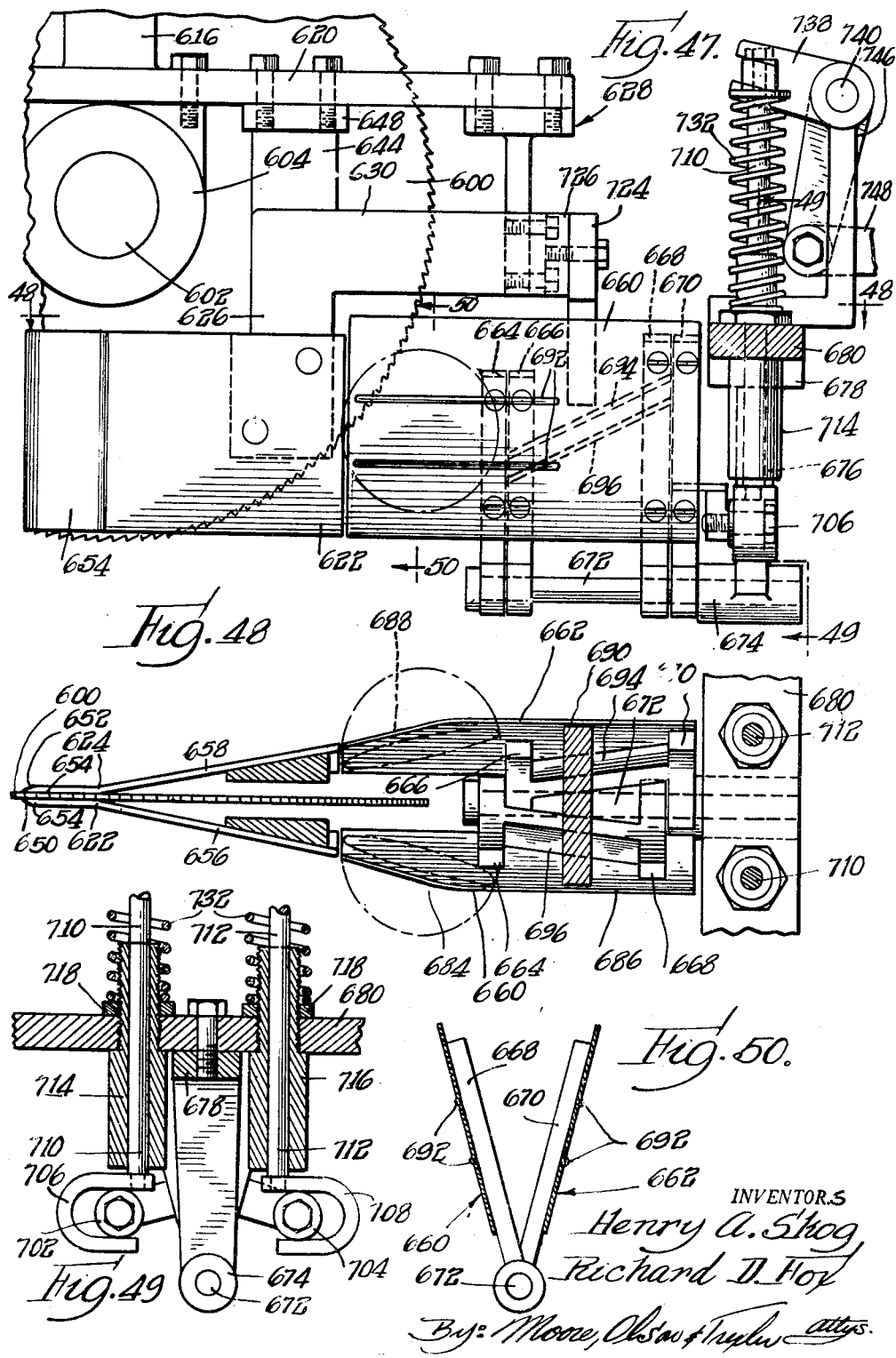

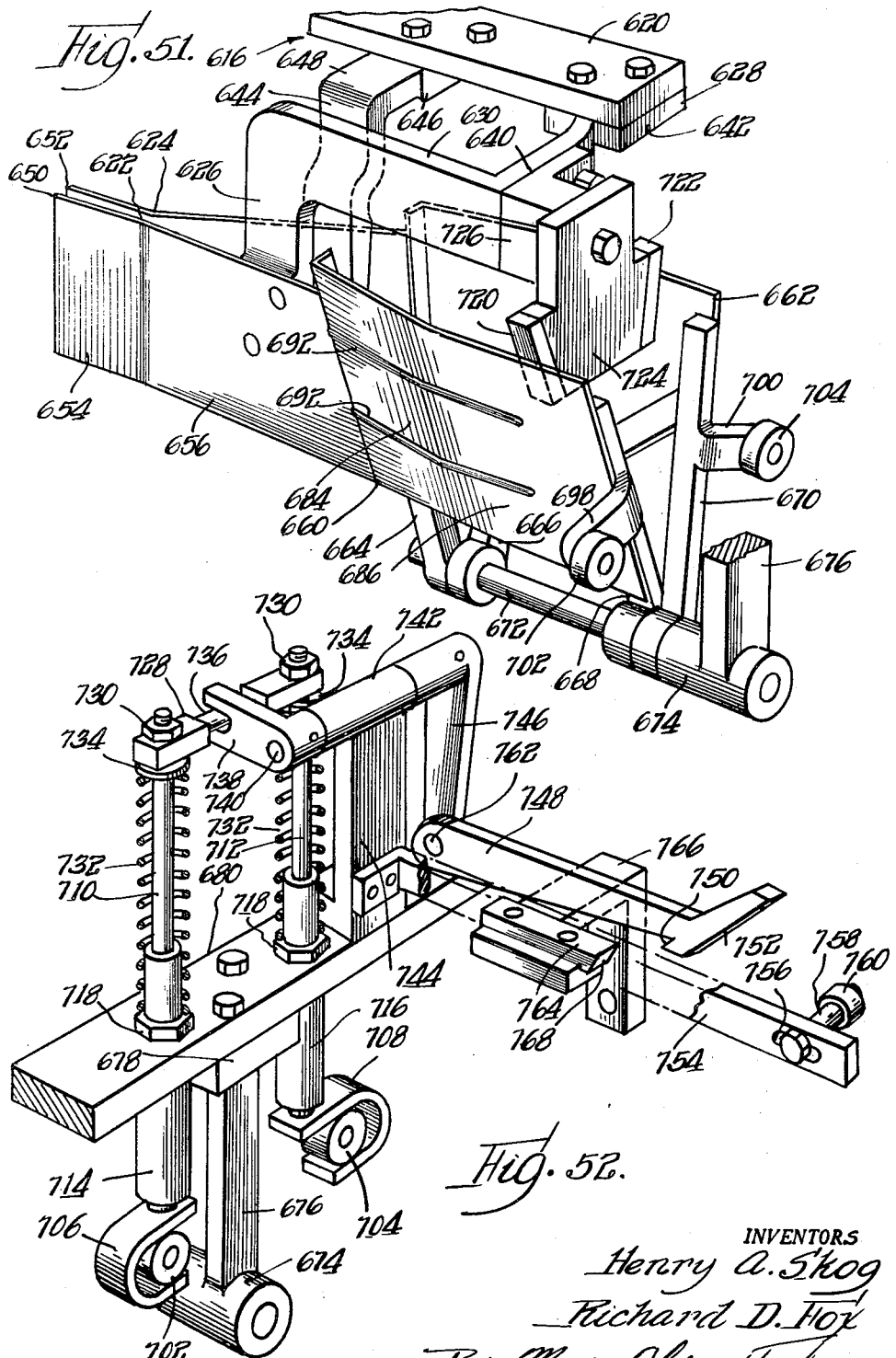

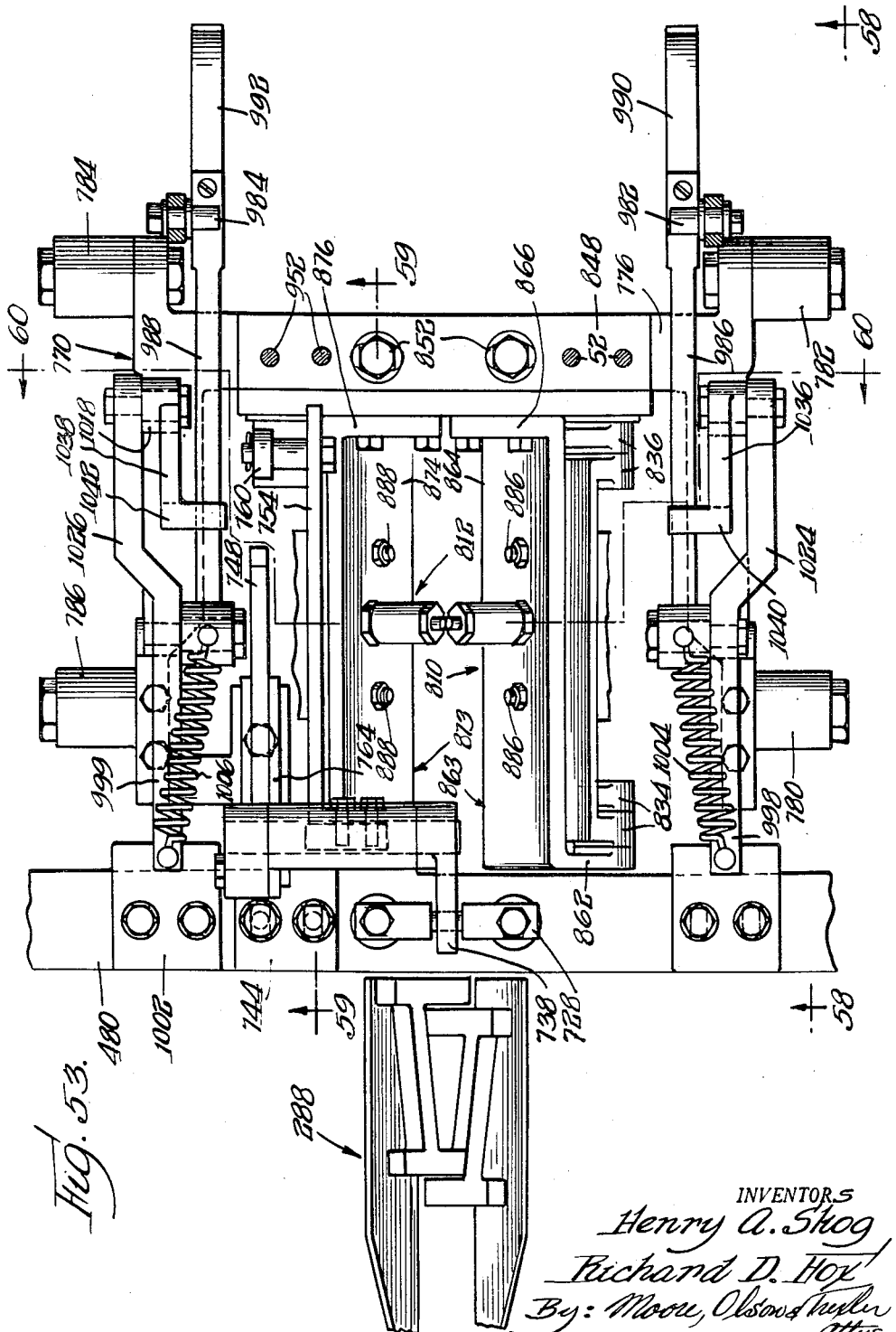

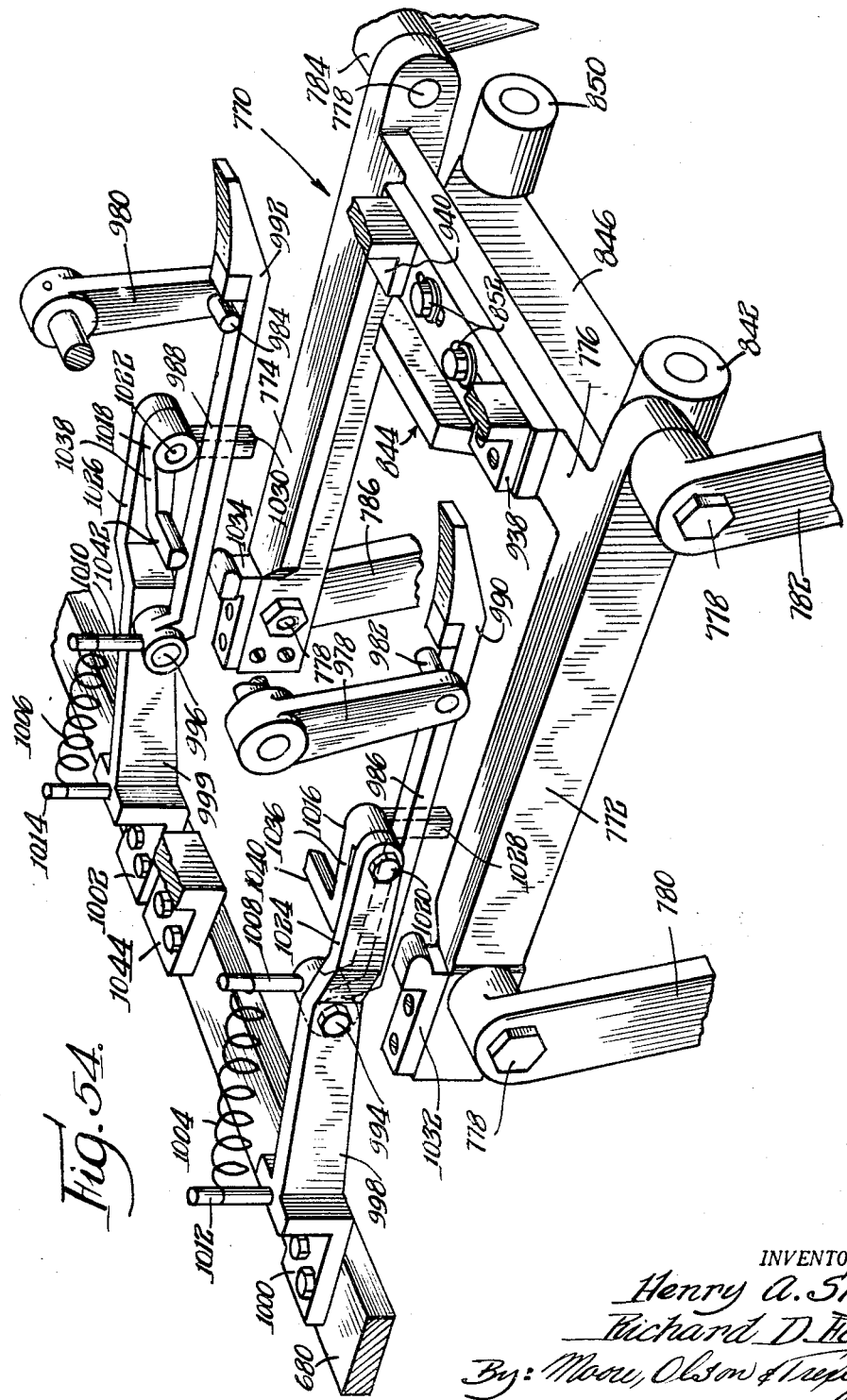

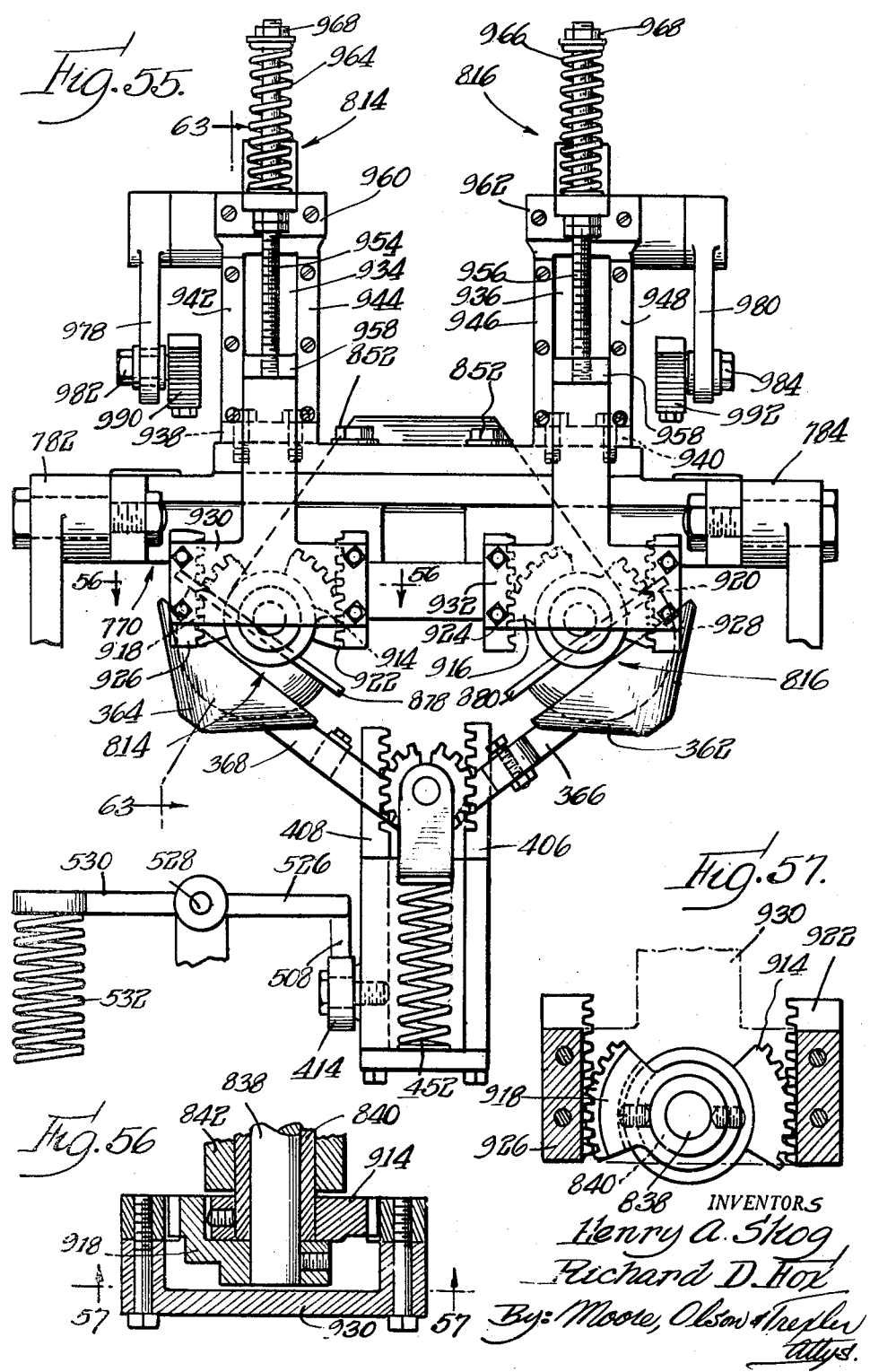

July 26, 1960    H. A. SKOG ET AL    2,946,361
FRUIT ORIENTING, TRANSFERRING, SPLITTING, AND PITTING MACHINE
Filed Feb. 10, 1949    26 Sheets-Sheet 23
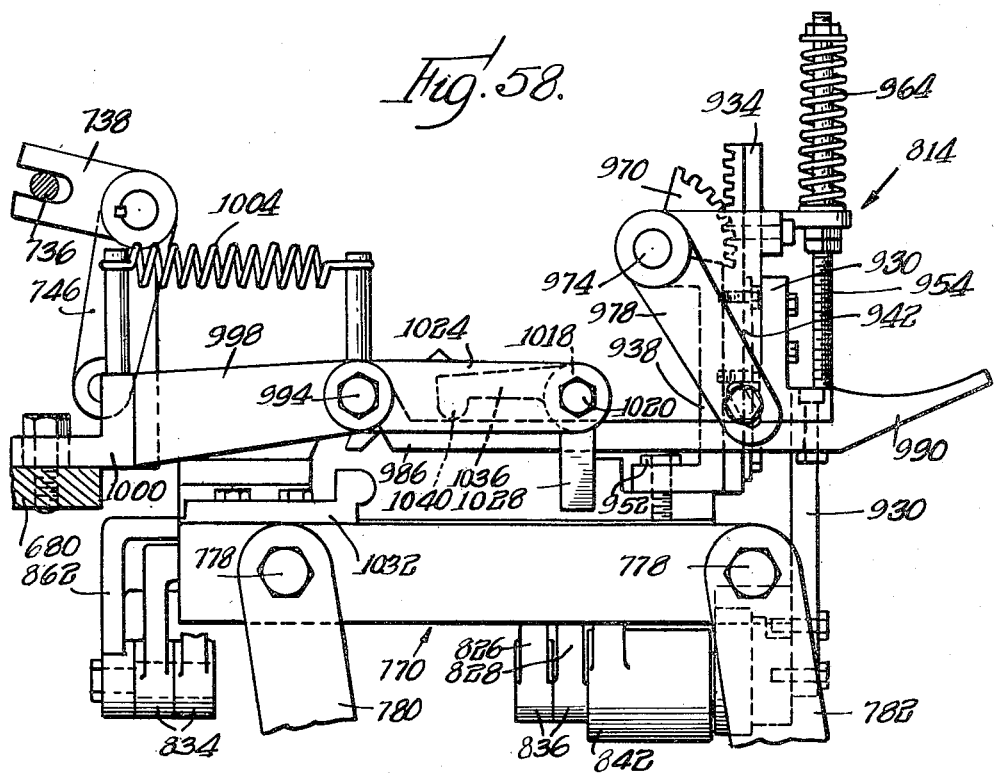
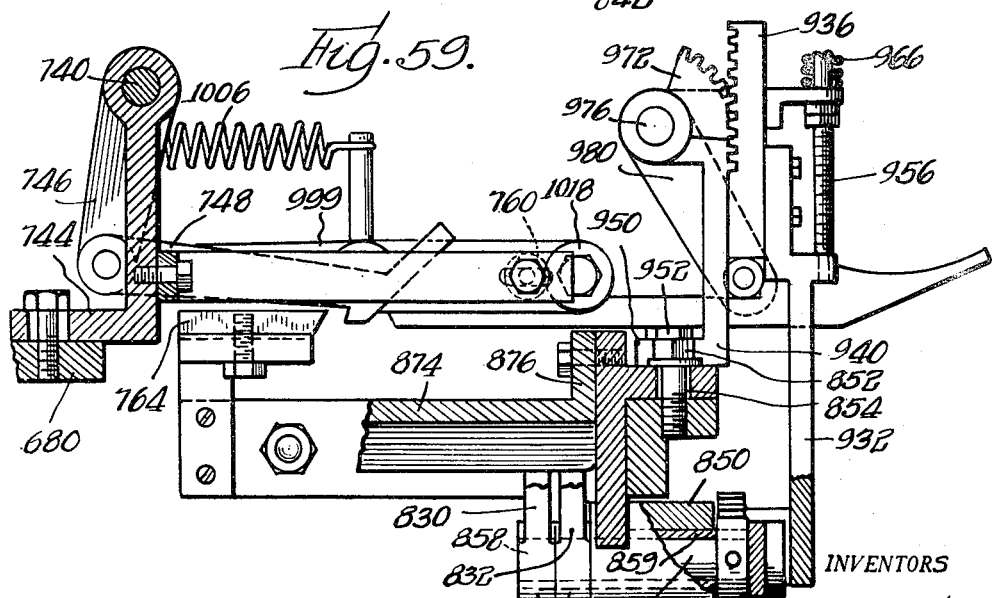
INVENTORS
Henry A. Skog
Richard D. Hoyt
By: Moore, Olson & Trexler

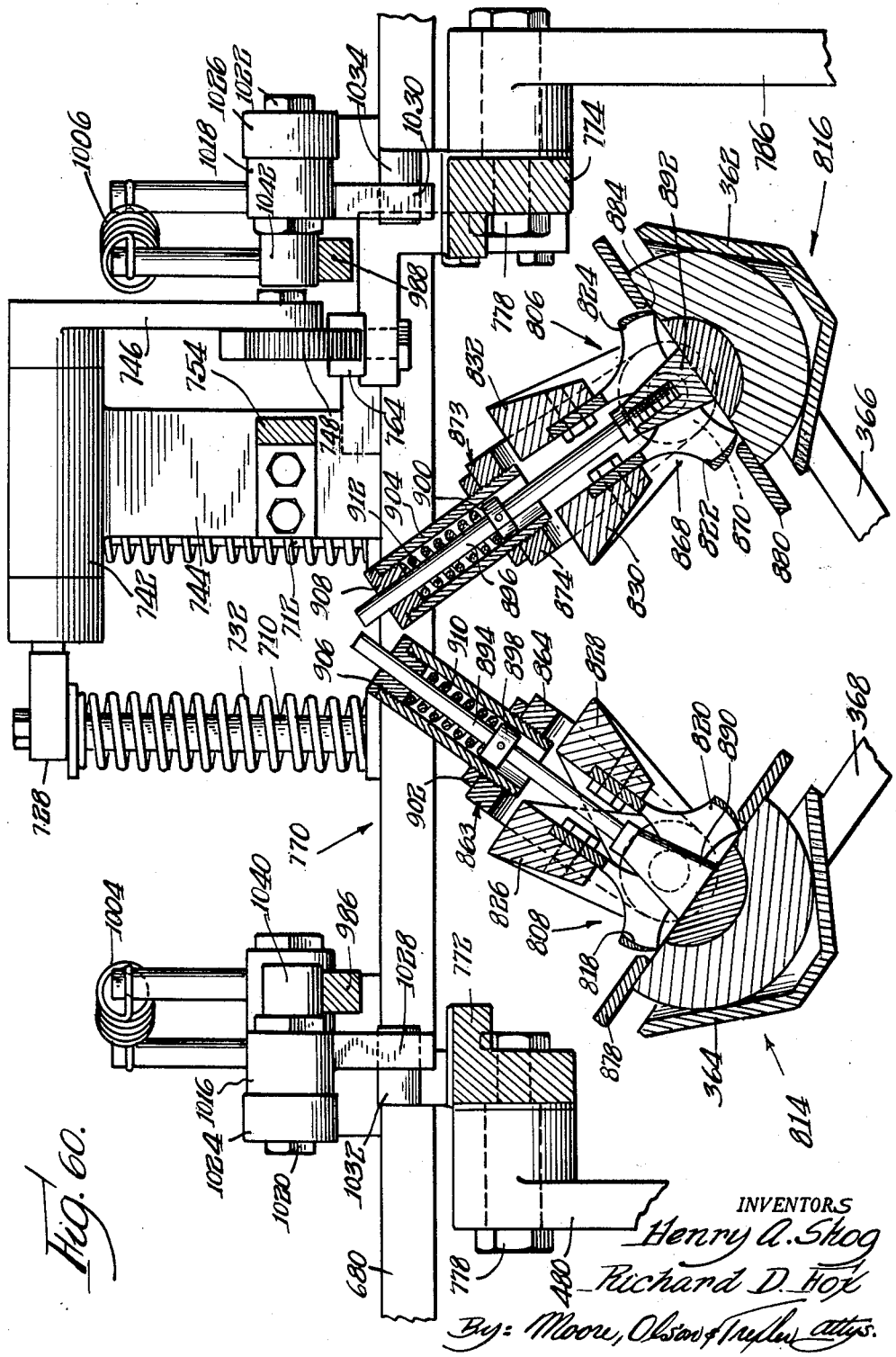

July 26, 1960
H. A. SKOG ET AL
2,946,361
FRUIT ORIENTING, TRANSFERRING, SPLITTING, AND PITTING MACHINE
Filed Feb. 10, 1949
26 Sheets-Sheet 25
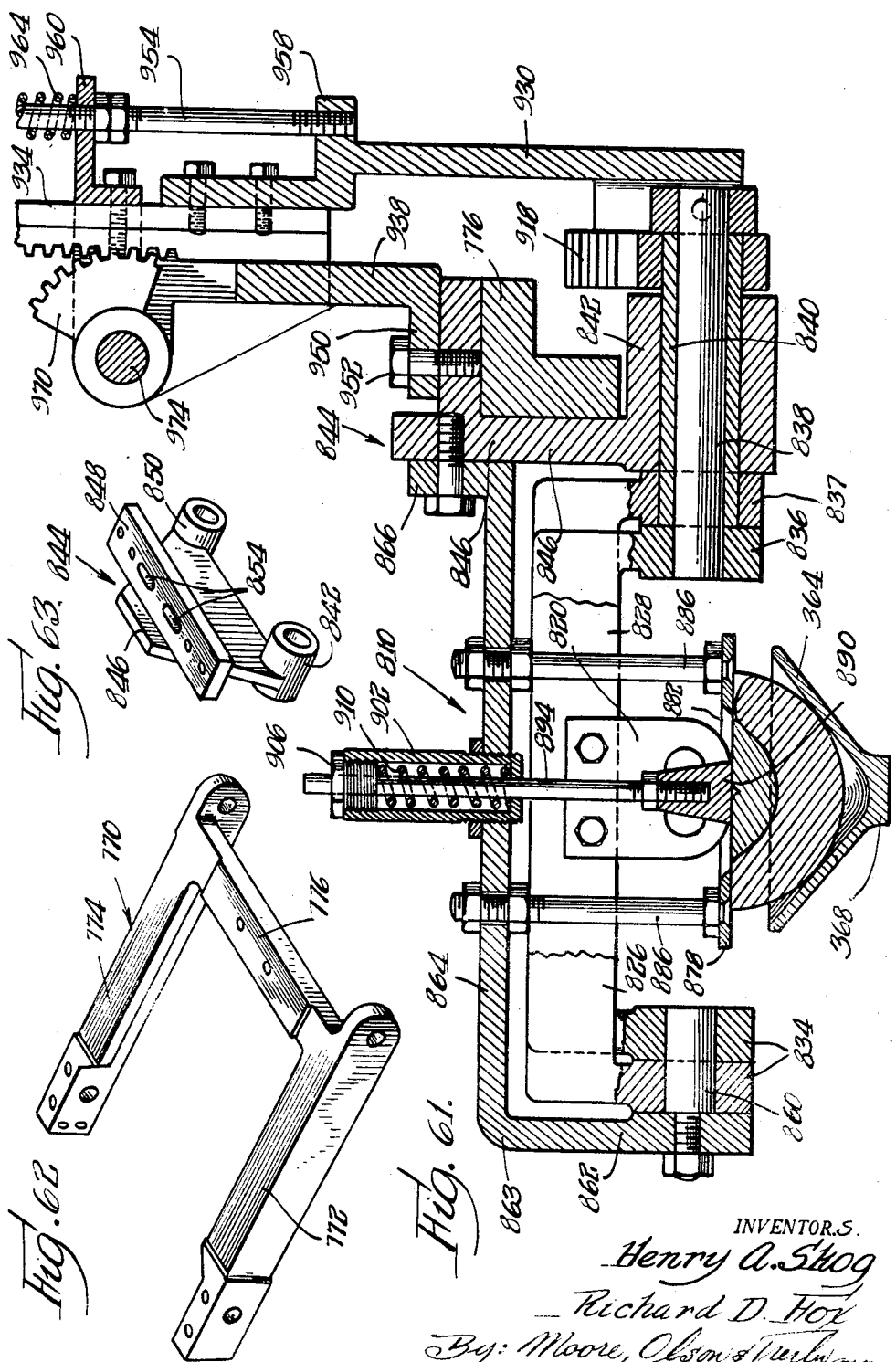
INVENTORS.
Henry A. Skog
Richard D. Fox
By: Moore, Olson & Trexler
attys.

July 26, 1960 H. A. SKOG ET AL 2,946,361
FRUIT ORIENTING, TRANSFERRING, SPLITTING, AND PITTING MACHINE
Filed Feb. 10, 1949 26 Sheets-Sheet 26
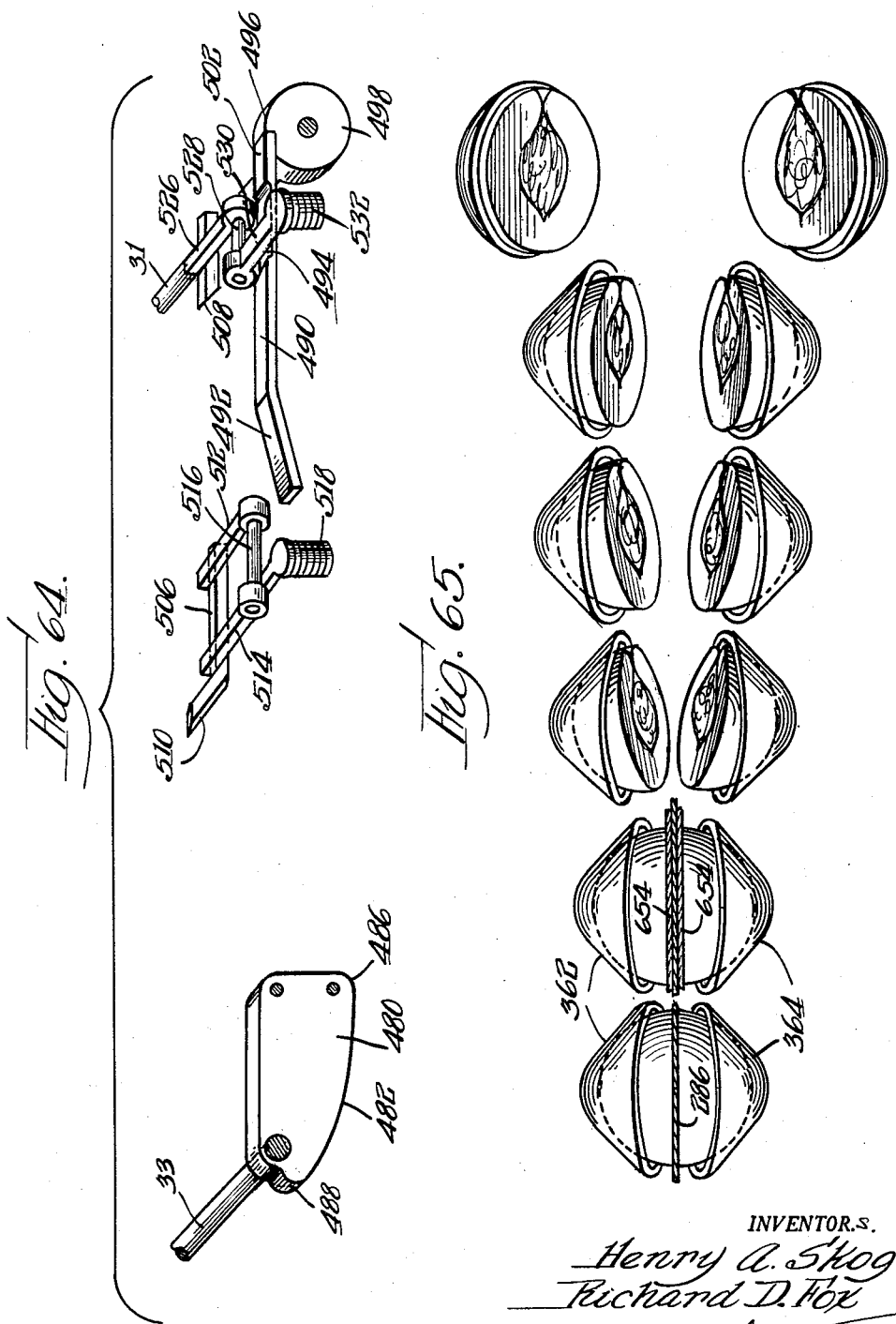
INVENTORS.
Henry A. Skog
Richard D. Fox
By: Moore, Olson & Trexler
attys

UNITED STATES PATENT OFFICE 2,946,361
Patented July 26, 1960

2,946,361

FRUIT ORIENTING, TRANSFERRING, SPLITTING, AND PITTING MACHINE

Henry A. Skog, Olympia, Wash., and Richard D. Fox, Richmond, Calif., assignors, by mesne assignments, to Canning Equipment Co., Olympia, Wash., a corporation of Washington Filed Feb. 10, 1949, Ser. No. 75,602

20 Claims. (Cl. 146—28)

This invention relates to a method and machine for processing fruit.

Among the objects of the present invention is to provide a method and apparatus for feeding peaches one by one from a mass of said peaches indiscriminately arranged, and for causing such succession of peaches to travel continuously in a predetermined path and during such travel to orient each peach to present its stem indent in a predetermined direction and to transfer each such peach to fruit holding devices of an adjacently disposed, continuously operable conveyor in such a manner that the transfer device will operate to feed the transferred peach to the fruit holding mechanism of the second conveyor so that the stem indent of the peach will be positioned in a predetermined manner with relation to agencies operable upon the peach with relation to said stem indent and as the peach is held and continuously conveyed by the second conveyor.

Another object of the invention is to provide a machine and method for causing a succession of peaches to travel in a predetermined path and while travelling to orient each of said peaches to locate the suture plane of each peach in a predetermined plane and to transfer each of said peaches while maintained in said plane to and between holding members on a continuously moving second conveyor which in turn will convey the peach so held to peach splitting and pitting mechanism, the splitting mechanism operating to halve the peach through the suture plane of the peach prior to the pitting operation.

Yet another object of the invention resides in providing a continuously operating conveyor mechanism carrying a series of spaced apart peach supporting means, together with associated mechanism including means for rotating each peach about its own center to align the suture plane of the peach in and with a predetermined plane and to provide transfer mechanism movable congruently with the peach supporting mechanism of the first conveyor and operable to transfer the so oriented peach in said predetermined plane to and between peach holding mechanism of a second continuously moving conveyor wherein the suture plane of the peach while thus held and conveyed is maintained in said plane and carried to peach halving mechanism operable in said plane to sever the whole peach in halves along or substantially along its suture plane.

Yet another object of the invention resides in providing in combination with mechanism for supporting, continuously conveying, and rotating a peach about its center while so conveyed to orient the suture plane of the whole peach and cause it to align with a predetermined plane, and including transfer means and associated mechanism operable to cause relative displacement between the oriented peach and its rotating mechanism permitting the abduction of the oriented peach by the transfer mechanism from said peach supporting mechanism and the conveyance of said oriented peach with its suture plane maintained in said suture plane, to a second continuously movable conveyor having movable peach supporting members between which the so oriented peach is placed in a manner to position the suture plane of the peach in said predetermined plane and thus convey the peach to peach sawing or cutting mechanism operating in said plane for halving the peach through the suture plane thereof.

Another object of the invention resides in a machine for conveying a succession of peaches continuously along a predetermined path while supported upon peach rotating means in such manner that during the continuous travel of the peaches the same are rotated to bring the suture plane of each peach into a predetermined plane, in association with peach transfer mechanism operable congruently to move with each of said succession of continuously travelling peaches and during such movement to abduct each peach from its first peach supporting mechanism and transfer it with its suture plane thus oriented in such predetermined plane to peach holding means of a second continuously moving conveyor which in turn will convey the peach thus oriented to peach halving means operable in said predetermined plane to sever the peach through its suture plane.

Another object of the invention is to provide a mechanism associated with the foregoing combination wherein such mechanism provides means for displacing the peach rotating mechanism simultaneously with the peach being abducted, or slightly thereafter, so as to permit the unrestricted movement of the transfer mechanism in abducting the peach to the second conveyor.

Yet another object of the invention resides in providing, in combination with a conveyor moving in an endless path carrying a series of rotating elements upon each of which a whole peach is supported and rotated about its own center to cause the peach to turn to cause its stem indent to lie in a predetermined position and wherein transfer means is provided movable congruently with each peach while the latter is being oriented, to abduct each peach from its supporting mechanism there being means for automatically causing the peach rotating means to shift away from peach rotating position to an out of the way position to permit the free movement of the peach abducting and transfer mechanism.

Another object of the invention is to provide in association with a continuously moving turret or conveyor, a plurality of spaced apart wheels thereon upon each of which a peach is positioned, there being means for rotating each of said wheels to cause the rotation of each peach about its center to orient the stem indent and/or suture plane thereof during conveyance of the peach, together with means for causing the peach rotating rolls to shift and drop down away from peach rotating position at or subsequently to the time that each peach thus oriented is abducted by transfer mechanism for transferring the oriented peach to a second mechanism operable upon the peach in accordance with the position of the stem indent, or more specifically, in accordance with the suture plane of such oriented peach.

Still another object of the invention is to provide a machine for orienting peaches comprising a continuously operable conveyor movable in an endless path and carrying a series of peach supporting and rotating devices each adapted to rotate a peach about its center to cause the suture plane of the peach to lie in a predetermined plane, and wherein transfer mechanism comprising a series of impaling blades will move congruently with each travelling peach and operable when the suture plane of the peach has been so located, to impale the peach and shift it in such predetermined plane to a second conveyor having means for seizing the peach with its suture plane maintained in such predetermined plane and conveying it to operating mechanism for cutting the peach through the suture plane.

Another object of the invention is to provide mechanism associated with the foregoing, wherein means is provided for automatically shifting the peach rotating means away from peach supporting position to permit the movement of the impaling blade to transfer the peach from the first conveyor to the second conveyor.

Another object of the invention is to provide in combination with the continuously moving turret moving continuously about a horizontal plane, each of said turrets having a series of spaced apart openings therein with respect to each of which is disposed a pair of peach clamping members, and wherein each of the openings in said turret is provided with a radial slot, peach rotating means being associated with each of said openings of the turret and including a rotatable wheel rotatable in said opening in a manner to rotate a peach supported on said wheel to cause the peach to rotate and orient the suture plane thereof into a plane radial of the turret, there being associated peach transfer and impaling means congruent with the turret and including a plurality of impaling blades movable in a plane transverse to the plane of the turret and shiftable through one of the slots of the turret to impale a peach supported upon the rotating means, there being means associated with the turret for causing the peach supporting rotating means to shift from peach supporting position to an out of the way position to permit the impaling blade to move arcuately and carry the peach from oriented position to a spaced peach conveying means which serves to maintain the oriented position of the suture plane and convey the peach to halving mechanism operable in the plane of the suture plane to cut the peach in halves.

Yet another object of the invention resides in the provision of novel peach holding jaws of the second mentioned conveyor which operate to move equal distances to clamp the peach and maintain the suture plane of the peach in a predetermined plane while thus held and conveyed by the second conveyor.

Yet another object of the invention resides in the provision of a novel operating mechanism for synchronously and congruently operating the peach transfer means in timed relation with the continuously movable conveyor and particularly in timed relation with the mechanism for doffing the peach rotating means to an out of the way position to permit the movement of the peach transfer or impaling blade arcuately in a direction radially of the turret as the transfer mechanism moves to the terminal of its congruent movement with the continuously moving conveyor.

Yet another object of the invention resides in the novel mechanism for controlling the movement of the mechanism for shifting the peach rotating mechanism to an out of the way position to permit the movement of the transfer mechanism in a direction radially of or normal to the movement of the continuously moving main turret.

Yet another object of the invention resides in the provision of novel operating mechanism for operating in timed relation with the movable turret, the peach rotating and supporting mechanism, and the mechanism for creating relative displacement between the peach rotating mechanism and the means for holding the peach in oriented position after its stem indent and/or suture plane have been oriented, and the mechanism for abducting the peach from the orienting position to a second peach holding mechanism for conveying the peach thus oriented to subsequent mechanism operable on the peach in accordance with such correctly oriented suture plane.

These and other objects of the invention will be apparent from a perusal of the following specification when taken in connection with the accompanying drawings, wherein:

Figure 2 is a view in elevation of the machine embodying the present invention;

Figure 3 is a top plan view of the machine of Figure 2;

Figure 4 is a fragmentary view in vertical section taken substantially along the line 4—4 of Figure 3;

Figure 7 is a fragmentary view in horizontal section taken substantially along the line 7—7 of Figure 2;

Figure 8 is a fragmentary view in vertical section taken substantially along the line 8—8 of Figure 7;

Figure 9 is an enlarged view in vertical section taken along the line 9—9 of Figure 3;

Figure 10 is a fragmentary view in vertical section taken substantially along the line 10—10 of Figure 2;

Figure 11 is a fragmentary view in horizontal section taken substantially along the line 11—11 of Figure 9;

Figure 12 is a fragmentary view in horizontal section taken along the line 12—12 of Figure 9;

Figure 13 is a fragmentary view in perspective of the mounting support for the orienting wheel and a portion of its drive mechanism;

Figure 14 is an exploded perspective view showing the orienting wheel, spindle and wheel drive;

Figure 15 is a fragmentary, enlarged plan view of the peach receiving and holding means;

Figure 16 is a fragmentary view in vertical section taken along the line 16—16 of Figure 15;

Figure 17 is an exploded perspective view of the fruit receiving and holding mechanism of Figures 15 and 16;

Figure 18 is a view in section taken substantially along the line 18—18 of Figure 15;

Figure 19 is a view similar to Figure 18 showing the proposed grippers and fruit receiving holding means in open position;

Figures 20 to 24 are operation illustrating diagrams taken along position lines at stations 20—20 to 24—24 inclusive of Figures 3 and 7;

Figures 20a to 24a are operation diagrams corresponding to the operation diagrams of Figures 20 to 24 respectively, Figures 25 to 30 inclusive are diagrammatic illustrations exemplary of the manner in which an orienting wheel may operate to orient a peach or like fruit in the machine of Figures 2 to 24a and the cooperative functioning of the fruit receiving and holding means;

Figure 31 is a sectional view taken on the line 31—31 of Figure 32;

Figure 32 is a plan elevational view of the transfer mechanism taken on the line 32—32 of Figure 31;

Figure 33 is a vertical section taken on the line 33—33 of Figure 31;

Figure 34 is a sectional view taken on the line 34—34 of Figure 33;

Figure 37 is a section taken on the line 37—37 of Figure 1;

Figure 38 is a section taken on the line 38—38 of Figure 1;

Figure 39 is a fragmentary view in vertical section taken substantially on the line 39—39 of Figure 38;

Figure 40 is a fragmentary view in vertical section taken substantially on the line 40—40 of Figure 38;

Figure 41 is a fragmentary view in vertical section taken on the line 41—41 of Figure 40;

Figure 42 is a fragmentary view in horizontal section taken on the line 42—42 of Figure 41;

Figure 43 is a fragmentary plan view taken looking down from the line 42—42 of Figure 41;

Figure 44 is an exploded perspective view of the traveling carriage for the fruit holders or cups;

Figure 45 is a fragmentary view in vertical section taken on the line 45—45 of Figure 41;

Figure 46 is an exploded view in perspective of the cup actuating racks;

Figure 47 is a fragmentary view in vertical section taken on the line 47—47 of Figure 38;

Figure 48 is a fragmentary view in horizontal section taken substantially on the line 48—48 of Figure 47;

Figure 49 is a fragmentary view in vertical section taken substantially along the line 49—49 of Figure 47;

Figure 50 is a view in vertical section taken along the line 50—50 of Figure 47;

Figure 51 is a view in perspective of the fruit separating and spreading mechanism;

Figure 52 is a view in perspective and partly in section of the operating mechanism for the spreader blades of the fruit separating and spreading mechanism;

Figure 53 is an enlarged view in horizontal section taken along the line 53—53 of Figure 1 and shows the pitter mechanism in plan view;

Figure 54 is a view in perspective showing the pitter head frame and certain operating mechanisms;

Figure 55 is a view in end elevation of the pitter mechanism and is taken substantially on the line 55—55 of Figure 1;

Figure 56 is a fragmentary view in horizontal section taken along the line 56—56 of Figure 55;

Figure 57 is a fragmentary view in vertical section taken along the line 57—57 of Figure 56;

Figure 58 is a view in side elevation of the pitter mechanism as taken substantially along the line 58—58 of Figure 53;

Figure 59 is a view in vertical section taken substantially along the line 59—59 of Figure 53;

Figure 60 is an enlarged view in vertical cross section taken along the line 60—60 of Figure 53;

Figure 61 is a view in vertical section taken substantially along the line 61—61 of Figure 55;

Figure 62 is a view in perspective of the pitter head frame casting;

Figure 63 is a view in perspective of the pitter mechanism mounting bracket;

Figure 64 is a diagrammatic view in perspective showing cam tracks controlling the positioning of the fruit holder cups as they travel around the upper and lower flights of the conveyor;

Figure 65 shows diagrammatic plan views sequentially illustrating the splitting and spreading of the fruit; and Figure 66 is a diagrammatic layout of the cam for controlling the swinging of the transfer arm.

Figure 1:
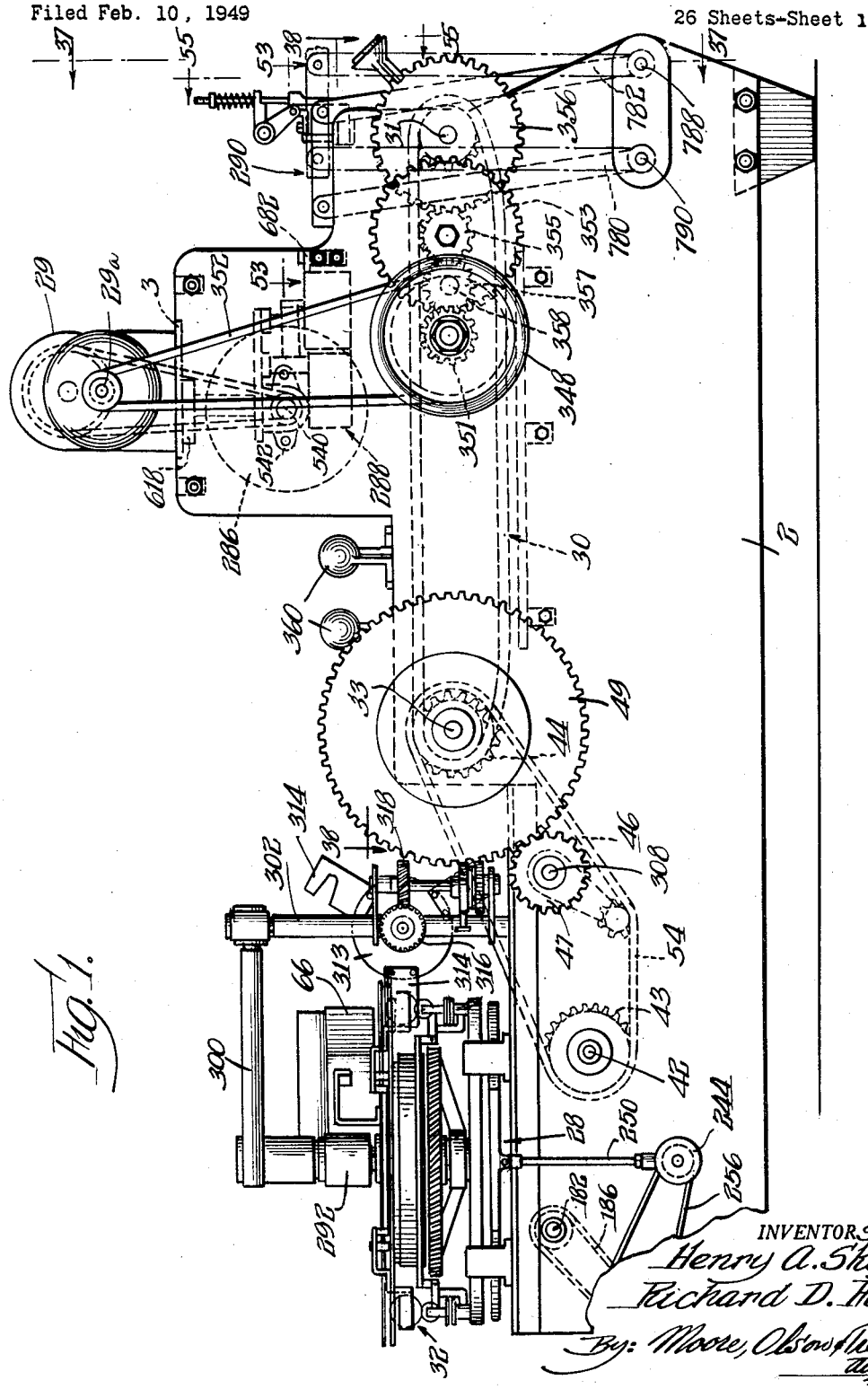
Figure 1 is a side view of the entire machine.

As shown in Figure 1, the machine is a unitary machine, preferably mounted upon a unitary standard. At one end of the machine is located the orientating mechanism and a hopper associated therewith for receiving a quantity of peaches which have preferably been graded as to size so that substantially all of the peaches passing through the machine for one run will be of substantially uniform size. The peaches have previously been passed through a grader which grades for any particular size. This orienting mechanism will receive a succession of peaches from the hopper, the peaches being indiscriminately arranged within the hopper, and will proceed automatically to orient the peaches as to suture plane, will then pass those peaches to a suitable transfer mechanism without disturbing the orientation thereof, which transfer mechanism will then pass the peaches to a continuously operating conveyor forming a part of the combined halving and pitting mechanism also mounted upon this machine. Thus a succession of peaches indiscriminately arranged in a hopper will be continuously fed, one by one, to an orienting machine which will orient each peach as to its suture plane in a manner such that the flow of the peaches is not interrupted, will pass each peach in uninterrupted travel to the transfer mechanism which while maintaining the suture plane orientation of the peach will pass the peach to a continuously operating conveyor which in turn will convey the peach oriented as to the suture plane, lining up the suture plane of the peach with the plane of operation of the saw so that as the peach passes continuously along it will be halved substantially on and parallel to its suture plane whereby to halve or cut the peach and its pit in half. From then on each half peach with its pit will pass to a pitting mechanism which will proceed to pit each half peach, all in a continuous manner. Thus a high speed operation of orienting the peaches and passing them on in a continuous flow to a high speed peach halving and pitting mechanism is provided, all in a single machine. Manifestly the two machines, to-wit the orienting mechanism and the combined conveyor, halving and pitting mechanism with an intermediate transfer mechanism may be formed in two machines juxtaposed but it is preferred, because of the synchronized mechanism for operating the various functions of the two machines, to provide them all in a single foundation and operated by means of synchronized interconnected power mechanism.

A preferred embodiment of the machine as disclosed in the drawings comprises a machine frame, Figures 1 to 8, having side plates 2 and 4 spaced apart by a plurality of cross members such as the cross members 6 and 8, and others not shown. Angle irons 10 and 12 extend longitudinally of the side plates 2 and 4 at the upper ends thereof and like angle irons (not shown) extend longitudinally of the side plates at the bottom thereof to form supporting feet for the machine frame. A stationary, supporting column or shaft 14 is secured in a boss 16 in the cross member 6 and also in a like boss of a similar cross member (not shown) positioned near the bottom of the machine frame.

A platform 18 mounted in any convenient manner upon the side plates supports a combined motor and speed reducer 20 which has a slow speed shaft 22 which drives a plurality of orienting mechanisms 24 and a high speed shaft 26 which drives a fruit vibrator mechanism 28.

A combined motor and gear unit 29 (see Figure 1) operates to drive, through mechanism hereinafter described, the conveyor 30 (see Figure 1) for the pitting and halving mechanism. This conveyor is an endless conveyor and passes about a sprocket shaft 31 and about a spaced sprocket shaft 33. The latter sprocket shaft carries a sprocket wheel 44 about which drives the sprocket chain 46 which passes over the sprocket 43 affixed to shaft 42, see Figure 1, by means of which the motor mechanism 29 drives shaft 42 whereby to operate also the orienting turret now to be described.

Figure 5:
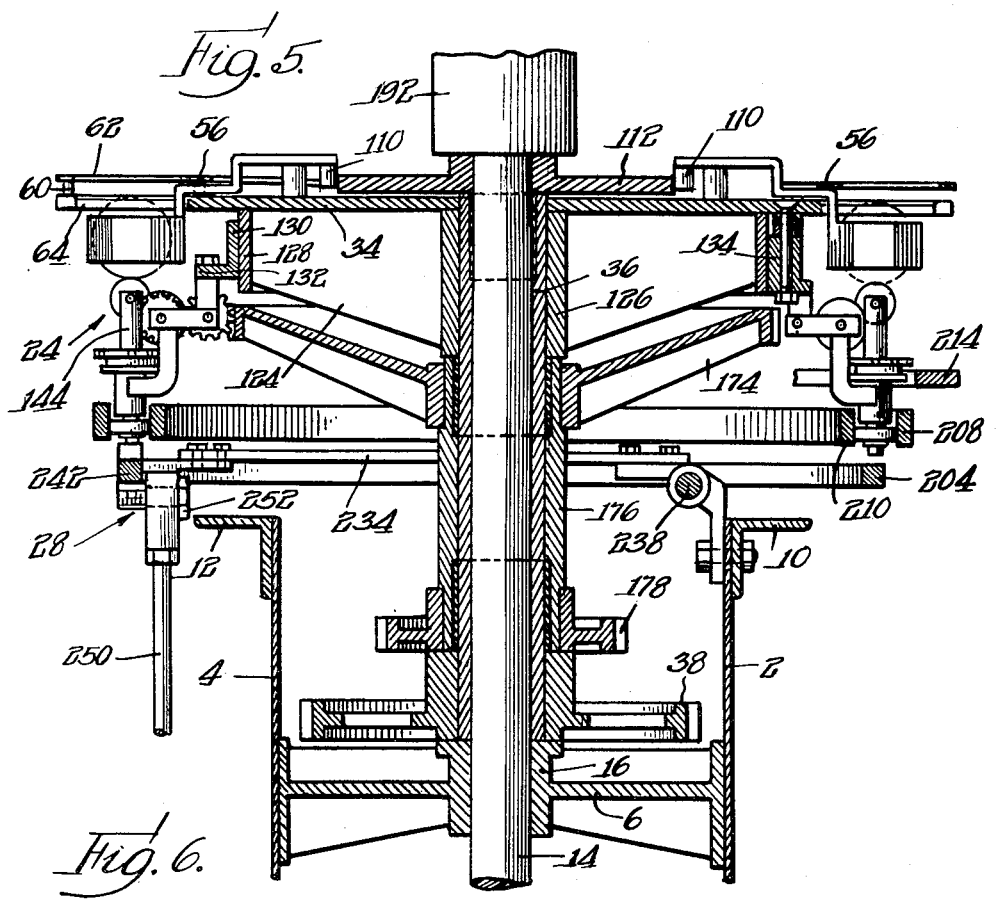
Figure 5 is a fragmentary view in vertical section taken substantially along the line 5—5 of Figure 3.
Figure 6:
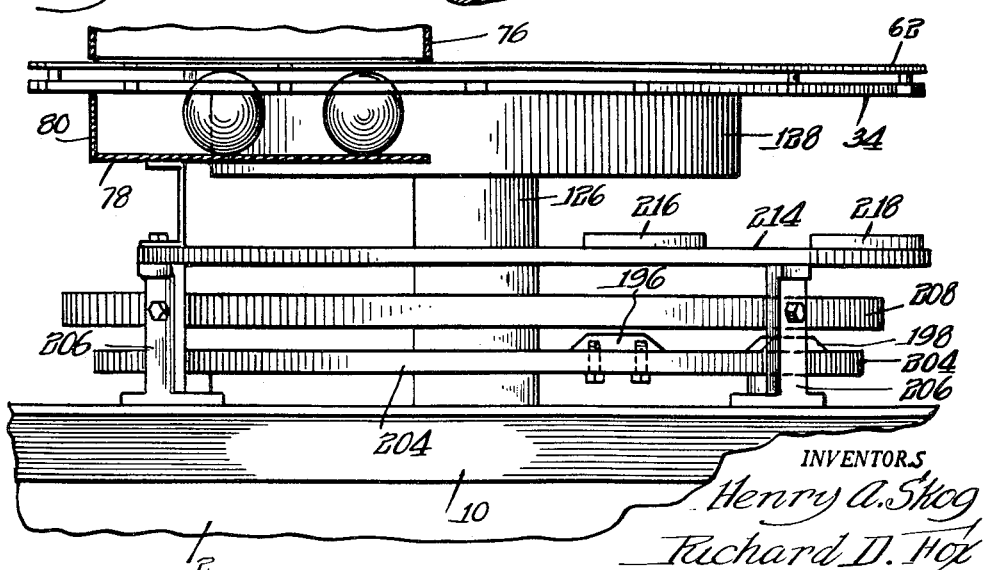
Figure 6 is a fragmentary view partly in elevation and partly in section taken along the line 6—6 of Figure 2.

The fruit conveying means 32 for the orienting mechanism comprises a ring turret and disk 34, see Figures 2, 4 and 6, keyed to a sleeve 36, see Figure 5, journalled on the column or shaft 14, the sleeve being keyed at its lower end to a spiral gear 38 which is driven by means of gear 40 on shaft 42. Thus the turret or disc 34 is driven by the motor 29. A ring 56 is mounted in vertically spaced relation on the main turret disk 34, see Figure 2, as by screws 58 and spacing sleeve 60.

The ring 56 overlies the ring of the main turret disk 34 as illustrated in figures 2 and 5, and is provided with a plurality, herein shown as fifteen, of apertures 62 preferably circular and of a diameter sufficient to permit ready passage therethrough of peaches of the largest size which it is desired to process, and particularly to orient by means of the present machine. The openings or apertures 62 are equally and arcuately spaced around the ring 56. The main turret disk 34 is provided with a similar series of openings or apertures 64 also equally and arcuately spaced around the disk and vertically aligned with the apertures 62 in the ring 36. Fruit is fed to the ring 56 and the turret disk 34 from a hopper 66 or other bulk container, or from a suitable bulk conveyor, from which the peaches roll down chute 68 having above the ring 56 and the turret disk 34 an open bottom or arcuate slot and side walls 70, 72, 74 and 76.

The open bottom or arcuate slot in the bottom of the chute allows the peach to roll from the chute 68 onto the surface of the ring 56 and hence to fall through an opening 62 as it passes between the side walls 72 and 76 and therefrom to pass through an opening 64 in the main turret disk onto an arcuate plate 78, see Figure 9, having an outer arcuate wall 80, see Figure 6, and into fruit receiving or holding means or grippers 84, see Figure 3, of which there is a plurality of sets corresponding to the number of openings in the ring 56 and the main turret disk 34.

Each fruit receiving or holding means or grippers comprise a pair of generally V-shaped clamps 86 and 88, best seen in Figures 15 to 19. The grippers 86 and 88 are formed integrally with arms 90 and 92 mounted by pivot bolts 94 and spacing sleeves 96 on the main turret disk 34. The arms 90 and 92 are formed with downwardly offset portions 98 which pass between the ring 56 and the turret disk 34 and are also formed with dependent portions 100 joining the V-shaped clamps 86 and 88 to the arms 90 and 92 and passing through an opening 64 in the turret disk. It should be noted that the openings 64 in the turret disk are formed with slots 102 to receive the dependent portions 100 when the clamps 86 and 88 are moved to fully opened positions. Arms 90 and 92 are formed with interengaging teeth or gear segments 104 and 106 to cause the arms 92 to move simultaneously in the opposite direction when the arm 90 is actuated.

The arm 90 is provided with an integral arm portion 108 extending inwardly from the mounting of pivot bolt 94 and provided at its inner end with the cam follower or roller 110 riding upon the surface of a circular cam 112 pinned to the stationary column or shaft 14. The arms 90 and 92 are interconnected and urged toward each other by a spring 114 secured at one end to a pin 116 carried by the arm 90 and the other end to a pin 118 carried by the arm 92. The spring 114 therefore urges the clamps or fruit grippers 86 and 88 to closed position and they are moved to open position by the stationary cam 112 as the grippers move about their circular path with the turret disk 34. The inner surfaces 120 and 122 of the proposed clamps or grippers 86 and 88 are inclined or tapered, as best seen in Figures 18 and 19, for purposes which will presently appear. The V-shaped character or formation of the grippers or clamps enables the fruit grippers or clamps to centralize each peach radially of the turret.

A wheel-like member 124, Figure 5, has a central hub portion 126 surrounding the sleeve 36 and has a ring flange 128 abutting and depending from the turret disk 34. The wheel-like member 124 is secured to the sleeve 36 or to the disk 34 for rotation therewith. A ring 130 having an annular flange 132 at its lower end is mounted on the ring flange 128 and forms a mounting for the orienting mechanisms 24, which are equal in number to the number of openings, namely fifteen, in the ring 56 and the main turret disk 34. Ring 130 is provided with annularly spaced axially extending bosses 134, Figures 5 and 10, receiving mounting bolts 136 by which the ring is adjustably secured to the turret disk 34. A spacing member or members 138 are interposed between the disk 34 and the bosses 134 to adjust the orienting mechanisms vertically with respect to the turret disk 34 and the fruit receiving means or grippers 86 and 88, the adjustment being accomplished by substituting for the spacing member or members 138 a like member or members of different thickness.

Each orienting mechanism 24 comprises an orienting member or wheel 140 which is relatively small in diameter, for example, from one and three-eighths inches to one and three-quarters inches, in relation to the size of the peach, or other like fruit, as illustrated in Figures 25 to 30.

As shown in Figures 20 to 24a the wheel 140 is positioned within a slot 142 of a spindle 144 and journaled on a cross pin 146 press fitted or otherwise secured to the spindle 144. A Geneva gear 148 and a Geneva lock plate 150 are secured to the spindle 144, the Geneva lock plate 150 having four equal arcuate lock surfaces 152. The reduced lower portion 154 of the spindle 144 is journaled in an apertured boss 156 of a supporting unit 158, best seen in Figure 13. This supporting unit may comprise a U-shaped bracket 160 bolted to the annular flange 132 of the annular ring 130, bracket 160 having secured to it spaced arms or bars 162 and 164 to which is secured or with which is integrally formed a bracket 166 providing the vertical spindle journaling boss 156. The depending arms of the bracket 160 also form the mounting support and journals for a shaft 168 to which is secured a spiral pinion 170 and a gear 172, see Figure 9.

The spiral pinion 170 meshes with and is rotated by a large spiral gear 174, see Figure 5, keyed to sleeve 176 concentric with the column or shaft 14. Sleeve 176 has keyed to its lower end a spiral gear 178 driven by a spiral pinion 180, see Figure 2, on a shaft 182, journaled in suitable bearing brackets (not shown) secured to the side plates 2 and 4. The shaft 182 is driven by the slow speed shaft 22 of the combined motor and speed reducer 20 as by means of a sprocket 184 on the shaft 22, a chain 186 and a sprocket 188 on the shaft 182.

Gear 172, Figure 11, meshes with a gear 190 secured to a shaft 192 journaled in the forward ends of the arms 162 and 164. A drive spool 194 of "hour glass" form is secured to the shaft 192 for rotation thereby and its concave surface, which is concentric to the axis of rotation of the orienting wheel 140 when the wheel contacts the driving spool is adapted frictionally to rotate the orienting wheel. It should be noted that the horizontal distance between the vertical planes through the axis of rotation of the orienting wheel and the axis of rotation of the driving spool is less than the sum of the radius of the wheel and the spool when the wheel is perpendicular to the spool axis and that the horizontal planes through the respective axes are vertically spaced so that the orienting wheel engages the surface of the driving spool at the point above the horizontal plane through the spool axis. The orienting wheel is automatically and at desired times or periodically raised out of driving engagement with the drive spool 194 and while out of engagement is revolved or rotated about the axis of the spindle 144, i.e., about a vertical axis. This disengagement of the wheel or spool is accomplished by suitable wheel raising mechanism or means, in the form of cam blocks 196, 198, 200 and 202, best seen in Figures 6 and 7, with the blocks having inclined beveled end portions and being bolted to mounting ring 204 fastened to and supported upon brackets such as 206 fastened to the longitudinal frame bars 10 and 12.

The spindle 144 of the orienting mechanism is of such length that the bottom end of its reduced portion 154 terminates above the mounting ring 204, as illustrated in Figure 9. When the spindle is carried, by the turning of the turret, to one of the cam blocks the lower end of the spindle engages the leading beveled end of the cam block and is thereby raised, as illustrated in Figure 24. Circular guide means for the spindles of the plurality of orienting mechanisms as they are revolved by the turret about the axis of the column or shaft 14 is provided by a pair of circular tracks or rings 208 or 210, best seen in Figures 5, 7 and 9. These rings are mounted on the spaced vertical arms 212 of the brackets 206, Figure 9. The outer arm of the brackets 206 also supports, in vertically spaced relation to the track 208, a Geneva lock ring 214, best seen in Figures 7 and 9. Geneva movement actuating or driving gear sectors 216, 218, 220 and 222 are supported in angularly spaced relation on the Geneva lock ring 214, Figure 7. Each sector 216, 218 and 220 is provided with two teeth on its inner surface to engage the teeth of each Geneva gear 148 as the orienting mechanisms are brought thereto by the rotation of the turret.

The two teeth of each Geneva drive sector cause the spindle of each orienting mechanism to be rotated through an angle of ninety degrees. The Geneva drive sector 222 is provided, however, with only one tooth, as shown in Figure 7, and this sector therefore rotates the spindle of each orienting mechanism only through an angle of forty-five degrees for purposes which will presently appear.

Means is provided for holding each spindle from accidental rotation around its vertical axis when the plane of rotation of the orienting wheel extends radially of the turret. This means preferably comprises a flat spring 224, Figures 12 and 13, secured to an upstanding arm of the bracket 166 and provided with a V-shaped hook 226 at its outer end to engage a corner of the Geneva lock plate 150 and thereby prevent accidental rotation of the spindle 144.

The spindles of the orienting mechanisms are turned about the vertical axis not only by the Geneva drive sectors 216 to 222 but are initially turned to position as shown at station 21—21 in Figure 3 and as illustrated in Figure 21, by the Geneva locking ring 214. For that purpose the Geneva locking ring is formed at its leading end with a radially reduced or narrower portion 228, Figure 7, merging into the thicker portion by a curved camming surface or portion 230 which is adapted to engage a corner of the Geneva lock plate 150 of each orienting mechanism as will be evident from Figures 20a to 21a to cause the lock plate, and hence the spindle, to turn about a vertical axis to the position as shown in Figure 21a in which the curved locking surface 152 of the lock plate glides along the inner vertical edge 232 of the locking ring so that the ring holds the lock plates, and hence the spindles, against accidental rotation. It will of course be evident that the locking surface 152 of the locking plates have the same radius of curvature as the locking edge 232 of the locking ring.

As the continuously turning turret rotates the peach between any pair of grippers 86 and 88, the peach is carried continuously in succession through positions or stations 20—20, 21—21, 22—22, 23—23, 221—221 and 24—24 as illustrated in Figures 3 and 7. While the fruit is thus being conveyed through this series of positions or stations it is, as will be hereinafter described more particularly, oriented as to stem indent and as to suture plane or the long axis of the stem indent.

After the fruit has been carried past position or station 24—24, Figures 3 and 7, the orienting wheel may, for one reason or another, not be fully seated to its maximum depth in the stem indent, or in some few instances, the orienting wheel may be slightly cocked or slightly out of alignment with respect to the long axis of the stem indent. In order to cause the wheel to enter into the deepest position of the cavity, there is provided the peach vibrating mechanism 28. This vibrating mechanism 28, best shown in Figures 2, 5, 7 and 8, comprises a pair of frame bars 234 and 236 pivoted at their inner ends on a common shaft 238 held in brackets 240 bolted to the side frame plate 2. As shown in Figure 7, the track or ring 204 which supports the spindle raising blocks 196, 198, 200 and 202 is cut away between a pair of the brackets 206 and a vibratable ring sector 242 of the same radius as the ring 204 is inserted and is bolted as at 243 to the outer ends of the arms 234 and 236 of the vibrating mechanism and bridges the gap between the ends of the ring 204. The vibratable sector 242 is vibrated, substantially vertically, by an eccentric 244 secured to a shaft 246 mounted on a suitable bracket 248 bolted to the side frame plate 4. A connecting rod 250 connects the eccentric 244 to a pivoted stud 252 bolted to the ring sector 242. The shaft 246 is provided with a speed adjustable pulley 254, driven by belt 256, in turn driven by a pulley 258 on high speed shaft 26.

The track 210 is bent inwardly and angularly at 211 and joins the central portion at 211a to continue around in a circular path around the central pedestal portion 14 to terminate at a point 211b. At this point the orientating mechanism swings downwardly about the pin 168 under the action of gravity, as shown in Figures 2 and 31, and the roller 155 will contact the inner face 211c of the track which will prevent the orientating mechanism from further downward swing. In this position it will clear the path of rotation of the impaling blades of the transfer mechanism during the intermittent swing of the latter as hereinafter described. Upon continued rotation of the turret the portion 211c will progressively and gradually force the wheel and the orientating roller structure upwardly to vertical position as shown in Figure 9. This will occur at the point 211d, all as shown in Figure 7.

The operation of the machine to accomplish rotation of peaches, or like indented and seamed fruit, as to indent and suture plane, is as follows: The peaches are graded to a general size and are dumped or delivered indiscriminately into the hopper or chute 68. From this hopper the peaches roll down the chute, passing from the chute onto the surface of the continuously rotating ring 56, the peaches being confined against any substantial arcuate movement by the upstanding side walls 70, 72, 74 and 76 of the chute or hopper. As each opening 62 in the ring 56 passes beneath the open bottom of the chute, a peach will fall through the opening and through the aligned opening 64 in the continuously rotating main turret disk 34 to a position as shown in Figure 9 on the stationary arcuate plate 78, the fruit being received between a pair of the open clamps or grippers 86 and 88. The peach rolls or slides along arcuate plate 78 until it reaches the end thereof and rolls therefrom onto the continuously travelling orienting wheel 140 which, at that time, is positioned radially of and traveling with the turret and is in rotatable driving engagement with its driving spool 194. At this time the peach passes position 20—20, as illustrated in Figures 3 and 7, and the parts of the irienting mechanism operate as is illustrated in Figures 20 and 20a.

Just prior to the arrival of the orienting mechanism at position 20—20, the cam roller 110 passes a short cut-out section 260 in the surface of the stationary control cam 112, as shown in Figure 3, and the clamps or grippers are momentarily closed to centralize the peach with respect to the orienting wheel and are then opened as the cam passes out of the notch 260 so that the peach is allowed freely to roll under the action of the orienting wheel, the clamps or grippers being spaced apart or opened sufficiently so that they impose no substantial restriction on the free turning of the peach with the orienting wheel and the peach is substantially entirely supported only by the orienting wheel. The clamps or grippers thereafter serve during the orienting operation merely to limit the tilting of the peach on the wheel and to prevent displacement of the peach out of driving engagement with the wheel. The V shape of the opposed clamps or grippers insures this correct centralizing of the peach on the orienting wheel.

The rotating orienting wheel causes the peach to rotate and if the indent is in the plane of the wheel, the indent will very quickly reach the wheel and the peach will therefore drop down on the wheel to the extent that the wheel penetrates into the stem indent. If the indent not only registers with the wheel, but the suture plane indent of the peach also aligns with or lies in or registers with the plane of the wheel, the peach will of course be very quickly turned so that not only does the wheel penetrate the stem indent, but is also aligned with the long axis thereof, and the wheel will accordingly penetrate the maximum amount radially of the peach and into the stem indent. It is very important for this purpose that the wheel be relatively small in diameter as compared with the peach or like fruit to be oriented.

For orienting peaches the wheel should be approximately 1⅜ inches in diameter, ¼ inch in width and with an arcuate edge surface of 11/16 of an inch. Applicants have found that a wheel of that size is sufficiently large to rotate the peach and small enough so that when it enters the stem indent crosswise of the long axis of the stem indent, the steep sides of the indent crosswise of the long axis thereof will prevent further turning of the peach as the wheel continues to rotate, and furthermore, that such a wheel is the proper size to enter deeply into the indent on a line with the long axis thereof, which coincides with the suture plane of the peach, so that the peach will not be further rotated as the rotation of the wheel continues after the suture plane has been located.

The elongated edge and plane side surface of the wheel will, in cooperation with the abrupt sides of the stem indent crosswise of its long axis, tend to keep the suture properly aligned with the wheel even though the peach may tilt somewhat on the wheel. The peach may not, of course, be originally received on the orienting wheel with its indent or suture plane lying in the vertical plane of the wheel; the peach may fall thereon to any position. If the peach falls onto the orienting wheel with the long axis of its indent in a plane normal to the wheel plane, as illustrated in Figure 5, the continued rotation of the wheel in its original position radially of the turret will not serve to orient the peach. Accordingly, as the turret continues to revolve, the peach moves to position 21—21, Figures 3, 7 and 21. As it moves to this position the Geneva lock plate 150 engages the curved camming surface 230 of the locking ring 214 and the plate and orienting spindle 144 are thereby rotated so that the wheel is disposed at an angle of forty-five degrees to the radius of the turret, as best illustrated in Figures 3 and 21a. The orienting wheel, however, continues to be driven by the drive spool 194 and the peach is now rotated about an axis which is inclined at an angle of forty-five degrees with its original axis of rotation. Due to the weight and inertia of the peach, during the turning of the orienting wheel about a vertical axis, the peach is not turned about a vertical axis.

If the peach had originally dropped onto the orienting wheel with its indent in such a position that the turning of the wheel relative to the peach about a vertical axis caused the wheel to lie in the plane of the indent or transverse thereto, the continued rotation of the wheel in this new plane would quickly serve to locate the indent. If the peach had originally dropped on the wheel in such a position that the rotation of the wheel radially of the turret between positions 20—20 and 21—21 served to locate the indent and the wheel penetrated into the indent crosswise thereof so that the peach stopped rotating, it may and frequently does happen that the vertical turning of the wheel causes the wheel to be aligned with the long axis of the stem indent and therefore the wheel penetrates more deeply into the indent, as heretofore explained. Therefore, in those instances, the peach is fully oriented, not only as to stem indent, but also as to suture plane by the time it reaches position 21—21.

Figure 25:
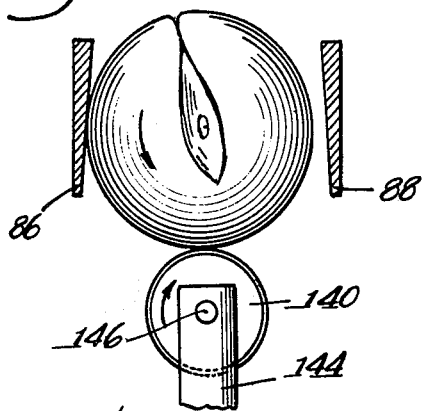

However, if the peach originally dropped onto the wheel in the position shown in Figure 25 wherein the round peripheral of the peach contacts the wheel, then the rotation of the peach about the second axis may cause the indent to register with the wheel and lie thereon with the wheel extending crosswise of the stem indent, or the peach may continue to be rotated without bringing the stem indent into registration with the wheel.

As the turret continues to revolve and the orienting mechanism approaches position 22—22, Figures 3 and 7, the bottom edge of the spindle 144 engages, and the spindle is raised by, the stationary cam block 196. This cam block raises the spindle, thereby lifting the orienting wheel out of engagement with the driving spool, and as the spindle passes over the top of the cam blocks, the Geneva gear 148 is engaged by the teeth of the Geneva gear sector 216 so that the spindle is rotated through an angle of ninety degrees, the Geneva lock ring having a relieved portion or notch 262 below the teeth of the Geneva gear sector 216 so as to provide clearance permitting the locking plate to rotate with the spindle and to position the next curved surface 152 of the locking ring for locking engagement with the relieved edge surface of the locking ring beyond the notch 262. The wheel spindle having been rotated through an angle of ninety degrees to the position shown in Figures 22 and 22a, the spindle now passes beyond the cam block 196 and drops down to re-engage the orienting wheel with its drive spool. If the indent of the peach had been located prior to position 21—21, but the wheel extended crosswise of the indent, this next vertical turning of the spindle would cause the wheel to swing about a vertical axis relative to the peach and may serve to align the wheel with the long axis of the indent, permitting the peach to drop farther down onto the wheel.

Figure 26:
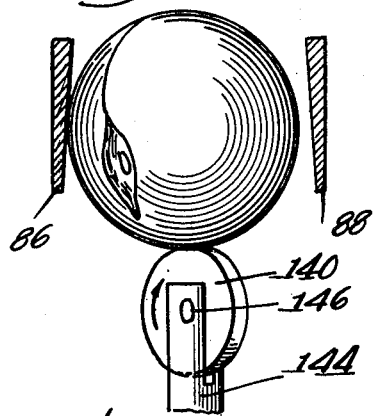
Figure 27:
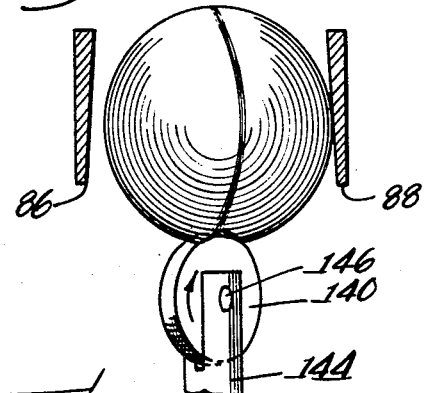
Figure 28:
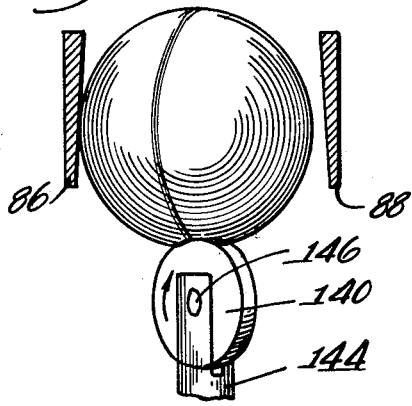
Figure 29:
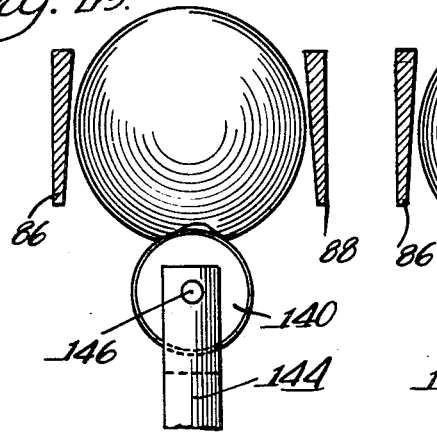

If the peach had originally dropped onto the wheel as shown in Figure 25 and had been rotated as indicated in Figure 26 by the wheel as it passes from position 21—21 to position 22—22, this vertical shifting or swinging of the wheel relative to the peach will then cause the wheel, rotating as in position 22—22, to locate the indent but extend crosswise thereof as shown in Figure 27. As the turret continues to revolve, the orienting mechanism approaches position 23—23, the spindle engages the next cam block 198 and the Geneva gear 148 engages the next Geneva gear sector 218 and the locking plate reaches the cutout 264 in the locking ring 214. Hence, the gear spindle is again rotated about a vertical axis through an angle of ninety degrees to a position shown in Figures 3, 23 and 23a. The peach, the indent of which has been located by the wheel extending crosswise of the indent, as illustrated in Figure 27, will, by this vertical rotation of the wheel spindle, bring the wheel into alignment with the long axis of the indent. If, during this vertical swinging on the wheel spindle, the suture plane is located by the wheel, the peach will, of course, turn about a vertical axis with the wheel as it goes to the position shown in Figure 22a.

As the turret continues to revolve, the orienting mechanism approaches turret position 221—221, Figures 3 and 7, the Geneva gear 148 engages the Geneva gear sector 220 and the Geneva locking plate 150 reaches the notch 266 in the locking plate so that the wheel spindle is again rotated through an angle of ninety degrees, the orienting wheel duplicating the position with respect to the radial axis of the turret as illustrated in Figures 22 and 22a. If the peach has been oriented as to stem indent and the wheel lies crosswise thereof, this turning of the spindle will serve to orient it as to suture plane. If the peach has not been oriented as to stem indent, the rotation of the peach about this new axis will serve either to locate the stem indent or to locate both the stem indent and the suture plane.

As the turret continues to revolve and the orienting wheel approaches position 24—24, the Geneva gear 148 is brought into engagement with the single toothed gear secton 222 and the orienting wheel is rotated about a vertical axis through an angle of forty-five degrees so that the wheel is again radially aligned with the turret as illustrated in Figures 3, 24 and 24a. As the orienting wheel approaches this position the Geneva lock plate 150 reaches the reduced final end portion 268 and a corner of the lock plate is engaged by the hook end 226 of the latch spring 224, Figure 12.

Applicants have found that practically one hundred percent of the peaches are oriented before the orienting mechanism reaches position 24—24. Accordingly, the swinging of the wheel to a position in radial alignment with the turret serves to fix the suture plane of the oriented peach with respect to the radial axis of the turret as a reference plane. It may happen that because the stem indents of peaches or like fruit are not perfectly smooth, but that because of grooves left from stems or twigs that bore the fruit, or creases on the sides of the stem indents, or small bumps, the wheel has not entered the stem indent to its fullest position and therefore the suture plane has not been precisely oriented by the time the fruit reaches and passes position 24—24. Accordingly, as the turret continues to revolve, the orienting mechanism passes onto and over the ring sector 242, Figure 7, the wheel spindle passing over the cam block section 270 at the end of the ring 204 onto the track sector or section 242 which is elevated with respect to the ring 204. Thus, as the orienting wheel passes over the sector 242, the orienting wheel spindle is held in raised position and therefore out of driving engagement with its driving spool 194. This track section 242 is continuously vibrated through a distance adjustable from almost nothing to ⅛ inch. The wheel spindle, orienting wheel and peach are vibrated vertically, preferably at high speed, on the order of 1300 vibrations per minute, but with rather a gentle movement and the wheel clears the bumps, creases, twigs or roughened surfaces on the twig creases of the peach, and the peach settles down onto the wheel so that the wheel penetrates the maximum possible extent into the indent of the peach and the long axis of the peach is precisely located by the wheel.

Peaches are frequently, if not usually, not perfect spheres, and therefore, although the peach may be precisely oriented with respect to the long axis of the stem indent or the suture plane, the peach may tilt one way or the other on the wheel so that the suture plane is not truly vertical. Accordingly, after the orienting mechanism has passed the vibrating track 242, the opposed V-shaped clamps or grippers 86 and 88 are released by the cam 112, see Figure 3, for closing movement under the action of their connecting spring 114. The surface of the cam is therefore relieved in the area 272 sufficiently to permit the clamps to close to an extent necessary to grip the smallest sized peach which the machine is intended to handle. As these clamps or grippers move to closed position, they, by reason of their V shape, serve to recentralize the peach with its suture plane now extending in a truly vertical plane coincident with the vertical plane through the orienting wheel and the axis of the rotating turret. The tapered inner surfaces 120 and 122 of the clamps or grippers 86 and 88 serve to apply to the peach, as the grippers are moved to closed position, a force exerted in a downward direction from above the center line of the greatest diameter of the peach, thereby insuring that the peach will be maintained in properly oriented position on the wheel and will not be lifted off the wheel or shifted with respect thereto.

During turning of the peach by the orienting wheel in its several and different angular positions of the orienting wheel about a vertical axis, the force applied to the peach by the rotating wheel, and the force of gravity acting on a misshapen or not strictly spherical peach may tend to tilt the peach with respect to the vertical plane through the orienting wheel and the peach will therefore impinge upon a surface of the peach receiving or holding means or grippers as illustrated in Figures 24 through 27. The peach grippers are preferably provided with smooth chromium plated inner surfaces to reduce the friction between the peach and these gripper surfaces. As compared with semi-cylindrical grippers, the V-shaped grippers 86 and 88 serve to reduce the area of contact of the tilted peach with the grippers and therefore serve further to reduce the movement-retarding friction between the peach and the peach-receiving or holding means or grippers.

It should be noted that during orientation of the fruit the fruit receiving or holding means or grippers 86 and 88 merely serve to maintain the fruit substantially centrally over the associated orienting wheel 140, so that the fruit contacting portions of the clamp members are sufficiently above the highest point of the wheel 140 that the fruit cannot jam between the wheel and the inner surfaces of said means or grippers. This special relationship of the wheel to the fruit contacting surfaces of said means or grippers is further important in that it permits most ready movement of the fruit to a vertical position with the upper edge of the wheel as a pivot point, when the clamp members are brought toward each other to effect the final straightening of the fruit for precisely aligning the suture plane of the fruit with the wheel plane.

Figure 30:
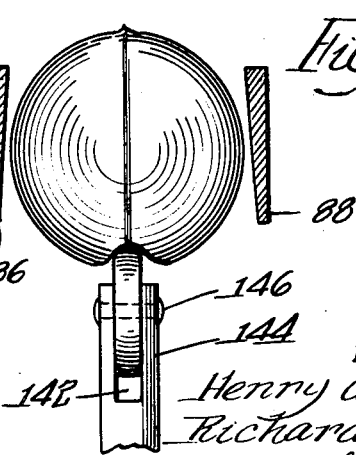
Figure 35:
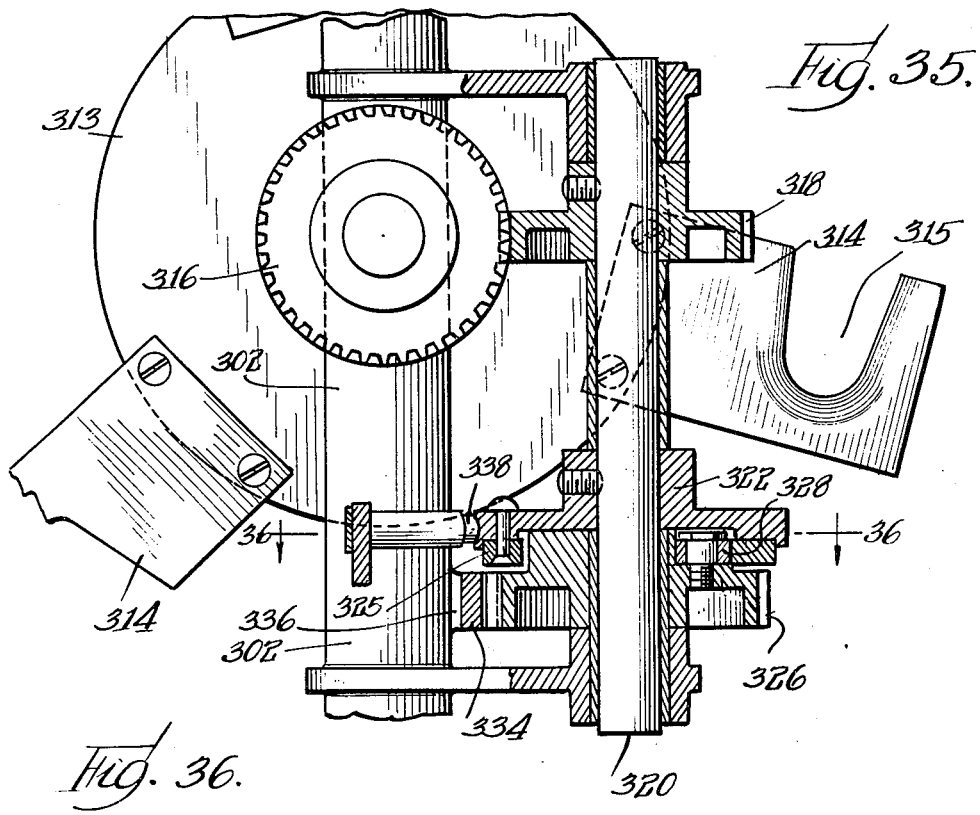
Figure 35 is a detail sectional view taken on the line 35—35 of Figure 32.

After the fruit grippers have been moved to closed position to straighten the fruit on the orienting wheel as shown in Figure 30, the grippers are held closed during transfer. The spring 114 has sufficient tension to straighten the peach, but not of sufficient tension so that the peach is marred when pulled downwardly out of the gripper jaws. Any opening of the jaws at this point might cause the peach to lose its alignment before the impaling means had successfully impaled the peach.

*Transfer mechanism*

Transfer mechanism is provided for removing the fruit from the constantly moving orientator mechanism and while maintaining the fruit correctly oriented, for transferring the fruit to a continuously moving conveyor forming a part of the mechanism which saws the whole fruit into half substantially on and parallel to the suture plane and for thereafter pitting each half fruit, all in continuous fashion and without interrupting the continuous movement of the fruit as it passes through the machine. The form of transfer mechanism selected is located between the orienting mechanism and the pitting mechanism. It will be remembered that the orientator turret is turning constantly and that the conveyor for the pitting mechanism is moving constantly and therefore to transfer the oriented fruit from the constantly moving orientator to the constantly moving pitter conveyor it is necessary to provide transfer means which will move with the orientating main turret for at least a portion of the arcuate movement of the main turret and at exactly the same speed thereof. In the present construction of transfer mechanism this is accomplished by providing the upper end of the stationary shaft 14 with an oscillatable cap 292 which is adapted to oscillatably rest upon the ball bearings 294 which in turn are supported on shouldered means on the upper end of the shaft 14. In like manner another ball bearing 296 is mounted at the extreme upper end of the stationary shaft 14 to receive the upper end of the sleeve 292. Frictionally fitting upon the upper end of this oscillatable sleeve 292 is another sleeve 298 which at its top end is provided with registering openings into which is rigidly fitted a tube or arm 300. This arm extends out at right angles to the axis of the stationary shaft 14. To the outer end of this arm 300 there is affixed an additional, downwardly depending tubular arm 302. The bottom of this arm or transfer turret support is provided with an antifriction roller 304 which engages in the continuous camway 306 rotatably mounted on a shaft 308 having suitable bearings on side plates 2 and 4. This shaft 308 is driven by a gear 47 which in turn meshes with the larger gear 49 on one of the conveyor shafts 33. This conveyor shaft 33 is the one that carries the sprocket 44, 42' and 43' around which the sprocket chains 46 and 22a and 22b pass, as hereinbefore set forth. Hence when the conveyor 30 is driven by the motor 29 the shaft 33 will be rotated and through such shaft the gear 49 will be rotated to rotate gear 47 to actuate the cam shaft 308 and whereby through the continuous cam 306 and the roller 304 the arm 300 will be oscillated back and forth between the two angularly disposed dot and dash lines A and B shown in Figure 32. The vertical arm 302 carries near its center portion a transfer turret comprising the transfer turret hub 313 and three transfer turret blades 314. This transfer turret is connected through the helical gears 316 and 318 to the vertical ratchet shaft 320. This shaft 320 carries the ratchet driven hub 322 fixed to said shaft and the ratchet ring 325. Also journalled on this shaft 320 is a ratchet gear 326 which carries the ratchet pawl 328. The ratchet pawl 328 is urged outward by spring thimble 330 and a compression spring 332 within the thimble. Ratchet gear 326 engages a stationary drive segment rack 334 which latter rack is anchored to the orientator frame by the support 335 and the abutment 336. Thus as the transfer assembly is oscillated through cam 306 as hereinbefore described, the ratchet and gear will rotate the transfer turret 313 through one hundred and twenty degrees of rotation when the assembly travels in one direction. When moved in the opposite direction gear 326 is rotated idly backward with no rotation of the transfer turret, bringing the ratchet gear 326 and the ratchet pawl 328 into position to pick up the next notch in the ratchet ring 325 for the next succeeding cycle. An indexing means is provided on the column 302 in the form of a spring pressed plunger 338 which will engage in a series of notches 340 located on the periphery of the indexing ring 322 to control the positioning of the transfer blades with respect not only to the orienting mechanism but also to the fruit cups on the pitting conveyor mechanism. It is necessary during the intermittent movement of these impaling blades on the transfer turret that in their stationary position between intermittent one hundred and twenty degree arcuate movement that they be positioned so that the continuously moving orienting mechanism on the orienting turret will clear two impaling blades which are spaced apart one hundred and twenty degrees and also that an impaling blade on this impaling turret, once having impaled the peach, will exactly move the impaled peach to a position such that it will be grasped by the continuously moving half cups of the pitter conveyor. It is understood, of course, that when the impaled peach is being picked up between two half cups of the conveyor, the transfer hub is motionless with the two remaining impaling blades spaced from the zone of action of the continuously moving orientator. Thus it will be seen that this indexing mechanism functions as an arcuate stop on the motion of the transfer hub to prevent it from drifting forward or being dragged back out of position by frictional contact with other parts during the time when it is not being actuated by the ratchet pawl.

In considering the action of the foregoing mechanism with reference to the continuously turning orientator turret, and particularly with reference to a peach held by a pair of jaws on the orientator, after the suture plane of the peach has been correctly orientated by means of the orientation mechanism hereinbefore described, the peach thus continuously carried by the turret will ultimately arrive to line up with the dot and dash line A, see Figure 32, which line is directly radial of the turret and is directly in line with the clamping jaws 360 of the continuously moving peach conveyor chain 30, see Figures 1, 31 and 32.

The action of the transfer mechanism itself is as follows:

Consider that the mechanism has reached the position shown in the drawing. The entire assembly will have been oscillated to the end of its travel in a counterclockwise direction and will have come to rest on the peach pitter center line A. The counterclockwise motion just completed will have turned the transfer turret 313 one hundred and twenty degrees, moving an empty blade from position C downward to position D, impaling the oriented peach supported by the orientator wheel 140, as hereinbefore described. The orienter unit released from its track will have swung down out of the way, as shown in Figure 31, permitting the blade carrying the peach to move from position C to position D, the blade which was in position D already impaling a peach on its suture plane and thus carrying the peach, will have moved from position D to position E. The peach pitter conveying cups 360 will have closed onto the peach, as shown in Figure 31.

The cam 306 then holds the transfer hub 313 in stationary position through sixty degrees of cam rotation. During this stationary period the peach pitter cups 360, which travel constantly and continuously, remove the peach from the impaling blade or other transfer member, clearing the blade or the transfer member so that the complete assembly as mounted on the oscillatable arm 300 may then start backward in a counterclockwise direction as considered from the plan view in Figure 32.

Figure 36:
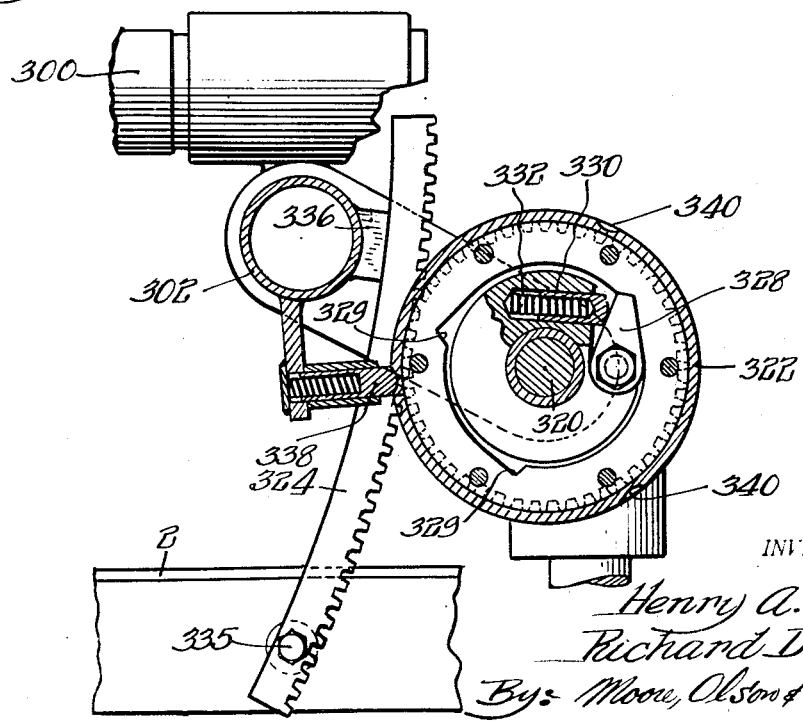
Figure 36 is a plan sectional view on the line 36—36 of Figure 35.

As explained earlier, on this backward or clockwise oscillation, the ratchet mechanism shown in Figure 36 will permit backward rotation of the gear 326 without causing rotation of the transfer hub 313 and the blades carried thereby. It will be understood, of course, that the cam 306 is suitably conformed to produce the movements herein described.

Following the clockwise oscillation, the counterclockwise arcuate motion of the arm 300, see Figure 32, begins. At the beginning of this counterclockwise arcuate motion as the arm 300 moves from the position of the line A toward the line B, spur gear 326 will be rotated by its contact with the stationary segment 324 and the ratchet pawl 328 will engage one of the notches 329 in the ratchet ring and rotation of the transfer turret 313 again begins. Since the transfer turret blade 314 is not yet passing downwardly through the main orientator turret, nor the peach, the first section of fifty-four degrees of cam rotation need not yet bring the transfer mechanism into timed relation with the main orientator turret 34. However, while one of the blades passes through the plane of rotation of the orientator turret 34 and impales the peach through its suture plane, both the main turret 34 and the transfer turret 313 must be travelling in the counterclockwise direction, see Figure 31, in time with and at exactly the same angular speed. In short, they travel together in this counterclockwise direction at the same rate of speed. This is accomplished or controlled by the straight line section of the cam over an arc of seventy-two degrees of cam rotation. The remaining fifty-four degrees of cam rotation simply blends back into the sixty degree rest period on the cam. A shorter or possibly clearer explanation of the operation is as follows. The cam 306 swings the entire transfer mechanism in a clockwise direction without rotating the transfer turret 313. The ratchet mechanism shown in Figure 36 permits this. The cam 306 then moves the entire transfer mechanism in a reverse or counterclockwise arc shown in Figure 32, so that the transfer mechanism gradually comes into registry with the peach clamping arms in the pockets in the turret 34, and the peach center line. When the transfer turret in its rotation then impales the peach and moves the peach to position D, the next cycle then moves this peach to position E, after which the transfer turret 313 then comes to rest and the peach is grasped by the peach pitter cups 360 and removed from the transfer turret blade, and so on in successive cycles.

It will of course be understood that other types of transfer mechanism may be utilized instead of impaling blades 314 herein shown. It must be clear from an examination of the turret 34 and the pockets formed therein that the impaling blades 314 operate through the openings 346 while the transfer means is moving in a counterclockwise direction with and at the same speed as the turret.

By means of the foregoing mechanism each peach of a succession of constantly moving peaches is oriented so that its suture plane extends in a predetermined direction, to-wit parallel with the radius of the turret and is broad enough so that the suture plane registers with the line A during the continuous travel of the orientating turret 34, and during the movement of this turret 34 through an arcuate path from the radial line B to the radial line A, the transfer mechanism will move synchronously with and at the same speed as the turret. The transfer turret will be operated to cause the impaling blade to move downwardly into the peach to impale the peach substantially exactly on and parallel to its suture plane and during a part of this cycle the orientating wheel 140 will be automatically dropped downwardly to permit the impaling blade and peach impaled thereby to pass downwardly into D position, and then ultimately that impaled peach will be carried across into the zone of action of the conveyor cups 31, which will, as hereinafter described, grasp the impaled peach and remove it from the blade, in a manner to hold the peach in exactly the same position as it was when it was orientated, to-wit, with the suture plane of the peach disposed between the opposed cups 360 of the pitter conveyor mechanism, which, as has heretofore been said, is constantly moving.

From this point on, the peach properly orientated and held within a pair of cups 360 of the conveyor mechanism, is carried in a continuous manner past a sawing blade, where the peach is halved along a plane passing through and substantially on and parallel to the suture plane of the peach thus orientated, and thereafter the cut peach halves, each lying in a half peach cup, will be carried in a continuous manner, without interruption, to a pitting station where each half peach will be pitted without interrupting the travel of the half peach, and the peach will thereafter be discharged. The details of construction of this part of the machine will now be described.

The top plate 3 of the machine forms the mounting base for a combined motor and speed reducer 29 which has a slow speed shaft 29a, Figures 1 and 37, driving the fruit feeding mechanism device or conveyor 30 (Figure 1) and a high speed shaft 29b which drives a fruit splitting or sawing mechanism 286 (Figure 1). The fruit feeding mechanism, device or conveyor 30 receives whole fruit from the transfer mechanism at the left hand or feed-in end of the machine, as shown in Figure 1, and carries each fruit to and past the splitting or sawing mechanism 286, into and past the separating and spreading mechanism 288, and to and past pitting or deseeding mechanism 290, and discharges at the right hand, or discharge end, of the machine as shown in Figure 1, the split and pitted or deseeded half fruit.

*The fruit feeding mechanism or conveyor*

The fruit feeding mechanism device or conveyor 30 (Figures 1, 37, 38 and 40) preferably comprises an endless conveyor consisting of a pair of sprocket chains 22a and 22b passing at the rear, discharge end of the machine over drive sprockets 35 and 37 adjustably secured, as by bolts 39 received in arcuate slots 39' in the sprockets, two collars 35' and 37' secured to a drive shaft 31 (see Figures 37 and 38) journaled in suitable bearing brackets 41 bolted to the side frame plates 2 and 4. The sprocket chains at their forward or feed-end ends pass over drive sprockets 42' and 43' mounted on the cross shaft 33 having a bearing in its opposite ends to flanged bosses 45' bolted to the side frame plates 2 and 4.

An elongated casting 346, Figure 38, is bolted to the side frame plate 2 and has threaded into it a stud shaft 347. A hand wheel 348 is mounted on the outer end of a rotatable sleeve 349 on the stud shaft 347, the sleeve being connectible by a manually operable clutch of any suitable construction to a drive pulley 350 journaled on the sleeve 349. The sleeve 349 is connected or fixed in any suitable manner to a gear 351. The pulley 350 is driven through belt 352 (Figures 1 and 38) from the slow speed shaft 29a of the combined motor and speed reducer 29. The gear 351 meshes with and drives a larger gear 353 journaled on a stud shaft 354 carried by the casting 346. The gear 353 has attached to it a smaller gear 355 which is also journaled on the stud shaft 354, the gear 353 meshing on one side with a drive gear 356 secured to the outer end of the conveyor drive shaft 31 and on the other side with a gear 357 secured to the outer end of a cross shaft 358 journaled in suitable brackets bolted to the side frame plates 2 and 4.

The sprocket chains 22a and 22b carry a plurality of fruit holders, cups or supporting devices 360 of which a few only are shown in Figures 31, 32, 33 and 40, but it is to be understood that the entire length of the chains are provided with a contniuous equally spaced series of fruit holders 360.

The fruit holders 360 as they are continuously advanced by the sprocket chains each first receive a whole fruit at the delivery or feed-in station or zone at the left or front end of the machine, hereinbefore described. The fruit being deposited in each holder by the transfer mechanism as it is being moved past or through the feed-in station or zone is positioned by the orientator so that its suture plane is parallel to and substantially corresponds to the plane of rotation of the saw blade or splitter or sawing mechanism 286. The fruit holders 360 and their control mechanism are so designed that the oriented whole fruit is then automatically centered by the fruit holders so that its median plane is coincident with the plane of such blade or saw and the fruit thus being centralized is thereafter clamped in the holder which then carries the fruit without interruption in its movement past the splitting or sawing mechanism 286, the separating and spreading mechanism hereafter described, and after being swung to open position continues without interruption in its movement to carry the split halves with their cut faces uppermost or exposed, past the pitting or coring mechanism and to the discharge station or zone at the rear or right end of the machine, at which zone or station the pitted or cored fruit halves are automatically discharged from the holder as it continues in its motion without interruption with the endless conveyor sprocket chains.

Each fruit holder, cup or supporting device 360 comprises a pair of inner cup segments or sections 362 and 364, Figures 43 to 46. The inner wall 370 of each cup is semi-conical in form (see Figures 41 and 43). Each cup is an internally cone-shaped half fruit holder when the cups are "open" or "partially open." The half cups when in horizontal lowered position, as illustrated in Figures 41 and 43, form an open top, half fruit receptacle having oppositely extending, semi-conical internal surfaces confronting each other along their base planes. The two segments when in raised position, as illustrated in Figures 31 and 45, form closed, whole fruit receptacles or clamps having opposed conical internal walls confronting each other along their base planes, but in spaced relation to a vertical plane coincident with the median plane of the whole fruit.

The cup segments or sections 362 and 364 are formed integrally with lever arms 366 and 368 having bosses 370 and 372 at their inner ends journalled on a shaft 374. The shaft 374 is mounted in the bosses 376 of opposite end brackets 378, the shaft being held against rotation with respect to the brackets as by set screws 380. The brackets 376 are mounted on a carriage 382 shown in Figure 44. This carriage comprises a central dependent body portion or block 385 and laterally extending arm portions 386 and 388 extending oppositely from opposite diagonal corners of the central body portion or block 382. The end portions 390 and 392 of the arms 386 and 388 are offset oppositely so that their opposite side edges are aligned. Wheels or rollers 394 for the carriage are suitably journalled as at 396 on the extreme vertical end walls of the portions 390 and 392 of the carriage. Carriage supporting shoes or slides 398 are secured by screws or bolts 400 to the undersurface of the carriage. Chain attachment links 402 and 404 are bolted to the undersurface of the end portions 390 and 392 of the carriage arms 386 and 388, the chain attachment links 402 being secured by bolts 406, see Figure 41, and the chain attachment links 404 having their side flanges received in notches in the upper surfaces of the shoes 398 and each secured to the carriage by one of the bolts 400 by which its associated shoe is secured. It should be noted that the end portions 390 and 392 of the carriage arms 386 and 388 are recessed in their upper surfaces as shown in Figure 44 to receive the bottom portions of the cup segments 362 and 364 so that the cup segments may be swung into an open horizontal or near horizontal position as shown in Figures 41 and 43.

The cup halves 362 and 364 are operated by racks 406 and 408, Figure 46, the rack 406 being bolted to the inner surface of a slide block 410 and extending outwardly or upwardly therefrom while the rack 408 is bolted to the opposite side edge of the block 412. An actuating roller 414 is journalled on a bolt threaded into the side of the rack 408 adjacent its lower end. The block 412 is provided with an extension 415 having spaced holes 416 and to which the block 410 is supported by threaded bolts 418 and 420. The blocks 410 and 412 are formed on their inner surface with longitudinally extending guide slots 422 and 424 receiving guide projections or splines 426 and 428 respectively formed at diagonally opposite corners of the central body portion 382 of the carriage. The mounting brackets 378, see Figure 44, for the cup carrying shaft 374 are formed to provide horizontal arms apertured to receive mounting bolts by which the arms are secured to opposite sides of the arms 386 and 388 of the carriage 382, see Figure 44. Each bracket is also formed with a depending portion 430, the portion 430 of the brackets cooperating with the vertical recessed surfaces 432 and 434 of the central block 382 of the carriage to form spaced guide surfaces for the slidable blocks 410 and 412 and the racks 406 and 408. Shoulders 436 and 438 are formed at the junction of the arms 386 and 388 with the central body portion 382 and opposed side surfaces 440 of the body portion 384 and opposed surfaces 442 of the arms 386 and 388 form additional guide surfaces for the racks 406. Each bracket 378 is also formed with a horizontal shelf portion 450, see Figure 44.

A spring 452, see Figures 45 and 46, urges the cup segments to raised position or to a position substantially at right angles to the carriage 382. This spring 452 is a coil spring which at its lower end encircles a pin 454 and bears upon the shelf-like plate 415, see Figures 45 and 46, forming a part of the slide block 412 and encircles at its upper end a pin 456 and bears upon the underside of the shelf-like portion 450 of the bracket 378 with which the slide block 412 is associated.

It should be noted, as best seen in Figure 43, that the rack 406 meshes with the gear teeth 460 formed on the mounting boss 372 for the cup segment 370 while the rack bar 408 meshes with the gear teeth 462 formed on the mounting boss for the cup segment 370. Hence, as the racks 406 and 408 are lowered the cup segments 362 and 364 are raised and as the racks 406 and 408 are raised the cup segments are lowered.

Each cup holder carriage 382 is confined or restricted, in its movements along the upper flights of the chains or conveyor, to a definite horizontal plane without deviation or deflection therefrom as it passes from the front end of the machine to the rear end of the machine between the sprockets 42' and 43', Figure 38, and the drive sprockets 35 and 37. This confining, restricting or guiding of the movements of each carriage 382 is accomplished by a pair of guide tracks 464 and 466, Figures 38 and 40, mounted on the outer ends of brackets 468 and 470 respectively secured to the side frame plates 2 and 4. The guide tracks 464 and 466 cooperate with the slide shoes 398 secured to the under surface of each carriage 382, the shoes riding on the upper surfaces of the guide tracks 464 and 466 so as to support the carriage against movement in a downward direction. The rollers 394 at the opposite sides of each carriage 382 engage and roll along overhanging guide tracks 472 and 474, Figure 37, supported on the outer end of brackets 476 and 478 respectively secured to the side frame plates 2 and 4. The guide tracks 472 and 474 serve as a guide confining the carriages against upward movement from the front to the rear of the machine along the upper flight of the chains or conveyor. It will be evident that the confining or guiding tracks 464, 466, 472 and 474 serve not only a guiding function but also serve a clamping function in that they clamp the carriage against vertical movement so that by forces applied to the rollers 414 or by springs 452 to the slide block 412, the racks 406 and 408 may move up or down to swing the cup segments to the various positions. These tracks serve also to take the load of the carriages off the chains so that relatively light sprocket chains or conveyors may serve to move the carriages and hence convey the fruit holders through their designed path. The movements of the carriages along the lower track of the chains or conveyor, from the rear to the front end of the machine, are guided and the carriages supported by tracks 464 and 466, Figures 37 and 40, secured to the outer end of brackets 468 and 470 respectively secured to the side frame plates 2 and 4. The rollers 394 of each carriage engage and roll on the upper surfaces of the tracks 464 and 466 and thereby support the weight of the carriages and thereby relieve the chains of that weight and decrease the bearing pressure on shafts 31 and 33. The cup segments are moved to open positions or to partially open positions, and allowed to move to closed positions as they are moved continuously along their endless path by a plurality of cam, guide or control tracks, best seen in Figures 38 and 40. These tracks comprise a plurality of generally flat tracks 480, 482 for controlling the cup segments, the track 480 having a curved camming end 484, and the tracks 480 and 482 being associated at the forward end of the machine by the curved periphery 486 of cam 488 (see Fig. 64) which is held stationary on the drive shaft 33, by suitable brackets 504.

A track 490 controls the spreading movement of the two cup segments and the positioning of the two cup segments in partially open position for cooperation with the pitting or coring mechanism. This track is aligned longitudinally of the machine with track 482 so as to engage the actuating roller 414 of the cup segments and move the cup segments therewith. This track 490 has at its forward end an inclined or camming section 492 which engages below and raises the actuating roller 414. This track has also intermediately of its plane or horizontal portions a recessed portion or surface 494 which permits the actuating roller 414 to be lowered thereby raising the cup segments slightly for proper engagement with the pitting mechanism. The track 490 at its rear end merges into a curved track or surface 496 which is concentric to the axis of the drive shaft 31 for the sprocket chains or conveyor. The guide surface 496 may be provided by a disk or collar 498 in which the shaft 31 is journaled but which is held against rotation by being pinned or otherwise secured to the stationary track 490, the track 490 being fixed to brackets 500, Fig. 40, secured to the under side of the carriage track 466. It should be noted that the portion 502 of the track 490 between the recessed portion 494 and the arcuate surface 496 is of greater height or thickness than the flat portion of the track in advance of the recess 494 so that the cup segments which as the cups reach the recess 494 are partially open will be open to even a greater extent after cups have passed the recessed portion 494. The arcuate surface 496 retains the cups in fully open position as they move around the drive sprockets 35 and 37. The tracks 480 and 482 may be secured in any convenient manner, as by brackets 504, Fig. 38

(of which one only is shown), to the carriage track 466.

In addition, auxiliary control devices, tracks or guides 506 and 508 (Figs. 38, 40 and 43) are provided for actuating the roller 414 of the cup segments to supply an auxiliary additional tension to the cups during the splitting and sawing operation and during the pitting operation, as hereinafter described. The track 506 comprises a bar extending longitudinally in alignment with the plane of the track 482. Track 506 is provided at its forward end with an inclined cam surface 510 under which the roller 414 is adapted to pass and to be depressed as the cup carrier advances. The track 506 is mounted on spaced bars 512 and 514, the bar 512 being secured to a rod 516 journaled in spaced brackets 518 bolted to the under surface of the carriage track 466. The bar 514 is also secured to the rod 516 but passes beyond said rod to overlie at its free end a coil spring 519 which bears at its lower end on a washer 520, Figure 40, adjustably mounted on a vertical rod 552 supported by and upstanding from a bracket 524 bolted to the side frame plate 4, the other end of the spring 519 acting through the bar of the tracks 506 and 508. The track 508 comprises a bar carried at the outer end of a lever 526 secured to one end of a rod 528 journaled in brackets 530, Figure 38, also bolted to the under surface of the carriage track 466. The rod 528 has secured to its opposite end a lever 531 which extends outwardly therefrom and engages and overlies a coil spring 532 mounted at its lower end on an adjustable bearing plate or washer 524 mounted on the machine frame in any convenient manner as for example in the same manner as shown in respect to the bearing plate or washer 520. The bar or track 508 is also aligned, as shown in Figure 40, with the control track 482 and auxiliary control track 506 so that the track 508 also serves to engage and actuate or depress the actuating roller 414 of the cup segment when that roller engages the inclined camming nose of the track section or bar 508. It will be evident therefore that the spring 532 serves by applying a further pressure tending to depress the actuating roller 414 to apply an auxiliary tensioning force urging the two cup segments upwardly during the pitting operation and it should be noted that the auxiliary track section or bar 508 is aligned transversely of the machine with the relieved section 494 of the control track 490 so that at the time the cup segments are allowed by the track 490 to be raised for the pitting operation by the coil spring 452 of the cup actuator mechanism, the track 508 will apply this auxiliary force in aid of the spring 452.

The forward end of track 482 is provided with a curved end 483 to engage the roller 414 of the cup assembly 360, which roller passes around the cam 488 as it leaves the track 480. The roller 414 is therefore confined between the cam surface 491 and the curved end 483 of the cam bar 482 so as positively to close the two half cups after they have picked up the whole peach from the transfer mechanism blades 314.

*The splitting and sawing mechanism and the separating and spreading mechanism*

The splitting or sawing mechanism 286 comprises, as best shown in Figures 1, 37 and 40, a rotary saw 600 secured to a shaft or arbor 602 which is journaled in an arbor housing 604 which extends through a suitable opening in the upstanding portion 16 of the side plate frame 4 and is secured to said side plate as by brackets 606 bolted to the end of the arbor housing and also bolted to the side frame plate. The arbor shaft 602 extends beyond the arbor housing 604 on the right side of the machine as seen in Figure 37 and has secured to it a pulley driven by a belt 610 from a pulley 612 secured to the high speed shaft 29b of the combined motor and speed reducer 29. The shaft 602 also has secured to it a fly wheel 614 which equalizes the rim speed of the saw while the pit of a peach is being cut in two.

The saw arbor housing 604 is also supported by a bracket 616 having an upper horizontal plate portion 618, Figure 1, bolted to the top plate 3 and the lower horizontal plate portion bolted to the saw arbor housing.

The separating and spreading mechanism 288 comprises a pair of separating or deflecting blades 622 and 624. The blade 622 is secured by a recessed head screw or by spot welding or any other convenient manner, to the lower end of vertical arm 626 of a bracket 628 having a rearward extending horizontal portion 630 and a transverse arm portion 640 terminating in plate portion 642 bolted to the bottom arm 620 of the bracket 616.

The blade 624 is similarly secured to the lower end of the vertical arm 644 of a bracket 646 having a lateral arm 648 terminating in a plate portion also bolted to the arm 620 of the bracket 616. The blades 622 and 624 are provided with tapered front vertical end edges 650 and 652 which are as close to the saw as it is permissible. The blades extend straight and parallel to the plane of the saw throughout the section 654 of each blade, which section is preferably one and one-half inches in length so that the rear edge of the peach will clear the saw at the time the front edge of the peach reaches the rear edges of the sections 654 of the two blades 622 and 624. The blades 622 and 624 then diverge away from the plane of the saw in both the horizontal and the vertical directions or planes. The divergence of the sections 656 and 658 of the blades 622 and 624 in the horizontal plane is best illustrated in Fig. 48, which is a top view of the blade and shows the maximum horizontal divergence of the blades at the top edge. The divergence of the blades in a vertical direction is illustrated in the perspective view of Fig. 51. During the period when sawed or split fruit halves are passing along the sections 656 and 658 of the deflecting blades, the fruit cups are moving outwardly. The divergence of these sections of the blades in both the horizontal and vertical directions, serves to keep the faces of the blades in engagement with, or in close parallelism to, the changing plane of the exposed faces of the fruit halves as the cups thus swing outwardly. The separating blades thus serve to hold the fruit halves in the cups as the cups swing outwardly through a certain angle or portion of their opening movement.

The separating or deflecting and spreading mechanism 288 also includes a pair of spreader blades 660 and 662. These blades are secured by recessed screws, spot welding or any other convenient manner to the outer longitudinal edges of levers 664, and 666, 668 and 670. These levers are formed at their lower ends with apertured bosses which receive common drive shaft 672 on which the boss of each of the levers is journaled. It should be noted that, as shown in Fig. 48, the drive shaft 672 is positioned so its axis lies in extension of the plane of the saw. The shaft 672 is journaled in a relatively long boss 674 formed at the lower end of a vertical arm 676 of a bracket 678 bolted to a cross bar 680 extending between the upstanding central portions 16 of the side frame plates 2 and 4 and bolted to the lateral arms of suitable brackets such as 682, shown in Fig. 1. The spreader blades or wing 660 and 662 are each formed of two sections 684 and 686 for the blade 660, and 688 and 690 for the blade 662. The forward sections 684 and 688 of the spreader blades diverge in both horizontal and vertical planes and these sections constitute, when the spreader blades are in closed positions, extensions of the divergent sections 656 and 658 of the stationary separating or deflecting blades 622 and 624. The rear sections 686 and 690 of the spreader blades diverge in a vertical direction but are parallel in the horizontal planes, as best seen in Fig. 48. The sections 684 and 688 serve to continue the separating or deflecting of the half peaches while the half peaches are moving over the sections. The sections 686 and 690 extend in the horizontal direction, parallel to the mouths of the half cups and move outwardly as the half cups open. The sections 686 and 690 therefore serve to seat or reseat the half peaches in the half cups as those half cups reach spread or open position for movement under the following pitting mechanism. It should be noted that the spreader blades are provided with horizontal ribs 692 beginning at the forward ends of the blades and extending at least part way along the sections 686 and 690 of the blades. These ribs serve to keep the fruit halves from turning during the time that they are pushed along the surfaces of the spreader blades by the cups. These ribs also serve to break any suction between the flat faces of the peach halves and the surfaces of the spreader blades.

The spreader blades 660 and 662 are preferably formed of light sheet metal and are reinforced by the lever arms 664 and 670 and angular cross bars 694 and 696 extending between the lever arms and preferably formed integrally therewith. The lever arms 668 and 670 are formed with laterally extending portions or cranks 698 and 700 carrying rollers 702 and 704. These rollers are received in U-shaped yokes 706 and 708 peened to the lower ends of plunger rods 710 and 712 slidably mounted in tubes or sleeves 714 and 716 having their upper ends of reduced diameter externally threaded and received in threaded apertures in the cross bar 680. Lock nuts 718 clamp the tubes 714 and 716 in adjusted position determining the closed or upper positions of the spreader blades so that the forward sections 684 and 688 are properly aligned with the rear sections 656 and 658 of the stationary separating or deflecting blades.

Rubber bumper strips 720 and 722, Fig. 51, are engaged by the spreader blades as they snap or move to the closed position and align themselves with the separating or deflecting blades. These rubber bumpers 720 and 722 are carried by a plate 724 having opposite side edges inclined parallel to the plane of inclination of the sections 686 and 690 of the spreader blades. The plate 724 is bolted to a bracket 726 in turn bolted to the arm 640 of the bracket 628.

Plunger rods 710 and 712 are interconnected at their upper ends by a cross bar 728 into which the upper ends of the plunger rods are threaded and to which they are locked by clamping nuts 730. Coil springs 732 are interposed between the lower clamping nuts 718 and washers 734 clamped between an enlarged shank portion of each plunger rod and the cross bar 728. The central portion 736 of the cross bar 728 is rounded and received between the furcations of a bifurcated lever 738 pinned to a shaft 740. The shaft 740 is journaled in a boss 742 of a bracket 744 bolted at its lower end to the cross bar 680. The lever or crank 746 is pinned to the opposite end of the shaft 740. A hook-like member or ratchet bar 748 is pivoted to the lower end of the lever crank 746 and extends rearwardly therefrom. The member 748 is formed with a ratchet tooth 750 in the under surface of the bar and with an outer inclined or camming surface 752. The bar 754 bolted at the forward end of the bracket 744 extends rearwardly therefrom and is provided at its outer end with a longitudinal slot 756 which receivese a stud 758 clamped in the slot in adjusted position in any desired manner. The stud 758 carries a roller 760 which lies in the path of movement of the member or ratchet bar 748 and cooperates with the camming surface 752 of the ratchet bar to cause it to pivot at its point of connection 762 to the crank 746 in a counter-clockwise direction whenever the bar in moving rearwardly brings the surface 752 in engagement with the roller 760. The ratchet bar 748 is moved rearwardly by driving dog 764 carried by a ratchet 766 secured, as hereinafter described, to the pitter mechanism 30 so as to move back and forward with the pitter mechanism. The dog 764 is positioned in the same vertical plane with the ratchet bar 748 and hence when the dog 764 moves rearwardly its toothed rearward edge 768 engages the ratchet tooth 750 of the ratchet bar 748 and hence moves the bar rearwardly until it is engaged by the roller 760 and raised to release the ratchet bar 748 from the dog 764. It will be evident that as the ratchet bar 748 is moved rearwardly, the lever or crank 746 is swung in a counter-clockwise direction, as seen in Fig. 52, to cause a like counter-clockwise rotation of the bifurcated lever 738 and hence simultaneous depression of the plunger rods 710 and 712 to cause simultaneous outward swinging or opening of the spreader blades. On release of the ratchet bar 748 from the driving dog 764, the springs 742 cause raising of the plunger rods thereby to close or raise the spreader blades and simultaneously rotate the levers 738 and 746 in a clockwise direction to the original position and return the ratchet bar 748 to its forward initial position.

*The pitting or deseeding mechanism*

The pitting, deseeding or coring mechanism 290 (Figures 1, 40, and 53 to 62) comprises a traveling frame 770, best shown in Figure 62. As there shown, the frame comprises longitudinal bar portions or arms 772 and 774 joined adjacent their forward ends by an integral cross bar 776. The frame 770 is pivotally mounted, by studs 778, on the upper ends of parallel links 780, 782, 784 and 786, Figures 53 to 55, 58, 59 and 61. The parallel links 780, 786 are journaled on parallel cross shafts 788 and 790, Figures 1 and 37, mounted in the bosses of brackets such as 792 bolted to side frame plates 2 and 4. The pitter head frame 770 is moved rearwardly of the machine but "forwardly" with respect to the moving fruit cups from the "rearward" position to the "forward" or dotted line position of Figure 1 by a rod or bar 794, Figures 38 and 39, pivotally connected at its rear end as by stud bolt 796 to the mounting link 786 for the pitter head frame. The bar 794 is driven by a cam 798 secured to the end of the shaft 358. The bar 794 is provided with a cam roller 800 which is received in an internal cam track 802 of the cam 798 and the bar is also provided with a slot 804 through which the shaft 358 extends so that the shaft serves as a guide for the bar. The pitter head frame carries a pair of pitter knife mechanisms 806 and 808, Figure 60; a pair of pitter pad and knock-out assemblies 810 and 812, Figures 53 and 61, and a pair of pitter knife operating mechanisms 814 and 816, Fig. 55.

The pitter knife mechanisms comprise four curved pitter blades or scoops 818 and 820, 822 and 824 mounted as pairs, the pitter blades 818 and 820 being bolted to bars 826 and 828 while the blades 822 and 824 are bolted to bars 830 and 832. The bars 826 and 828, Fig. 61, are formed with right angle end portions forming bosses 834 at one end and 836 and 837 at the other end. The boss 836 is pinned to a shaft 838 and the boss 837 is pinned to a sleeve 840 carried by the boss 842 of a bracket 844, best shown in Fig. 63. The bracket 844 comprises a generally triangular vertical portion 846 having a horizontal plate portion or shelf 848 and having the boss 842 and a like boss 850 formed integrally with the plate portion 846 at the base corners thereof. The shelf 848 rests upon the cross arm 776 of the pitter head frame 770 and is secured thereto as by bolts as 852 (Figs. 53 to 55 and 59), received in slots 854 in the shelf 848 and threaded in the cross arm 776. The slots 854 permit ready adjustment of the bracket 844 laterally of the pitter head frame so that the pitter knife mechanisms 806 and 808 and the pitter pad assemblies 810 and 812 may be readily adjusted with respect to the central longitudinal vertical plane of the machine and hence properly aligned with respect to the fruit cups.

The pitter knife mounting bars 830 and 832 of the pitter knife mechanism 806 are identical to the pitter knife mounting bars 826 and 828 of the pitter knife mechanism 808 and have bosses 856 (Fig. 59) similarly secured to a drive shaft 858 and sleeve 859 journaled in the boss 850.

The bosses 834 of the knife mounting bars 826 and 828 receive a stud 860, Fig. 61, bolted to the depending flange or leg 862 of a mounting bracket 863 having a plate portion 864 extending over the knife mounting bars and an upstanding flange or arm 866 bolted to the vertical plate portion 846 of the bracket 844. The knife mounting bars 830 and 832 are similarly provided with bosses 868 corresponding to the bosses 844 and similarly receiving a stud 870 bolted to the depending leg 872 of a bracket 873 having a plate portion 874 extending over the knife mounting bars 830 and 832 and having an upstanding flange 876 also bolted to the vertical plate portion 846 of the common bracket 844. As clearly seen in Fig. 60, the brackets 863 and 873 are so mounted that the plate portions 864 and 874 are inclined to the vertical at equal, opposite angles and are symmetrically disposed with respect to the longitudinal central vertical plane of the machine.

The pitter pad assemblies 810 and 812 comprise main hold-down pads or plates 878 and 880 respectively, contacting the exposed surfaces of the fruit halves when properly positioned by the fruit cups. These main pads are centrally apertured at 882 and 884 to expose the pit or seed containing section of the fruit halves to permit passage of the seeding or pitting knives into engagement with exposed faces of the fruit halves and around the pit or seed containing section. The main pads or plates 878 and 880 are adjustably mounted by bolts 886 and 888 (Figs. 53 and 61) on the plate portions 864 and 874 of the brackets 863 and 873. The pitter pads 878 and 880 may be adjusted, by adjustment of the bolts 886 and 888, toward and from the fruit holding cups so that the pitter, by change in pitter blades, may be made to accommodate different sizes of fruit halves. The raising or lowering of the pads 878 and 880 is provided so that the blades can be set to cut deeper or shallower depending on the size of the pit.

The pad assemblies also comprise knock-out pads 890 and 892 positioned at the centers of the apertures 882 and 884 of the main pitting pads. The knock-out pads are threaded on plunger rods 894 and 896 having pinned to them collars 898 and 900 slidably mounted in tubes 902 and 904 threaded into the plate portions 864 and 874 of the brackets 863 and 873. The plungers 894 and 896 are also slidably mounted in plugs 906 and 908 threaded into and closing the upper ends of the tubes 902 and 904. Coil springs 910 and 912 are interposed between the collars 898 and 900 and the plugs 906 and 908 and therefore normally urge the knock-out pads 890 and 892 downwardly so that their lower surfaces are normally disposed below the planes of the lower surfaces of the main pads 878 and 880. The springs of the knock-out pad assemblies readily yield as the fruit halves are brought by the raising of the cups into engagement with the main pads so the knock-out pads are moved upwardly to have their lower surfaces in the planes of the lower surfaces of the main pads when the fruit halves are brought into engagement with the main halves as shown in Fig. 60. These knock-out pad assemblies apply, through the pits or seed sections of the fruit halves, a compressive force on the flesh of the fruit in the path of the pitting knives so that the pitting knives make a clean cut about the pits or seed containing sections. On dropping of the cups away from the main pitter pads after the pitting has been accomplished, springs 910 and 912 push the knock-out pads out or downwardly to free them from the main pads should they stick thereto.

The pitter knife operating devices comprise two mechanisms 814 and 816 which consist of gear segments 914 and 918 on one device and 916 and 920 on the other. The gear segments 916 and 918 are pinned to the sleeve 840 while the gears 916 and 920 are pinned to the shaft 838 for the pitter mounting bar 826 for the pitting knife 818. The segmental gear 914 interfits with a segmental gear 918, as shown in Fig. 56, so that the teeth of the segmental gears lie in the same transverse plane. Segmental gear 918 is pinned to the drive shaft 838. The segmental gear 916 interfits in a similar manner with segmental gear 920 similarly pinned to the drive shaft 858 for the knife mounting bar 832 for the pitting knife 824. The segmental gears 914, 916, 918 and 920 respectively, intermesh with rack bars 922, 924, 926 and 928, the rack bars 922 and 926 being bolted to a cross head 930 and the rack bars 920 and 924 being bolted to a cross head 932. The cross heads 930 and 932 are bolted at their upper ends to rack bars 934 and 936 slidably mounted in guides formed by the front faces of bracket plates 938 and 940, Figs. 58, 59 and 61, and between the side guards 942, 944, 946 and 948, Fig. 55, bolted to the brackets 938 and 940.

The brackets 938 and 940 have inturned foot portions 950 bolted to the shelf 848 of the bracket 844 as by bolts 952. The cross heads are raised, to turn the pitting knives to open, initial position following the pitting operation, by spring action. For that purpose the cross heads 930 and 932 are provided with threaded rods 954 and 956 threaded into lateral shelf portions 958 of the cross heads and slidably mounted in shelf portions of brackets 960 and 962 bolted to the brackets 938 and 940 and provided with suitable slots therethrough to permit passage of the rack bars 934 and 936. The rods 954 and 956 above the shelves of the brackets 960 and 962 are encircled by coil springs 964 and 966, which bear at their lower ends on the brackets 960 and 962 and at their upper ends on suitable washers which underlie nuts 968 threaded on the upper ends of the rods 964 and 966. The cross heads 930 and 932 are moved downwardly by the clockwise rotation of the segmental gears 970 and 972 meshing with rack bars 934 and 936. The segmental gears 970 and 972 are secured to shafts 974 and 976 respectively journaled in bosses formed at the upper ends of the brackets 938 and 940. The operating cranks 978 and 980 are secured to the outer ends of the shafts 974 and 976 and these cranks carry at their lower ends inwardly extending operating studs 982 and 984.

The parts of the pitter knife drive mechanism thus far described move backwardly and forwardly with the pitter head. The operating cranks 978 and 980 thus move backwardly and forwardly with the pitter head frame 770 and during the "forward" motion of the frame the studs 982 and 984 are engaged by stationary bars 986 and 988 (see Fig. 54) having shouldered or toothed end portions 990 and 992 normally urged into the path of movement of the studs 982 and 984. The bars 986 and 988 are pivoted at their inner ends on stud bolts 994 and 996 carried by the forward extending arms 998 and 999 of brackets 1000 and 1002 bolted to the cross bar 680. The bars 986 and 988 are urged in a counter-clockwise direction, as seen in Figs. 54 and 31, by coil springs 1004 and 1006 secured at their outer ends to pins 1008 and 1010 upstanding from the pivot bosses of the bars. The springs 1004 and 1006 have secured to their other ends pins 1012 and 1014 upstanding from the brackets 1000 and 1002.

Release of the bars 986 and 988 from the studs 982 and 984 at the end of the pitting operation is accomplished by triggers 1016 and 1018, which comprise bell cranks journaled on stud bolts 1020 and 1022 secured to forwardly extending laterally offset arm portions 1024 and 1026 of the arms 998 and 999 of the brackets 1000 and 1002. The trigger bell cranks 1016 and 1018 have dependent arms 1028 and 1030 respectively positioned in the path of operating dogs or cams 1032 and 1034 movable with the pitter head frame 770 and bolted to the arms 772 and 774 of that frame. The other arms 1036 and 1038 of the trigger bell cranks 1016 and 1018 are formed with integral inwardly extending lugs or cams 1040 and 1042 which overlie the bars 986 and 988 and are adapted, when the trigger bell cranks are moved in a counter-clockwise direction by the dogs 1032 and 1034, to depress the bars 986 and 988, thereby releasing the toothed ends 990 and 992 from the operating studs 982 and 984.

*Operation of the machine*

The combined motor and speed reducer 29 continuously drives the conveyor 30, as previously described, by continuously rotating the shaft 31 in a clockwise direction, as seen in Fig. 1, to cause the upper flights of the conveyor chains 22a and 22b to pass from the left hand or feed-in end of the machine to the right hand or discharge end of the machine.

As each fruit holder, cup or supporting device 360 moving along the lower flights of the chains approaches the feed-in end of the machine, the actuating roller 414 for the half cup segments engages a stationary cam 480, Figures 40 and 64 which act on roller 414 to depress the rack bars 406 and 408 to move both of the half cup segments from the depending closed position illustrated at Figure 45 to the spread or opened position illustrated in Figures 41 and 43.

When the roller 414 reaches a point 488 on the cam 480 the cups are completely open and in registration with the peach supported by the blade 314, as shown in Figure 31. Because of the swinging of the arm 300 with the impaling means the cups had to be in the clear. But starting at the point 486 the cups gradually opened until they were apart sufficient to allow the largest peach to pass between the edges of the cups. Then at the proper point in timed relation with the peach carried by the transfer means, the roller 414 jumps off the point 488 of the cam 480, thereby allowing the spring 452 to take care of the holding of the peach within the cups. When this gripping of the peach takes place the center of the jaws is exactly in line with the center of the suture plane of the peach. In other words, the jaws straddle the suture plane of the peach and as they close upon the peach and continue to move upwardly with the conveyor chain they will remove the transferred peach from the transfer means which is still stationary and will carry the peach between the now closed two half cup sections upwardly and toward the upper reach of the belt in clockwise direction. In this transfer of the peach from the impaling blade onto the continuously moving conveyor, the orientation of the peach with its suture in a predetermined plane in the first instance a vertical, direction is maintained. As the cups 360 move along with the conveyor they will be maintained in exact peach holding position with the peach securely held therebetween and maintained in correct oriented position for carrying the peach past the halving saw.

By reference to Figures 30 and 31 it will be seen that the peach as it is finally oriented and ready to be transferred to the conveyor by the transfer device has its stem indent face downwardly and has its suture plane extending radially of the turret 34 and in line with the path of movement of the impaling blade 314 when the turret arrives on the line "A," see Figure 32, so that as the impaling blade strikes the peach it will be impaled by the blade and intermittently carried around to the position shown by the blade 314 which is at the extreme right in Figure 31. In this position the stem indent will be uppermost, with the suture plane still maintained in the same relative position it was prior to being transferred. Then as the cups grasp the whole peach and remove it, the slot 315 on the impaling blade permitting this, will transfer its path of travel from the impaling blade to the path of travel of the fruit cups which are rotating in the clockwise arc around the shaft 33. In so doing the suture plane is maintained but the stem cavity is shifted to a forward facing direction as seen in Figure 31, the suture plane being in a vertical direction and lying between the two cup halves with the stem indent facing forwardly in the direction of movement of the conveyor chain.

Accordingly, as the cup segments move under the action of the spring 452, they first move to the fruit engaging position where the bottom semi-conical surface of each half cup segment engages opposite sides of the whole peach.

Since the half cup segments are interlocked by the mounting of the rack bars on a common slide block, and the positions of one of the inner cup segments is determined by the positions of the other cup segments, the companion half cup segments on opposite sides of the fruit must always be spaced the same distance from the vertical plane through the axis of rotation of the common shaft 114 of the two half cup segments.

The sawing, splitting or severing blade 600 lies in the vertical plane through the axis of the common mounting shaft 374 for the cups and the fruit is therefore, as previously described, centralized with respect to the plane of the sawing or splitting blade.

As the conveyor therefore moves continuously it carries the fruit holder containing the whole fruit to and across the splitting blade and onto and along the separating blades and onto the spreader blades. The splitting, separating and spreading of the whole fruit into two equal parts or halves is illustrated in Fig. 64. When the fruit reaches the splitting or sawing blade 600, the actuating or control roller 414 for the cup segments engages the camming portion 510 of the auxiliary track or guide 506, which track is urged downwardly by the spring 519 and that spring therefore acting through the track 506 and the roller 414 applies an additional or auxiliary clamping pressure preventing shifting of the fruit in the cup or holder as the fruit is carried past the sawing or splitting blade. It should be noted that this track 506 terminates substantially at the point where the sections 656 and 658 (Figs. 48 and 51) of the separating blades diverge from the straight parallel portions 654 of these blades so that the additional clamp pressure is removed between the time that the cups and fruit halves move from the position of Fig. 39 to the position of Fig. 40, where the separating of the fruit and cups has been initiated.

As the fruit reaches the diverging sections 656 and 658 of the separating blades, the actuating roller 414 for the cup segments reaches the camming forward end portion 492 of the track 490 and hence as the conveyor continues to move, the camming portion of the track 490 raises the rack bars 406 and 408, thereby swinging the cup segments away from each other. Thereafter, as the roller 414 moves along the camming portion 492 of the track 490, the fruit moves along the divergent sections 656 and 658 of the separating blades 622 and 624 and onto the spreader blades 660 and 662. As illustrated in Figs. 48 and 51 the separating blades diverging both in the vertical and the horizontal direction, cause the fruit halves to follow the outward or opening movement of the opposite cups. This double divergence of the blades insures the retention of the fruit halves in the opposite cups notwithstanding the tendency of the fruit halves to stick to the blades.

It should be noted that the cups swing about an axis which is offset from the separating blades. The doubly divergent blades insure that the fruit halves will properly follow the opening movement of the continuously traveling cups. Blades which diverge only in the one plane, i.e., horizontal plane, would cause the fruit halves, which have a tendency to stick to the blades, to move in a path different from the path taken by the cup segments as the opposite cups progressively swing from each other while traveling at a continuous uniform rate from end to end of the separating blades.

The forward ends of the opposite spreading blades 660 and 662 constitute a continuation of the separating blades 622 and 624 so that while the fruit is being moved onto the spreader blades and the traveling cups are continuing their progressive opening movement, the fruit is caused to follow the separating movements of the cups, as illustrated in Fig. 63. When the fruit halves have been moved to the position shown in Fig. 47, the traveling frame 770 of the pitting mechanism has begun its "forward" movement under the control of its actuating cam 798, Fig. 48. As the pitter head frame thus moves forwardly or to the right, as seen in Fig. 54, the driving dog 764, carried by the pitter frame, as illustrated in Figs. 52, 53, 58 and 59, also moves forwardly or to the right in these figures. As the dog 764 moves to the right it engages the ratchet tooth 750 of the ratchet bar 748 and causes that bar to move forward, thereby swinging the lever 762 and hence the shaft 740 in a clockwise direction, thereby, through the crank 738, depressing the plungers 710 and 712. Such depression of the plungers 710 and 712 causes the operating cranks 698 and 700 of the spreader blades to be moved downwardly, thereby swinging the spreader blades about their common mounting shaft 672.

The fruit halves having reached the position as indicated in Fig. 47, the spreader blades, the fruit halves, and the opposite cups swing outwardly in synchronism, the doubly divergent sections of the spreader blades causing the fruit halves roughly to follow the movements of the cups although to be tilted therein.

The spreader blades and the cups continue progressively to swing toward open position while the cups move continuously, carrying the fruit halves along the spreader blades until the fruit halves reach positions where the fruit halves have substantially left the doubly divergent sections of the spreader blades and are in contact with the singly divergent sections 686 and 690 of the spreader blades so that as the blades continue to open and the cups continue their travel carrying the fruit along the spreader blades, the fruit halves are shifted in the cup sections as illustrated in Figs. 41, and 43, so that the cut faces of the fruit halves are substantially parallel to the mouth or edges of the cups. Figs. 42 and 43 illustrate the spreading movements of halves of an average size peach. Larger or smaller halves will not be spread exactly parallel to the mouths of the cups but will be left slightly tilted therein and will be quickly straightened out by the pitting pads.

By the time the cups and spreader blades reach the position illustrated in Fig. 43, the spreader blades have completed their opening movement and at that time the camming surface 752 of the ratchet bar 748, Fig. 52, has engaged the roller 760 which is stationary, and the ratchet bar is thereby raised out of engagement with the operating dog 764 and the ratchet bar being released therefrom, the blades 732 cause the plungers 710 and 712 to be rapidly lifted and the spreader blades to be quickly moved to their closed position, as illustrated in Figs. 48 and 51, ready to receive the next oncoming fruit.

The cups, however, continue their opening movement, but by this time the fruit halves have been moved to such an angle of inclination with respect to the horizontal plane that they of their own weight follow the further movement of the cups.

It should be noted that the horizontal ribs 692 of the spreader blades perform a very important part in connection with the dropping of the fruit halves from the spreader blades because these ribs not only serve to prevent the fruit halves from turning while they are being pushed along the spreader blades but also serve to break any suction between the cut faces of the peach halves and the surfaces of the spreader blades so that the peach halves do not stick to the spreader blades but drop freely therefrom when the blades have attained a fully open position.

The half fruit holders or cups having been moved to their fully opened position, and the cam roller 414 having moved from the camming surface 492 of the track 490 to the first level section of the track, the cup sections are held in an open position by the track 490 as they are brought under the pitter mechanism, which is at that time stationary in its "rearward" position.

It has been previously pointed out that the spreader blades are operated during the forward traveling movement of the forward pitter frame 770 as it travels forwardly to pit the fruit halves in advance of the fruit halves being spread by the spreader blades. By the time the thus spread fruit halves have been brought by the cups under the pitter mechanism, the pitter mechanism has completed its pitting function and has returned to its rearward position and now again begins its forward movement. The fruit halves having been brought under the pitting mechanism, the actuating roller 414 of the cups reaches the depressed portion or recess 494 in the control track 490 and this permits the roller to move downwardly, the spring 452 swinging the cups upwardly, to position the exposed or cut faces of the half fruits in engagement with the under surfaces of the pitter plate of the main hold-down pads or plates 878 and 880 of the pitter mechanism, as illustrated in Fig. 60. The knock-out pads 890 and 892 normally extend below the main hold-down pads or plates 878 and 880 but as the fruit halves are swung upwardly into engagement with the main pads or plates, the seed containing sections or pits of the fruit halves engage the knock-out pads and move them upwardly against the urging of their springs 910 and 912 until the lower face of the knock-out pad lies substantially in the plane of the lower surfaces of the main holding pads or plates.

It should be noted that as the pitting frame moves "forwardly" it is raised somewhat as its parallel, mounting links 780, 782, 784 and 786 swing about their pivot points. The recess 494 in the control track 490 is of such depth as to permit the cups to swing upwardly in synchronism with this raising of the pitter frame and consequently to follow the rising movement of the hold-down pads or plates 878 and 880 and the equal movement of the pitting knives. As the roller 414 of the cups traverses the depressed portion or recess 494 in the control track 490 the roller 414 of the cups engages the beveled end of the auxiliary track 508 and the spring 532 acting through this auxiliary track applies an additional force auxiliary to the spring 452 of the cups 362 and 364 to increase the pressure of engagement of the fruit halves with the main holding pads or plates 878 and 880.

As the pitting frame continues to move forwardly in synchronism with the continuous movement of the cups carrying the fruit halves, the studs 982 and 984, Figs. 53 to 55, and 58 and 59, engage the toothed end portions 990 and 992 of the bars 986 and 988. Therefore, as the pitter head frame continues its forward movement the operating cranks 978 and 980 of the pitter knife actuating mechanisms are swung in a clockwise direction, as seen in Figs. 54, 58 and 60. The consequent rotation of the shafts 978 and 976 and the segmental gears 970 and 972 carried thereby causes the downward movement of the racks 934 and 936 and the cross heads 930 and 932. The downward movement of the racks 922, 924, 926 and 928 carried by the cross heads causes simultaneous opposite rotation of the gear segments 914 and 918 and the simultaneous opposite rotation of the gear segments 916 and 920, thereby causing the shaft 838, Fig. 61, and the sleeve 840 to rotate oppositely and also cause the drive shaft 858 and sleeve 859, Fig. 59, to rotate oppositely.

The opposite rotation of the sleeves and their respective shafts causes the bars 826 and 828, and the bars 830 and 832 to swing apart and the pitting knives 818, 820, 822 and 824 to swing through the flesh of the fruit about the seed-containing section or pit until the edges of the cutters meet beneath the seed-containing section or pit to thereby sever the pits from the fruit halves.

As the pitting head frame approaches its forward limit of movement, the dogs or cams 1032 and 1034, Figs. 54 and 58, engage the dependent arms 1028 and 1030 of the trigger bell cranks 1016 and 1018 and swing them in a counter-clockwise direction. The counter-clockwise motion of these trigger bell cranks causes the lugs 1040 and 1042 to engage and depress the bars 986 and 988, thereby releasing the operating studs 982 and 984 of the pitter knife actuating mechanism.

The springs 964 and 966 raise the cross heads 930 and 932, thereby opening the pitting blades. The pitting blades having been opened, the pitting head frame substantially reaches its forward limit of movement and at the same time the actuating roller 414 for the cups reaches the end of the depressed portion or recess 494 on the track 490 and engages the curved, camming surface at the end of the recess so that the roller 414 is raised, thereby swinging all the cups to open position against the urging of the spring 452.

As the cups with the pitted fruit halves move downwardly away from the main holding pads or plates 878 and 880, the knock-out pads 890 and 892 operate, under the action of their springs 910 and 912, to knock the pits down onto the peaches from which they were cut, or at least to drop the pits so they will not fall onto the oncoming half peaches to cause interference with the proper pitting of the subsequent peaches. This knock-out pad serves not only to knock the pit down but also serves to apply through the pit a force tending to compress the flesh of the peach in advance of the pitting knife blades so that they make a smooth, clean cut in the flesh of the peach. The knock-out pads serve also to apply through the excised pits a downward force on the peach halves so that any tendency of the peach to stick to the main holding pads is overcome and the peach is caused to follow the opening movements of the cups following the pitting operation.

In opened position as shown in Fig. 1, the fruit cups swing concentrically about the axis of the sprocket shaft 31 and drop or discharge the pitted or deseeded fruit halves onto a feed conveyor (not shown) or into a suitable receptacle (not shown) at the discharge end of the machine.

The pitting mechanism disclosed herein constitutes an improvement over that disclosed in applicant's co-pending application, Serial No. 747,299, filed May 7, 1947, now Patent No. 2,673,584. As shown in that application, and the same applies to the improved pitting mechanism shown herein, the pitting of the fruit is accomplished while the pitting head frame is traveling in its forward direction of movement and while it is rising along an arcuate path from its rear limit of movement to its forward limit of movement. Each half fruit holder rises into engagement with the pitting plate during the initial forward and upward movement of the pitting head and descends from the pitting head during the latter but still rising portion of the path of movement of the pitting head. In that prior filed application the pitting mechanism is constructed to pit single fruit halves consecutively and a single pitting mechanism is carried by the pitter head frame, whereas the present pitting mechanism provides a pair of pitting mechanisms cooperatively related and coordinated in operation simultaneously to pit both halves of a whole peach initially fed into the machine and to pit half peaches held in cups which swing or pivot about a fixed axis so that the pitting is accomplished while the fruit half is positioned at an inclination to a horizontal plane.

From the foregoing it will be seen that the machine of the present invention provides a mechanism wherein peaches, generally graded as to size, are dumped indiscriminately into the hopper and will then flow in succession into the series of jaw members carried by the turret, one peach in between each of two holding jaws. The peach will be carried around in continuous manner by and between the jaws in the spaced openings of the turret, the peach resting upon the now rotating orientating wheel, substantially the entire weight of the peach being supported by the wheel, the opposed jaws serving merely to maintain the peach superimposed or supported upon the periphery of the wheel. As the turret continues to move and the peach is revolved, it will gradually come into position such that the stem indent registers with the wheel. The minute that the stem indent registers with the wheel further rotation of the peach stops. In the registration of the stem indent with the wheel there are two situations that come about. The most common one is that the plane of the wheel will lie angularly of or crosswise of the longitudinal axis of the stem indent. The less common is that the plane of the wheel will register with the long axis of the stem indent, which longitudinal axis of the stem indent corresponds with the suture plane. When the plane of the wheel lies crosswise of the longitudinal axis the weight of the peach, plus the angularity of the steep walls of the stem indent, prevent further turning of the peach even though the orienting wheel continues to turn. In order to change the angular relation between the plane of the wheel and the long axis plane of the stem indent, the mechanism hereinbefore described is resorted to for shifting the plane of the wheel relative to the peach. Hence after the wheel has entered the stem indent crosswise thereof, on the next turning of the wheel about its vertical spindle axis the wheel first shifts relative to the peach until it is aligned with the long axis of the indent and the peach thereupon settles further down onto the wheel and thereafter shifts with the wheel as it completes its movement about its vertical spindle axis. On further angular movements of the vertical spindle of the wheel prior to the peach arriving at the transfer station, the peach will partake of any such angular movements of the spindle due to the fact that the wheel is now in the long axis of the peach cavity and the peach will move angularly with it. It is to be noted that the final turning of the wheel about its vertical spindle axis aligns the suture plane of each oriented peach radially of the turret so as to be in proper registration for the transfer operation. This last angular movement of the peach is through an arc of forty-five degrees, whereas the prior angular movements were through arcs of ninety degrees. The reason for this difference in degree of angular movement is because in locating the suture plane it is desired to effect as great an angular movement or suture detecting action as possible, whereas in the final aligning movement of the wheel it is only necessary to rotate it through forty-five degrees in order to align it with the radial axis of the turret. In certain instances where the suture plane or long axis of the stem indent has not exactly lined up with the plane of rotation of the wheel, or in those instances where there are slight protuberances, deformations, wart-like growths or other abnormalities on the side walls of the stem indent which prevent the wheel from completely lining up or completely penetrating the long axis of the stem indent to its maximum depth, the vibrating mechanism hereinbefore described is resorted to for accomplishing this last perfect line-up of the long axis of the stem indent and the wheel and such maximum radial penetration of the wheel into the stem indent. In connection with this vibration it is to be understood that rotation of the wheel is stopped during such vibration. So also rotation of the wheel is stopped during turning of the wheel about its vertical axis in the suture plane searching operation.

Finally, as the peach is brought by the continuously moving turret to final radial transfer position as indicated in Figure 31 of the drawings, the peach as hereinbefore described is ready for transfer to the sawing and pitting conveyor mechanism, and it is at this point and station that the transfer mechanism comes into action with the constantly moving orientating turret. It is understood that the orientating wheel moving with each pocket and peach of the orientating turret remains in position until suitable transfer mechanism, herein specifically shown as an impaling blade, contacts the peach to transfer or transport the peach to the conveying mechanism, all as hereinbefore described. In the present construction we have provided an impaling blade which moves downwardly and penetrates or impales the top portion of the now oriented peach, impaling the same parallel to and directly on the suture plane. In the present instance mechanism is provided for causing the orienting roller and its mounting automatically to drop downwardly out of the way of the transfer mechanism, immediately the peach is under the control of the transfer mechanism, in the present instance immediately that the peach has been impaled by the impaling blade. In the present device the transfer mechanism serves to carry the oriented peach, and maintain it in properly oriented position as it transfers it from the orienting mechanism to the conveyor mechanism for the halving device and the pitting mechanism.

As the turret continuously rotates, the transfer mechanism swings congruently with the turret and the head or turret carrying the transferring blades or devices moves intermittently about an axis transverse or normal to the axis of swing of the turret and the congruently moving transfer mechanism. The transfer head or turret moves intermittently through an angle of one hundred and twenty degrees on each movement, this intermittent movement of the transfer head occurring only during the time that the transfer mechanism is moving in a counterclockwise direction so that when the transfer mechanism is moving oppositely to the direction of the turret the transfer head remains stationary. The swinging of the transfer head about a horizontal axis occurs during a portion only of the movement of the transfer mechanism congruently with the turret so that the transfer blade or device moves down through a pocket in the turret, grasps or penetrates the peach, the orientating wheel and supporting struts moving downwardly so as to clear the path of movement of the transfer device, and the transfer device moving sufficiently to clear the path of the orientating turret. As the transfer mechanism reaches its limit of movement in a counterclockwise direction it aligns a peach previously transferred from the orienting turret, with the path of the cups of the sawing and pitting device. These conveyor cups grasp the peach as hereinbefore described, maintain it in properly oriented position, and convey it to the halving saw in the manner hereinbefore described.

It is apparent that many widely different embodiments of this invention may be made without departing from the spirit and scope thereof, and therefore it is not intended to be limited except as indicated in the appended claims.

Having thus described the invention, what I claim as new and desire to secure by Letters Patent is:

1. In combination, continuously moving peach supporting means, means movable with and relative to said supporting means to engage and rotate the peach to orient the stem indent thereof to a predetermined position with respect to the supporting means, a continuously moving conveyor, transfer means operatively associated with said supporting means and said conveyor and operable in timed relation to the supporting means, the orienting means and the conveyor for transferring the oriented peach from the supporting means to the conveyor with the suture plane maintained in oriented position, and means for displacing the orienting means relative to the supporting means in timed relation with the operation of the transfer means to facilitate the transfer of the fruit from the fruit supporting means to the conveyor.

2. In combination, a continuously moving fruit conveyor, means carried by said conveyor for receiving and supporting a fruit during movement of the conveyor, means operatively associated with the conveyor and positioned in the path of movement of the fruit as it is fed by said conveyor for splitting the fruit, and means for feeding fruit into the conveyor, said feeding means comprising a member shiftable transverse to the path of movement of the conveyor, and fruit receiving carriers movable transverse to the path of shifting of said member to receive a peach oriented in the plane of movement of said receiving carriers, said shifting member being operatively associated with the carriers and the fruit receiving and supporting means for positioning the receiving carriers and peaches carried thereby into alignment with the fruit receiving and supporting means of the conveyor properly oriented for conveyance to the splitting means with the suture plane of the peach aligned with the splitting means.

3. Means for orientating indented fruit comprising a rotating wheel projecting upwardly in a vertical plane and so proportioned and arranged to support said fruit against gravity irrespective of stem indent depth when registered therewith, fruit restraining means positioned above said wheel to hold said fruit on said wheel, passage of said fruit through said fruit restraining means being unimpeded except for the presence of said wheel therebelow, and means for removing said wheel from its position below said fruit restraining means to permit said passage when desired.

4. A machine for orientating peaches and the like comprising a carrier, means for progressing said carrier over a path, a plurality of clamps on said carrier and normally open to permit a fruit to revolve freely therein, a wheel operatively associated with each clamp and rotatable in a vertical plane, said wheels being centrally positioned below each clamp to support and revolve a fruit in said clamp to orient the fruit, means for successively revolving each of said wheels in different vertical planes during progression of said clamps by said carrier, means for closing said clamps at one point in said carrier path to support the fruit independently of the wheel, a fruit transfer member operatively associated with said clamps to engage and remove the fruit from said clamps, and means for operating said transfer member and opening said clamps in proper timed relation to cause the transfer member to engage the fruit and the clamps simultaneously to release the fruit.

5. A machine for orientating peaches and the like comprising a carrier, means for progressing said carrier over a path, a plurality of clamps on said carrier normally open to permit a fruit freely to revolve therein, a wheel on said carrier rotatable in a vertical plane and centrally positioned below each clamp to support and revolve a fruit in said clamp, means for revolving said wheels in different vertical planes successively during progression of said clamps by said carrier and for aligning said wheels with a predetermined removal plane, means operatively associated with said carrier for closing said clamps to straighten said fruit vertically, and means for substantially simultaneously removing the wheel from fruit supporting position, opening said clamps and extracting said peach from said clamps.

6. In combination, a carrier having a plurality of pairs of lateral fruit restraining means thereon spaced to permit fruit to freely revolve therebetween, means for progressing said carrier substantially continuously over a path including a fruit loading position, a wheel positioned to rotate in a vertical plane substantially centrally below a fruit receiving aperture provided by each pair of fruit restraining means and proportioned to enter the stem indents of fruit positioned in said fruit restraining means, means for rotating said wheels, means for changing the vertical plane of wheel rotation during progression of said carrier, means for positioning said wheels in a final predetermined vertical plane at a predetermined carrier point, means for removing said wheels from said aperture at this point, and a fruit transport device movable between said fruit restraining means to engage and remove fruit therein upon removal of said wheel.

7. In a device of the class described orienting means forming a support for a whole peach and like sutured fruit and having an elongated peripheral portion shaped generally to conform to and enter the long axis of the stem indent of the fruit to a maximum extent when in registration therewith, means for turning said orienting means when in contact with said peripheral surface to rotate the long axis of the indent of the fruit into such registration with said elongated peripheral surface, means to vibrate the fruit while supported by said peripheral portion to aid suture plane orientation, auxiliary fruit supporting means operatively associated with the orienting means and constructed and arranged to engage and independently to support the fruit when so oriented and means for effecting relative displacement between said auxiliary supporting means when supporting the fruit and said fruit orienting means to abduct the fruit from the orienting means.

8. In a device of the class described the combination of rotatable means for supporting a whole peach, said rotatable means having a peripheral portion elongated and shaped generally to conform to the long axis of the stem indent of the peach and operable to enter therein to a maximum extent when in such registration therewith, auxiliary fruit supporting means adapted supportingly to maintain the peach in such oriented position independently of said rotatable supporting means, transfer means adapted to engage the so oriented peach when engaged by said auxiliary peach supporting means and also to maintain such orientation of the peach and means for causing the downward movement of said rotatable peach supporting means to permit movement of the transfer means in removing the peach from said auxiliary supporting means.

9. In a fruit preparation machine for peaches and like sutured fruit, a conveyor, means operatively associated with the conveyor for engaging and rotating the fruit about its center until the suture plane of the fruit lies in a predetermined plane, means operatively associated with the rotating means for supporting the fruit after the suture plane of the fruit is so oriented, means for causing a relative displacement between said supporting means and said fruit rotating means to disengage the rotating means from the oriented fruit, and means operatively associated with the fruit supporting means and operable upon said relative displacement to abduct the oriented fruit from the supporting means.

10. In combination, a continuously moving first peach conveyor, means operatively associated with said conveyor for rotating each peach relative to the conveyor to orient the stem indent thereof, a second conveyor, transfer means operatively associated with the first and second conveyor and mounted for movement along a path congruent to the path of movement of the first conveyor and simultaneously relative to said first conveyor in a direction transverse to the path of movement of said first conveyor successively to abduct the oriented peaches from the continuously moving first conveyor and transfer each peach to the second conveyor in a predetermined oriented position relative to said second conveyor.

11. In combination, a pair of spaced conveyors having fruit receivers carried by the conveyors along paths normal to each other, and transfer means operatively associated with the fruit receivers of the pair of conveyors and including a supporting member mounted for movement parallel to the path of movement of the fruit receiver of one conveyor and a fruit carrier mounted on said member for movement relative to said member in a shifting plane always parallel to the path of the fruit receiver of the other conveyor for transferring the fruit from the fruit receiver of one conveyor to the fruit receiver of the other conveyor.

12. In combination, a pair of spaced conveyors having fruit receivers carried by the conveyors along paths normal to each other, and transfer means operatively associated with the fruit receivers of the pair of conveyors and including a supporting member mounted for movement parallel to the path of movement of the fruit receiver of one conveyor and a fruit carrier mounted on said member for movement relative to said member in a shifting plane always parallel to the path of movement of the fruit receiver of the other conveyor, means for driving each of the conveyors at a continuous uniform rate, and means for moving the supporting member of the transfer means in synchronism with the first conveyor and the fruit carrier relative to said member in timed relation to the fruit receivers of the conveyors to transfer a fruit from the fruit receiver of one conveyor to the fruit receiver of the other conveyor without interrupting the movement of the conveyors.

13. In combination, a pair of spaced fruit conveyors operable in paths normal to each other, transfer means operatively associated with said pair of conveyors and including a supporting member shiftable along a path parallel to the path of movement of one conveyor and a fruit carrier mounted for movement relative to said member in a plane parallel to the path of movement of the other conveyor for transferring the fruit from one conveyor to the other conveyor, means for moving the conveyors continuously at predetermined uniform rates, means operatively associated with said one conveyor for orienting the fruit as to suture plane during movement of said one conveyor, means for synchronizing the movement of the supporting member of the transfer means with the movement of said one conveyor and for moving the carrier of the transfer means relative to said member in timed relation to said other conveyor to transfer an oriented whole peach from said one conveyor to said other conveyor without interrupting the movement of either conveyor, means operatively associated with said other conveyor for halving the oriented fruit through its suture plane without interfering with the movement of said other conveyor, and means operatively associated with said other conveyor for thereafter pitting said fruit halves without interrupting the movement of said other conveyor.

14. Fruit transfer mechanism for transferring fruit from a first continuously moving conveyor to a second conveyor, said mechanism comprising a rotatable head mounted for movement transversely to said first conveyor, means carried by said head for grasping a fruit positioned on the first conveyor, and an oscillating support for said rotatable head for moving the head in the direction of and at the same rate as said first conveyor and between a fruit receiving position and a fruit discharging position relative to the second conveyor.

15. In combination, a feed turret rotating in a given plane and carrying a series of fruit receivers thereon for supporting a succession of whole fruit, transfer means operatively associated with the feed turret and including a support mounted for movement along an arcuate path substantially in the plane of the first mentioned turret and substantially parallel to the path of fruit received in the fruit receivers on the turret, means for moving said support at the same angular speed as the turret and a fruit carrier mounted on said support for movement relative thereto in a plane lying normal to the plane of the turret and across the path of the fruit receivers to abduct the fruit from the receivers without interrupting the movement of the turret.

16. In combination, a rotatable peach splitter, a continuously moving conveyor for carrying peaches to and past the splitter with the suture plane of the peaches aligned in the plane of the splitter, a pair of relatively movable opposed jaw members mounted on said conveyor for shifting movement laterally of the path of movement of the conveyor between an open position to receive a peach and a closed position to hold a peach with its suture plane in the plane of the splitter, a continuously rotating feed turret for feeding the peaches with their suture planes extending substantially normal to the path of movement of the peaches being conveyed by the turret, and peach transfer means operatively associated with the conveyor and feed turret and including a member mounted for movement relative to the feed turret to abduct an oriented peach from the turret while it is moving and mounted for movement relative to the conveyor to insert the oriented peach in a pair of said jaw members while the conveyor is moving and with the suture plane aligned with the plane of the splitter.

17. In combination, a fruit conveyor, a succession of spaced fruit holders carried by said conveyor, fruit splitting means in the path of movement of fruit received in said holders, and means operatively associated with the conveyor for feeding oriented peaches into the fruit holders of said conveyor, said feeding means comprising a support mounted for shifting movement transverse to said conveyor from a position out of alignment with the splitting means to a position in alignment with the splitting means, and fruit receiving members mounted on said support for rotation relative thereto in a plane normal to the path of shifting of said support for receiving and carrying the oriented peaches from a position remote to said conveyor into a position to insert the fruit into the fruit holders of the conveyor when the support is aligned with the splitting means.

18. In a machine for treating peaches, a first turret having a peach carrying device, a second turret shiftable in the plane of the first turret and rotatable transverse to said plane in timed relation with said first turret, said second turret having a peach receiving member, peach orienting means operatively associated with the peach carrying device of the first turret and mounted for rotative movement relative to said device to turn said peach relative to the carrying device into a predetermined position of orientation with respect to the first turret, means for shifting said second turret in the plane of the first turret to cause the peach receiving member thereof to travel in fruit transferring registry with the peach carrying device of the first turret for a predetermined distance, and means to rotate the second turret during such registration to cause said peach receiving member to abduct the peach from the peach carrying device of the first turret.

19. In a fruit preparation machine for indented fruit, fruit restraining means having side walls with a vertical extent substantially less than the diameter of said fruit and defining a fruit receiving space slightly larger than the fruit and normally unobstructed to provide a free passage for said fruit into and from said space, a fruit orienting wheel operatively associated with the fruit restraining means and shaped to fit the stem indents of said fruits and mounted for movement toward and from a position below and obstructing said space thereby to form substantially the sole means for supporting a fruit in the space between said side walls and against the action of gravity during orientation of the fruit, means for rotating said wheel to orient the fruit, means for moving said wheel from said fruit supporting and passage obstructing position to an unobstructing position, and means operatively associated with said fruit restraining means and operable in proper timed relation to said wheel moving means to abduct the oriented fruit through said passage and from the fruit restraining means when the wheel is moved to said passage unobstructing position.

20. In a device for orientating indented fruit, a rotatable orientating member shaped to engage and rotate the fruit and enter the stem indent thereof when in registration with said indent, fruit holding means arranged to position a fruit in supported position upon said orientating member, a common conveyor supporting said orientating member and said holding means for progressing said member and said holding means over a horizontal path, said holding means comprising relatively shiftable holding members for resisting lateral displacement of the fruit upon rotation of said orientating member, means for maintaining said holding members apart for free rotation of the fruit therebetween during orientation, means for closing said holding members against said fruit after a predetermined orientation period, and means for withdrawing said orientating member from fruit supporting position.

References Cited in the file of this patent

UNITED STATES PATENTS

| | | |
|---|---|---|
| 1,292,261 | Clifford | Jan. 21, 1919 |
| 1,448,472 | Thompson | Mar. 13, 1923 |
| 1,454,411 | Robbins | May 8, 1923 |
| 1,480,819 | Forrester et al. | Jan. 15, 1924 |
| 1,526,635 | Groves | Feb. 17, 1925 |
| 1,712,907 | Stenhouse | May 14, 1929 |
| 1,742,653 | Goranson et al. | Jan. 7, 1930 |
| 1,753,655 | Hiller | Apr. 8, 1930 |
| 1,860,745 | MacDougall | May 31, 1932 |
| 1,901,042 | Robbins | Mar. 14, 1933 |
| 2,207,179 | Schreiber | July 9, 1940 |
| 2,220,511 | Carroll | Nov. 5, 1940 |
| 2,232,209 | Carroll | Feb. 18, 1941 |
| 2,255,533 | Ridley | Sept. 9, 1941 |
| 2,387,709 | Ashlock | Oct. 30, 1945 |
| 2,526,712 | Thompson | Oct. 24, 1950 |
| 2,788,818 | Skog | Apr. 16, 1957 |
| 2,819,787 | Carroll | Jan. 14, 1958 |